US010430948B2

(12) United States Patent
Kacher et al.

(10) Patent No.: US 10,430,948 B2
(45) Date of Patent: Oct. 1, 2019

(54) METHOD AND SYSTEM FOR PREPARING TEXT IMAGES FOR OPTICAL-CHARACTER RECOGNITION

(71) Applicant: ABBYY Development LLC, Moscow (RU)

(72) Inventors: Olga Arnoldovna Kacher, Moscow (RU); Ivan Germanovich Zagaynov, Moscow Region (RU); Vladimir Rybkin, Moscow (RU)

(73) Assignee: ABBYY PRODUCTION LLC, Moscow (RU)

( * ) Notice: Subject to any disclaimer, the term of this patent is extended or adjusted under 35 U.S.C. 154(b) by 0 days.

(21) Appl. No.: 15/238,350

(22) Filed: Aug. 16, 2016

(65) Prior Publication Data
US 2018/0018774 A1    Jan. 18, 2018

(30) Foreign Application Priority Data

Jul. 15, 2016    (RU) .............................. 2016129076

(51) Int. Cl.
*G06K 9/00*    (2006.01)
*G06T 7/11*    (2017.01)
(Continued)

(52) U.S. Cl.
CPC ................. *G06T 7/11* (2017.01); *G06K 9/18* (2013.01); *G06K 9/228* (2013.01); *G06K 9/325* (2013.01);
(Continued)

(58) Field of Classification Search
CPC ..... G06T 7/11; G06T 7/12; G06T 5/20; G06T 2207/10024; G06T 2207/20116; G06K 9/18
See application file for complete search history.

(56) References Cited

U.S. PATENT DOCUMENTS 5,825,906 A    10/1998    Obata et al.
6,138,045 A    10/2000    Kupinski et al.
(Continued)

FOREIGN PATENT DOCUMENTS

EP    1532585    12/2008

OTHER PUBLICATIONS

Pugliese, Alessandro, et al. "A Novel Model-based Dewarping Technique for Advanced Digital Library Systems", 10th Italian Research Conference on Digital Libraries, Ircdl 2014, https://doi.org/10.1016/j.procs.2014.10.018 Procedia Computer Science, vol. 38, 2014, pp. 108-115.

(Continued)

*Primary Examiner* — Gregory M Desire
(74) *Attorney, Agent, or Firm* — Lowenstein Sandler LLP

(57) ABSTRACT

The current document is directed to methods and systems that straighten in the text lines of text-containing digital images. Initial processing of a text-containing image identifies the outline of a text-containing page. Next, aggregations of symbols, including words and word fragments, are identified within the outlined page image. The centroids and inclination angles of the symbol aggregations are determined, allowing each symbol aggregation to be circumscribed by a closest-fitting rectangle oriented in conformance with the inclination angle determined for the circumscribed symbol aggregation. A model is constructed for the text-line curvature within the text image based on the circumscribed symbol aggregations and is refined using additional information extracted from the text image. The model, essentially an inclination-angle map, allows for assigning local displacements to pixels within the page image which are then used to straighten the text lines in the text image.

22 Claims, 68 Drawing Sheets

(51) Int. Cl.
  *G06T 7/12* (2017.01)
  *G06K 9/18* (2006.01)
  *G06T 5/20* (2006.01)
  *G06K 9/22* (2006.01)
  *G06K 9/32* (2006.01)
  *G06K 9/46* (2006.01)
  *G06T 3/00* (2006.01)

(52) U.S. Cl.
  CPC ......... *G06K 9/4604* (2013.01); *G06K 9/4652* (2013.01); *G06T 3/0037* (2013.01); *G06T 5/20* (2013.01); *G06T 7/12* (2017.01); *G06K 2209/01* (2013.01); *G06T 2207/10024* (2013.01); *G06T 2207/20116* (2013.01)

(56) References Cited

U.S. PATENT DOCUMENTS

| | | | |
|---|---|---|---|
| 7,110,602 B2 | 9/2006 | Krause | |
| 7,873,216 B2 | 1/2011 | Zandifar et al. | |
| 8,107,766 B2 | 1/2012 | Kacher et al. | |
| 8,285,077 B2 | 10/2012 | Fero et al. | |
| 8,331,686 B2 | 12/2012 | Lee et al. | |
| 8,897,600 B1 | 11/2014 | Ma et al. | |
| 9,036,912 B2* | 5/2015 | Meyer | G06K 9/3283 382/181 |
| 9,208,403 B1 | 12/2015 | Aviv | |
| 9,390,342 B2* | 7/2016 | Campbell | G06T 5/006 |
| 9,495,735 B2 | 11/2016 | Wilson et al. | |
| 9,805,281 B2 | 10/2017 | Wu et al. | |
| 2002/0048402 A1 | 4/2002 | Braspenning et al. | |
| 2002/0126893 A1 | 9/2002 | Held et al. | |
| 2003/0142884 A1* | 7/2003 | Cariffe | H04N 1/387 382/285 |
| 2003/0198398 A1* | 10/2003 | Guan | G06K 9/3283 382/255 |
| 2004/0008890 A1 | 1/2004 | Clark et al. | |
| 2004/0037460 A1 | 2/2004 | Luo et al. | |
| 2004/0037465 A1 | 2/2004 | Krause | |
| 2004/0213460 A1 | 10/2004 | Chen | |
| 2006/0118633 A1 | 6/2006 | He et al. | |
| 2007/0127816 A1 | 6/2007 | Balslev et al. | |
| 2009/0046930 A1 | 2/2009 | Lee et al. | |
| 2009/0080738 A1 | 3/2009 | Zur et al. | |
| 2009/0190833 A1 | 7/2009 | Alvino et al. | |
| 2009/0238462 A1 | 9/2009 | Feris et al. | |
| 2009/0274349 A1 | 11/2009 | Cascio et al. | |
| 2010/0111400 A1 | 5/2010 | Ramirez et al. | |
| 2011/0050703 A1 | 3/2011 | Artan et al. | |
| 2012/0051606 A1 | 3/2012 | Saikia | |
| 2012/0243796 A1 | 9/2012 | Saito | |
| 2012/0320427 A1* | 12/2012 | Zheng | H04N 1/387 358/3.26 |
| 2013/0064435 A1 | 3/2013 | Taerum | |
| 2013/0148883 A1 | 6/2013 | Lee | |
| 2013/0279801 A1 | 10/2013 | Scheuermann et al. | |
| 2014/0064596 A1 | 3/2014 | He et al. | |
| 2014/0164927 A1 | 6/2014 | Salaverry et al. | |
| 2014/0198981 A1* | 7/2014 | Wilson | G06K 9/3283 382/162 |
| 2014/0247470 A1 | 9/2014 | Hunt | |
| 2014/0270500 A1 | 9/2014 | Li et al. | |
| 2015/0104098 A1 | 4/2015 | Axelsson et al. | |
| 2015/0104106 A1 | 4/2015 | Elinas et al. | |
| 2015/0110392 A1 | 4/2015 | Wang | |
| 2016/0014392 A1 | 1/2016 | Liang et al. | |
| 2016/0238737 A1 | 8/2016 | Janet et al. | |
| 2017/0076169 A1* | 3/2017 | Campbell | G06K 9/344 |
| 2017/0351931 A1* | 12/2017 | Agrawal | G06K 9/3283 |
| 2017/0365094 A1 | 12/2017 | Liu et al. | |
| 2017/0372460 A1* | 12/2017 | Zagaynov | G06T 3/0031 |
| 2018/0018774 A1* | 1/2018 | Kacher | G06T 5/20 |

OTHER PUBLICATIONS

Zhang, Zheng, et al. " Straightening Warped Text Lines Using Polynomial Regression", 2002 International Conference on Image Processing, Sep. 22-25, 2002, 4 pages.

Grompone, et al. "LSD: a Line Segment Detector", IPOL Journal• Image Processing on Line, Mar. 24, 2012, pp. 35-55, https://doi.org/10.5201/ipol.2012.gjmr-lsd, 21 pages.

"Grompone, et al, "A Contrario Line Segment Detection", SpringerBriefs in ComputerScience, DOI 10.1007/978-1-4939-0575-1, 2014, http://www.springer.com/us/book/9781493905744?wt_mc=ThirdParty.SpringerLink.3.EPR653.About_eBook#otherversion= 9781493905751, 90 pages ".

Singh, et al., "A novel method for straightening curved text-lines in Stylistic documents" Springer, pp. 1-8, 2014.

Zhang et al., "Correcting document image warping based on regression of curved text lines" IEEE, pp. 1-6, 2003.

* cited by examiner

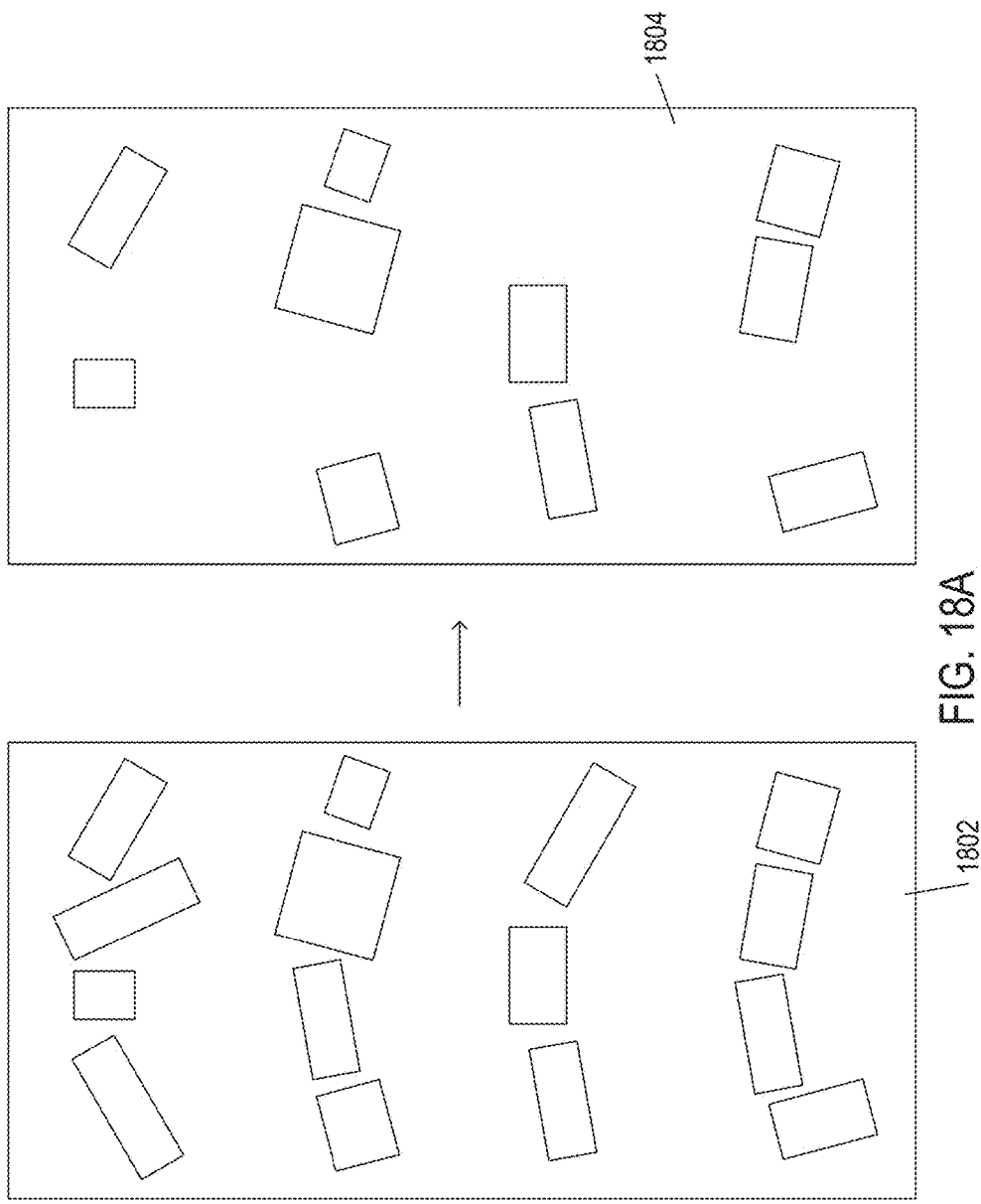

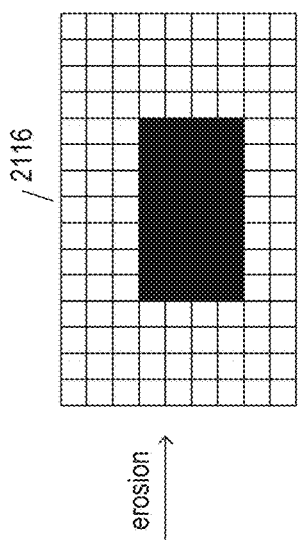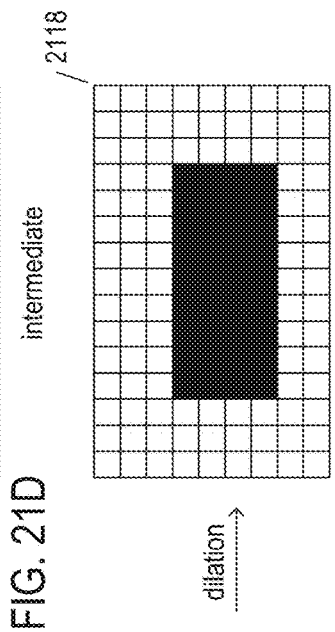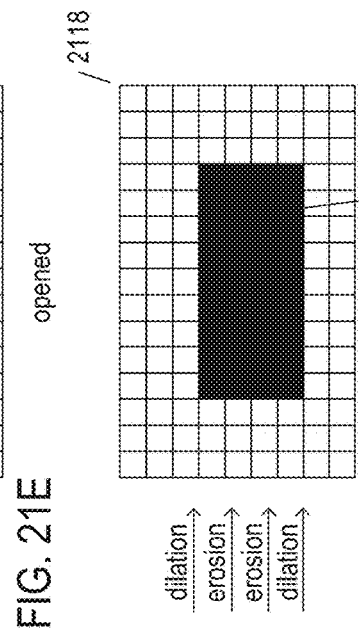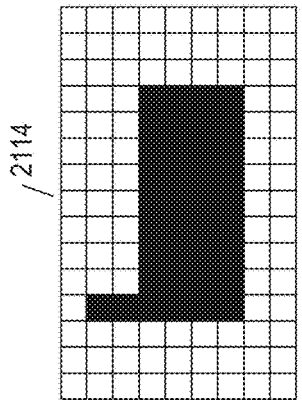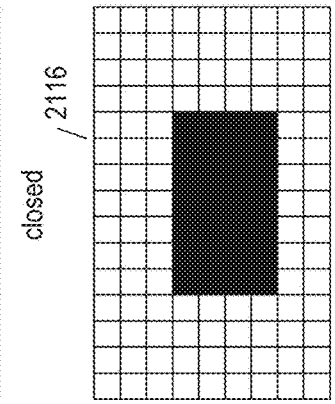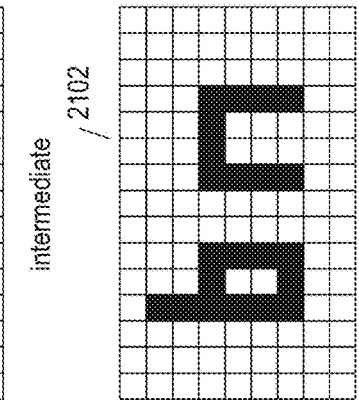
FIG. 21D  FIG. 21E  FIG. 21F

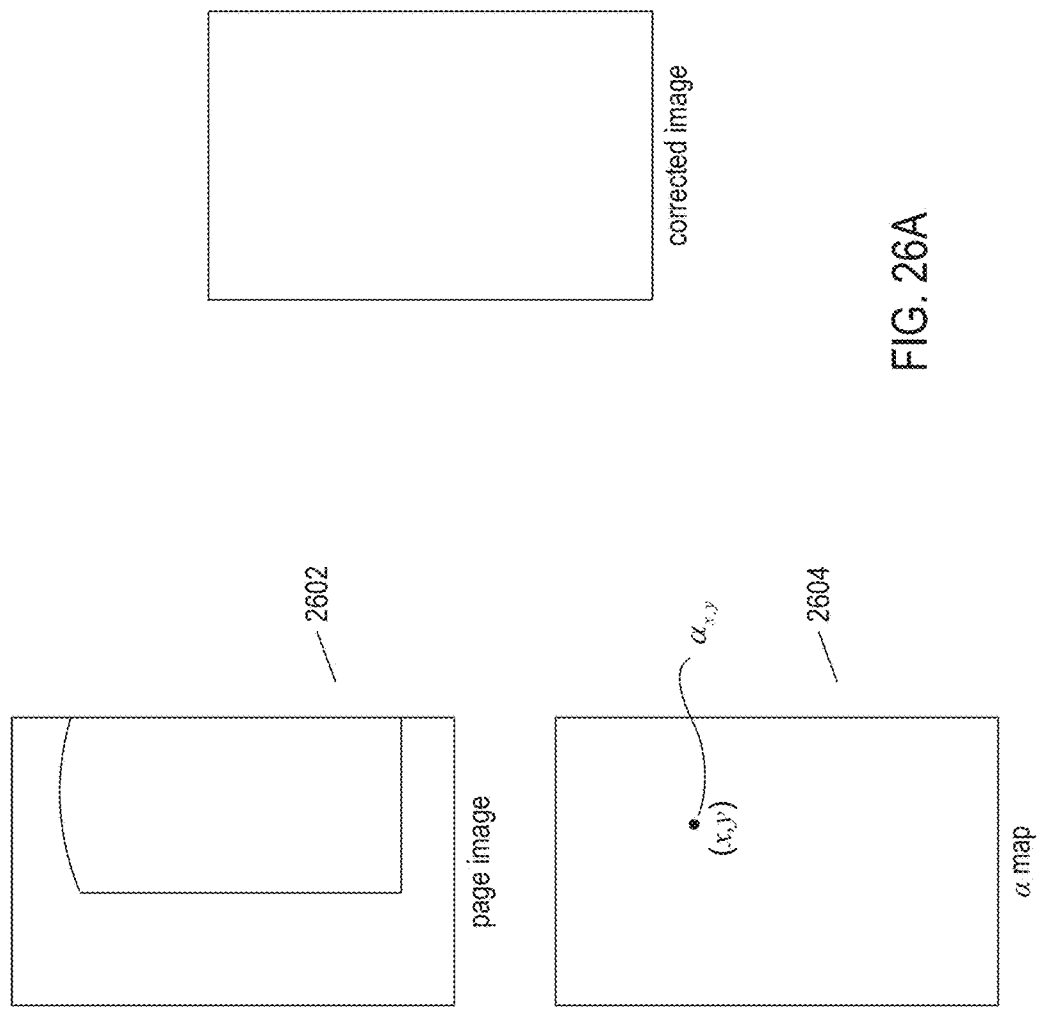

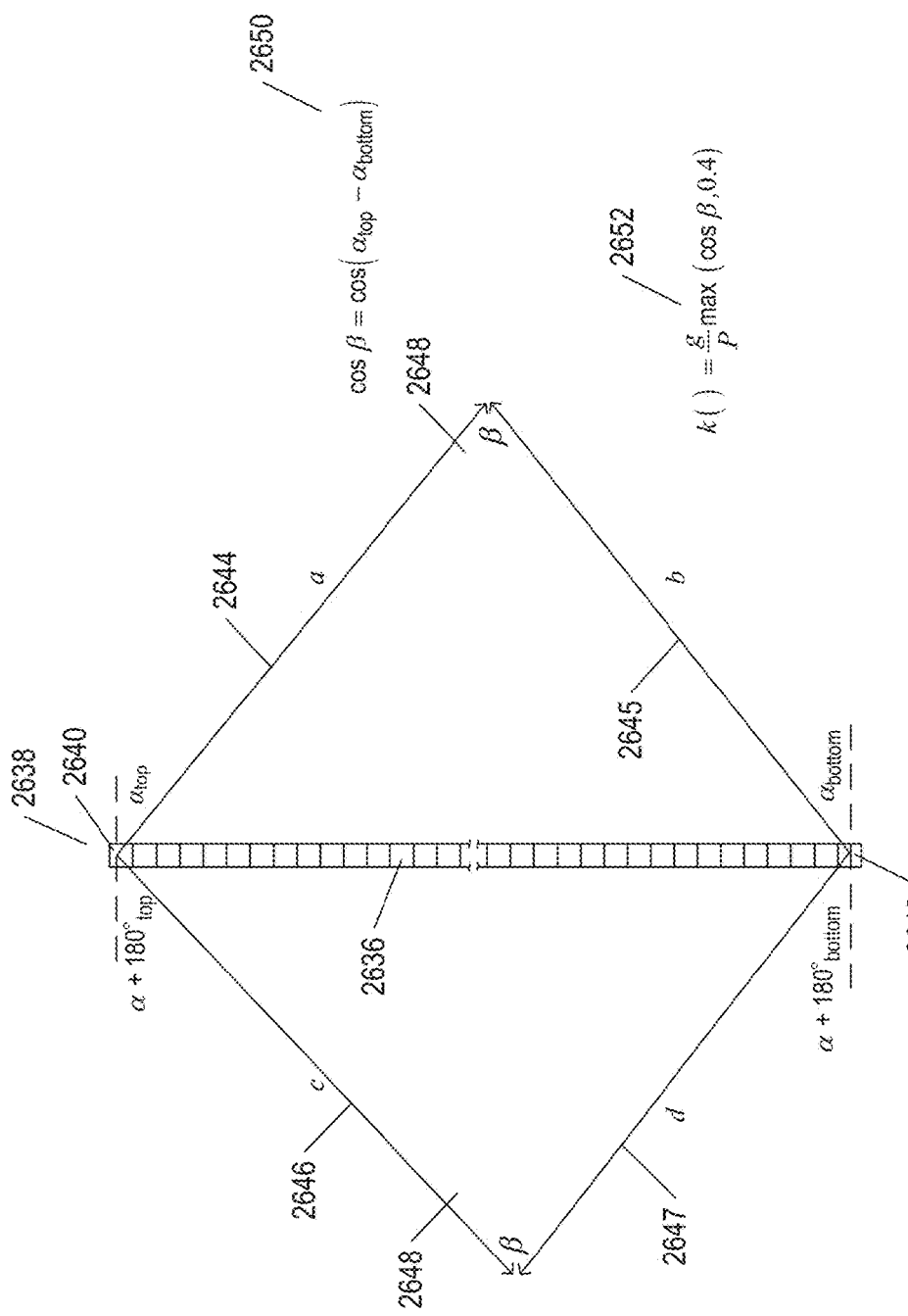

METHOD AND SYSTEM FOR PREPARING TEXT IMAGES FOR OPTICAL-CHARACTER RECOGNITION

CROSS REFERENCE TO RELATED APPLICATIONS

The present application claims the benefit of priority to Russian Patent Application No. 2016129076, filed Jul. 15, 2016; the disclosure of which is herein incorporated by reference in its entirety for all purposes.

TECHNICAL FIELD

The current document is directed to image processing and optical-character recognition and, in particular, to a method and system that straightens curved-page-surface-induced and perspective-induced curvature in text images in preparation for application of automated optical-character-recognition methods to the text images.

BACKGROUND

Printed natural-language documents continue to represent a widely used communications medium among individuals, within organizations, and for distribution of information among information consumers. With the advent of ubiquitous and powerful computational resources, including personal computational resources embodied in smart phones, pads, tablets, laptops, and personal computers, as well as larger-scale computational resources embodied in cloud-computing facilities, data centers, and higher-end servers within various types of organizations and commercial entities, natural-language information is, with increasing frequency, encoded and exchanged in electronic documents. Printed documents are essentially images, while electronic documents contain sequences of numerical encodings of natural-language symbols and characters. Because electronic documents provide advantages in cost, transmission and distribution efficiencies, ease of editing and modification, and robust-storage over printed documents, an entire industry supporting methods and systems for transforming printed documents into electronic documents has developed over the past 50 years. Computational optical-character-recognition methods and systems and electronic scanners together provide reliable and cost-effective imaging of printed documents and computational processing of the resulting digital images of text-containing documents to generate electronic documents corresponding to the printed documents.

In the past, electronic scanners were large-size desktop, table top, and free-standing electronic appliances. However, with the advent of camera-containing smart phones and other mobile, processor-controlled imaging devices, digital images of text-containing documents can be generated by a large variety of different types of ubiquitous, hand-held devices, including smart phones, inexpensive digital cameras, inexpensive video surveillance cameras, and imaging devices included in mobile computational appliances, including tablets and laptops. Digital images of text-containing documents produced by these hand-held devices and appliances can then be processed, by computational optical-character-recognition systems, including optical-character-recognition applications in smart phones, to produce corresponding electronic documents.

Unfortunately, text-containing images produced by hand-held document imaging are often distorted by noise, optical blur, curved-page-surface-induced and perspective-induced curvature of linear text lines, and other defects and deficiencies. Even images generated by dedicated document-scanning appliances may suffer from perspective-induced curvature of linear text lines when a book is imaged by opening the book and placing it face down on a transparent scanning surface. These defects and deficiencies can seriously degrade the performance of computational optical-character recognition, greatly increasing the frequency of erroneous character recognition and failure of optical-character-recognition methods and systems to produce accurate text encoding for text contained in digital images. For this reason, designers and developers of imaging devices, imaging appliances, and optical-character-recognition methods and systems, as well as users of the devices, appliances, and optical-character-recognition systems, continue to seek methods and systems to ameliorate the defects and deficiencies inherent in many text-containing digital images, including mobile-device-captured digital text-containing digital images, that frustrate subsequent computational image processing of the text-containing digital images.

SUMMARY

The current document is directed to methods and systems that straighten curvature in the text lines of text-containing digital images, including text-containing digital images generated from the two pages of an open book. Initial processing of a text-containing image identifies the outline of a text-containing page. Next, aggregations of symbols, including words and word fragments, are identified within the outlined page image. The centroids and inclination angles of the symbol aggregations are determined, allowing each symbol aggregation to be circumscribed by a closest-fitting rectangle oriented in conformance with the inclination angle determined for the circumscribed symbol aggregation. A model is constructed for the perspective-induced curvature within the text image based on the circumscribed symbol aggregations and is refined using additional information extracted from the text image. The model, essentially an inclination-angle map, allows for assigning local displacements to pixels within the page image which are then used to straighten the text lines in the text image.

BRIEF DESCRIPTION OF THE DRAWINGS

FIG. 16A illustrates fragment blocking.

FIG. 18A illustrates a first filtering step applied to the initial blocked fragments obtained by the fragment-blocking method discussed with reference to FIGS. 17A-D.

FIG. 21D illustrates dilation, erosion, closing, and opening operations that are used, in a described implementation of the currently disclosed methods, to generate filled contours corresponding to text lines in a text-containing image.

FIG. 21E illustrates dilation, erosion, closing, and opening operations that are used, in a described implementation of the currently disclosed methods, to generate filled contours corresponding to text lines in a text-containing image.

FIG. 21F illustrates dilation, erosion, closing, and opening operations that are used, in a described implementation of the currently disclosed methods, to generate filled contours corresponding to text lines in a text-containing image.

FIG. 26A illustrates straightening of text-line curves within a page image to produce rectilinear text lines using the inclination-angle map that associates an inclination angle with each pixel in the page image.

FIG. 26D illustrates straightening of text-line curves within a page image to produce rectilinear text lines using the inclination-angle map that associates an inclination angle with each pixel in the page image.

FIG. 27I provides control-flow diagrams that illustrate one implementation of the method for correcting perspective-induced curvature of text lines in images of text captured by mobile devices and other types of text-imaging equipment and appliances.

DETAILED DESCRIPTION

The current document is directed to methods and systems that straighten curved text lines of text images in order to prepare the text images for accurate optical-character recognition. In a first subsection, below, a short introduction to computer architecture, digital images, and digital-image processing methods is provided with reference to FIGS. 1-12. In a second subsection, a detailed description of the currently disclosed methods and systems is provided with reference to FIGS. 13A-26F. In a final subsection, one implementation of the currently disclosed method is illustrated in control-flow diagrams, with reference to FIGS. 27A-S.

Figure 1:
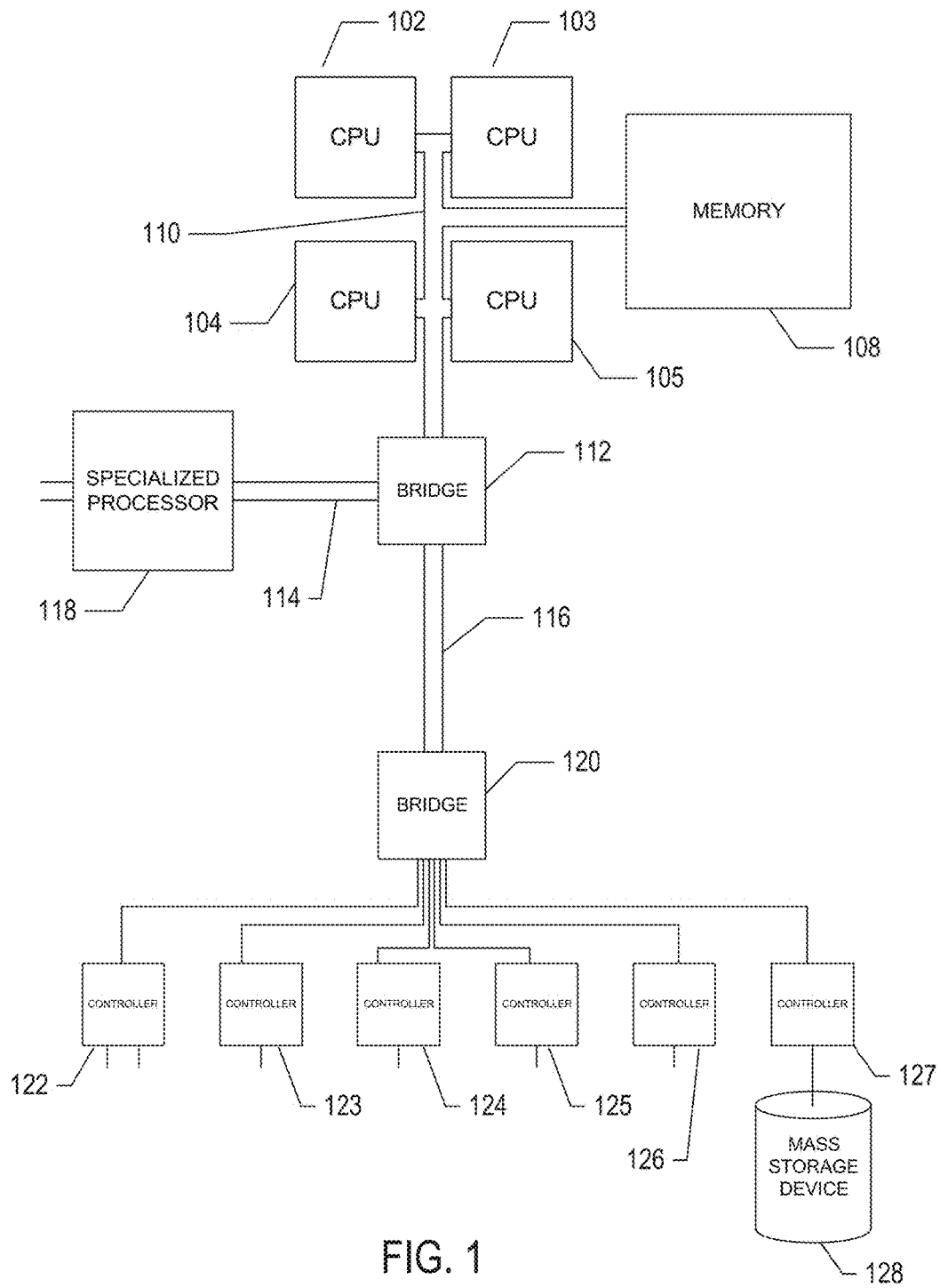
FIG. 1 provides a high-level architectural diagram of a computer system, such as a computer system in which the currently disclosed method is employed to ameliorate perspective-induced text-line curvature.

Overview of Computer Architecture, Digital Images, and Digital-Image Processing Methods FIG. 1 provides a high-level architectural diagram of a computer system, such as a computer system in which the currently disclosed method is employed to ameliorate perspective-induced text-line curvature. Mobile imaging devices, including smart phones and digital cameras, can be similarly diagramed and also include processors, memory, and internal busses. Those familiar with modern technology and science well appreciate that a control program or control routine comprising computer instructions stored in a physical memory within a processor-controlled device constitute the control component for the device and are as physical, tangible, and important as any other component of an electromechanical device, including image-capturing devices. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources.

Figure 2B:
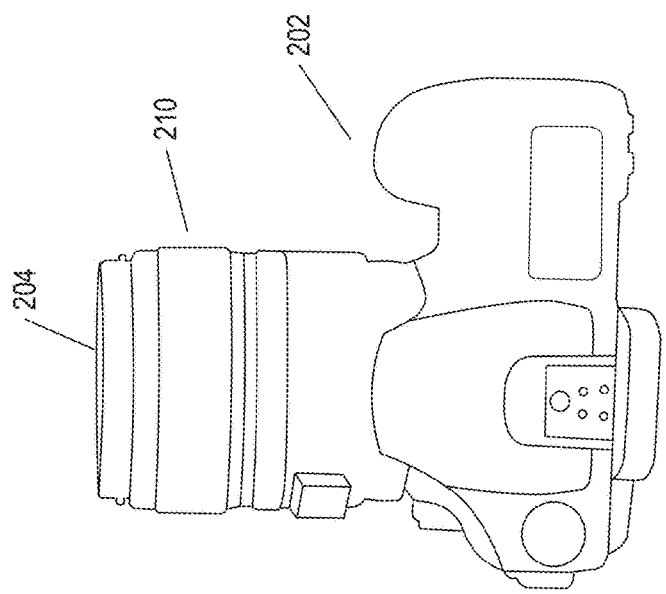
FIG. 2B illustrates two different types of hand-held imaging devices.
Figure 2A:
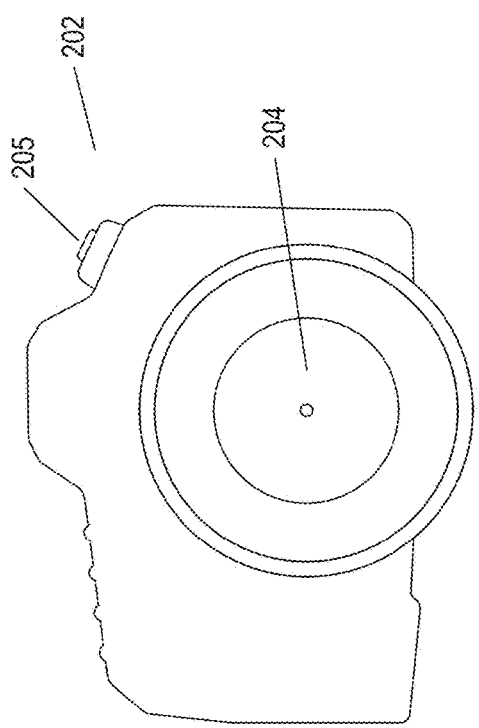
FIG. 2A illustrates two different types of hand-held imaging devices.
Figure 2C:
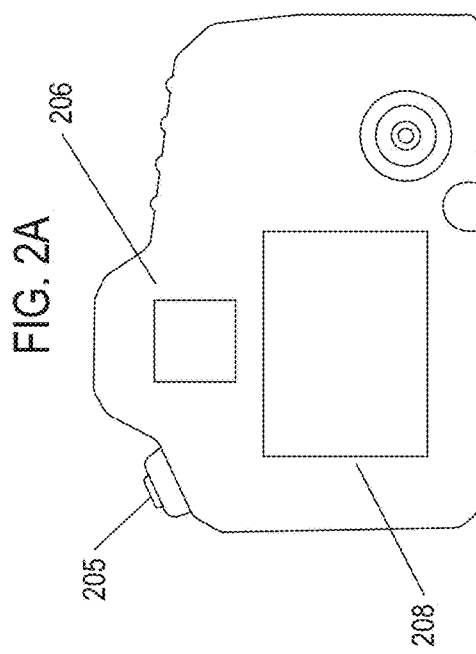
FIG. 2C illustrates two different types of hand-held imaging devices.

FIGS. 2A-D illustrate two different types of hand-held imaging devices. FIGS. 2A-C illustrate a digital camera 202. The digital camera includes an objective lens 204 and a shutter button 205 that, when depressed by a user, results in capture of a digital image corresponding to reflected light entering the lens 204 of the digital camera. On the back side of the digital camera, viewed by a user when the user is holding a camera to capture digital images, the digital camera includes a viewfinder 206 and an LCD viewfinder screen 208. The viewfinder 206 allows a user to directly view the image currently generated by the camera lens 204, while the LCD viewfinder screen 208 provides an electronic display of the image currently produced by the camera lens. Generally, the camera user adjusts the camera focus, using annular focus-adjusting features 210, while looking through the viewfinder 206 or observing the LCD viewfinder screen 208 in order to select a desired image prior to depressing the shutter button 205 to digitally capture the image and store the image in electronic memory within the digital camera.

Figure 2D:
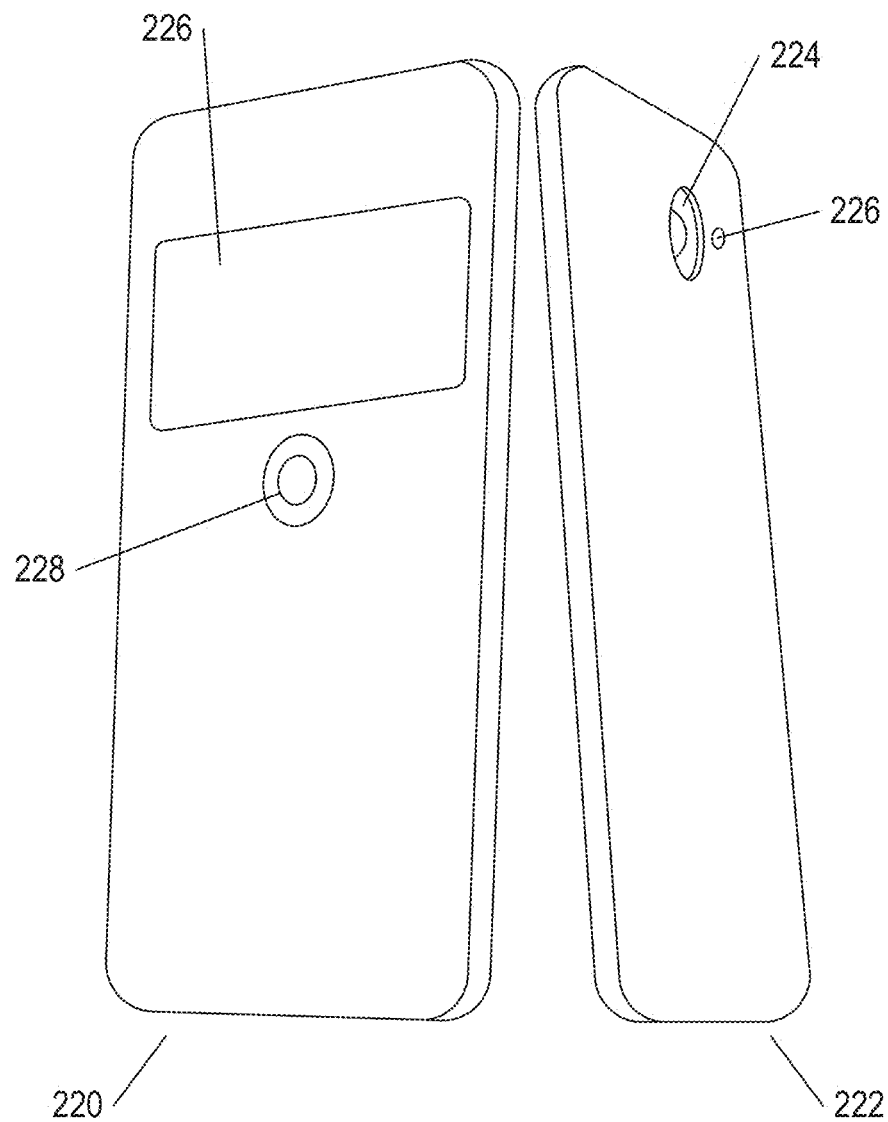
FIG. 2D illustrates two different types of hand-held imaging devices.

FIG. 2D shows a typical smart phone from the front side 220 and from the back side 222. The back side 222 includes a digital-camera lens 224 and digital light meter and/or proximity sensor 226. The front side of the smart phone 220 may, under application control, display the currently received image 226, similar to the LCD viewfinder display 208 of the digital camera, as well as a touch-sensitive shutter-button 228, input of a touch to which captures a digital image within the smart-phone memory.

Figure 3:
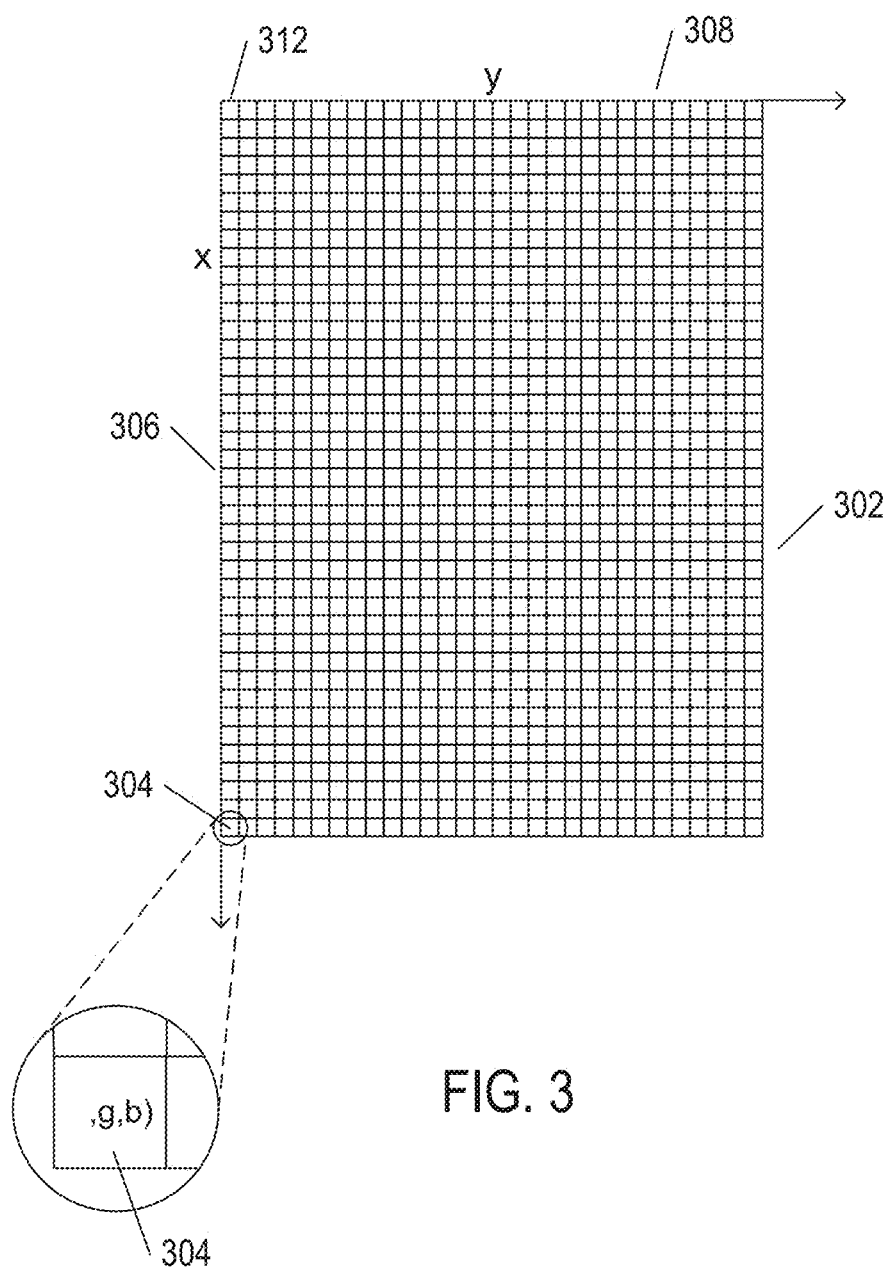
FIG. 3 illustrates a typical digitally encoded image.

FIG. 3 illustrates a typical digitally encoded image. The encoded image comprises a two dimensional array of pixels 302. In FIG. 3, each small square, such as square 304, is a pixel, generally defined as the smallest-granularity portion of an image that is numerically specified in the digital encoding. Each pixel is a location, generally represented as a pair of numeric values corresponding to orthogonal x and y axes 306 and 308, respectively. Thus, for example, pixel 304 has x, y coordinates (39,0), while pixel 312 has coordinates (0,0). The choice of axes is arbitrary. The x and y axes may be interchanged, for example, in another convention. In the digital encoding, the pixel is represented by numeric values that specify how the region of the image corresponding to the pixel is to be rendered upon printing, display on a computer screen, or other display. Commonly, for black-and-white images, a single numeric value range of 0-255 is used to represent each pixel, with the numeric value corresponding to the grayscale level at which the pixel is to be rendered. In a common convention, the value "0" represents black and the value "255" represents white. For color images, any of a variety of different color-specifying sets of numeric values may be employed. In one common color model, as shown in FIG. 3, each pixel is associated with three values, or coordinates (r,g,b), which specify the red, green, and blue intensity components of the color to be displayed in the region corresponding to the pixel.

Figure 4:
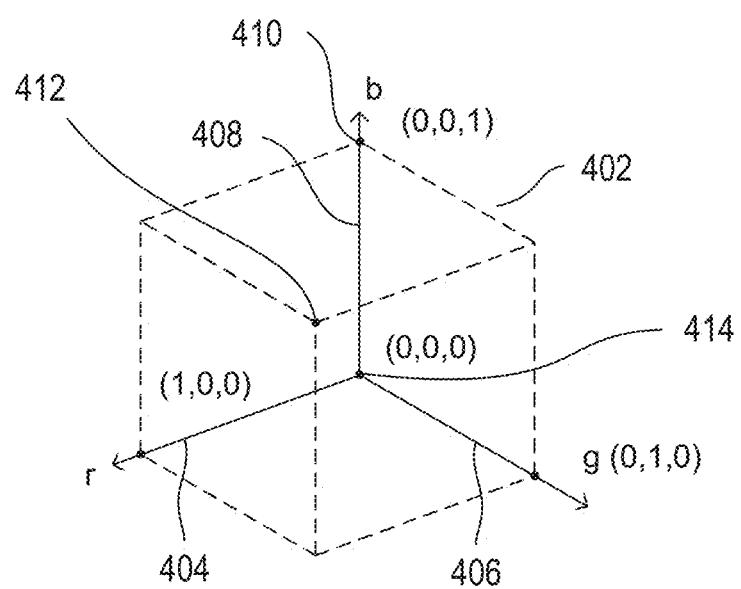
FIG. 4 illustrates one version of the RGB color model.

FIG. 4 illustrates one version of the RGB color model. The entire spectrum of colors is represented, as discussed above with reference to FIG. 3, by a three-primary-color coordinate (r,g,b). The color model can be considered to correspond to points within a unit cube 402 within a three-dimensional color space defined by three orthogonal axes: (1) r 404; (2) g 406; and (3) b 408. Thus, the individual color coordinates range from 0 to 1 along each of the three color axes. The pure blue color, for example, of greatest possible intensity corresponds to the point 410 on the b axis with coordinates (0,0,1). The color white corresponds to the point 412, with coordinates (1,1,1) and the color black corresponds to the point 414, the origin of the coordinate system, with coordinates (0,0,0).

Figure 5:
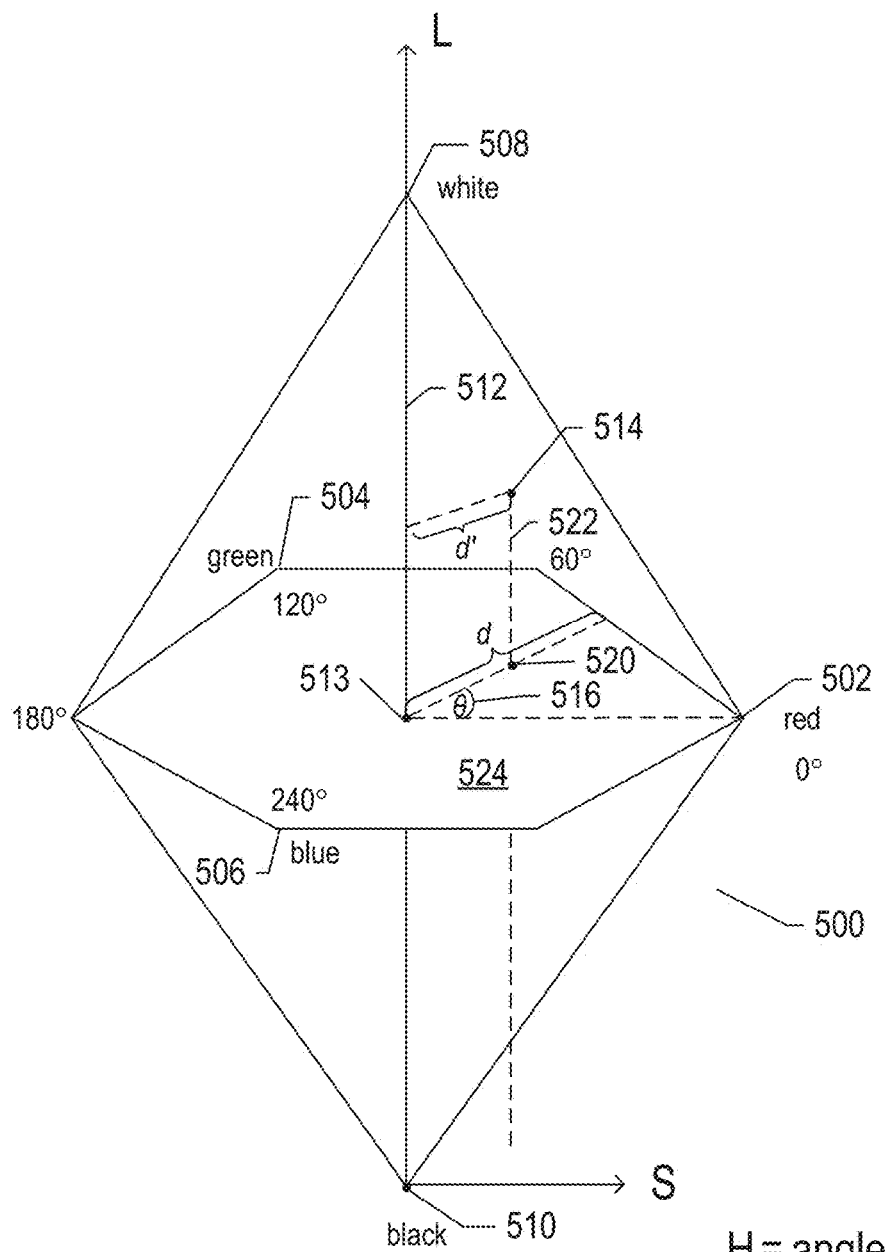
FIG. 5 shows a different color model, referred to as the "hue-saturation-lightness" ("HSL") color model.

FIG. 5 shows a different color model, referred to as the "hue-saturation-lightness" ("HSL") color model. In this color model, colors are contained within a three-dimensional bi-pyramidal prism 500 with a hexagonal cross section. Hue (h) is related to the dominant wavelength of a light radiation perceived by an observer. The value of the hue varies from 0° to 360° beginning with red 502 at 0°, passing through green 504 at 120°, blue 506 at 240°, and ending with red 502 at 660°. Saturation (s), which ranges from 0 to 1, is inversely related to the amount of white and black mixed with a particular wavelength, or hue. For example, the pure red color 502 is fully saturated, with saturation s=1.0, while the color pink has a saturation value less than 1.0 but greater than 0.0, white 508 is fully unsaturated, with s=0.0, and black 510 is also fully unsaturated, with s=0.0. Fully saturated colors fall on the perimeter of the middle hexagon that includes points 502, 504, and 506. A gray scale extends from black 510 to white 508 along the central vertical axis 512, representing fully unsaturated colors with no hue but different proportional combinations of black and white. For example, black 510 contains 100% of black and no white, white 508 contains 100% of white and no black and the origin 513 contains 50% of black and 50% of white. Lightness (l), or luma, represented by the central vertical axis 512, indicates the illumination level, ranging from 0 at black 510, with l=0.0, to 1 at white 508, with l=1.0. For an arbitrary color, represented in FIG. 5 by point 514, the hue is defined as angle θ 516 between a first vector from the origin 513 to point 502 and a second vector from the origin 513 to point 520, where a vertical line 522 that passes through point 514 intersects the plane 524 that includes the origin 513 and points 502, 504, and 506. The saturation is represented by the ratio of the distance of representative point 514 from the vertical axis 512, d', divided by the length of a horizontal line passing through point 520 from the origin 513 to the surface of the bi-pyramidal prism 500, d. The lightness is the vertical distance from representative point 514 to the vertical level of the point representing black 510. The coordinates for a particular color in the HSL color model, (h,s,l), can be obtained from the coordinates of the color in the RGB color model, (r,g,b), as follows:

$$l = \frac{(C_{max} - C_{min})}{2},$$

$$h = \begin{cases} 60° \times \left(\frac{g-b}{\Delta} \mod 6\right), \text{ when } C_{max} = r \\ 60° \times \left(\frac{b-r}{\Delta} + 2\right), \text{ when } C_{max} = g \\ 60° \times \left(\frac{r-g}{\Delta} + 4\right), \text{ when } C_{max} = b \end{cases}, \text{ and}$$

$$s = \begin{cases} 0, \Delta = 0 \\ \frac{\Delta}{1 - |2l - 1|}, \text{ otherwise} \end{cases},$$

where r, g, and b values are intensities of red, green, and blue primaries normalized to the range [0, 1]; $C_{max}$ is a normalized intensity value equal to the maximum of r, g, and b; $C_{min}$ is a normalized intensity value equal to the minimum of r, g, and b; and Δ is defined as $C_{max} - C_{min}$.

Figure 6:
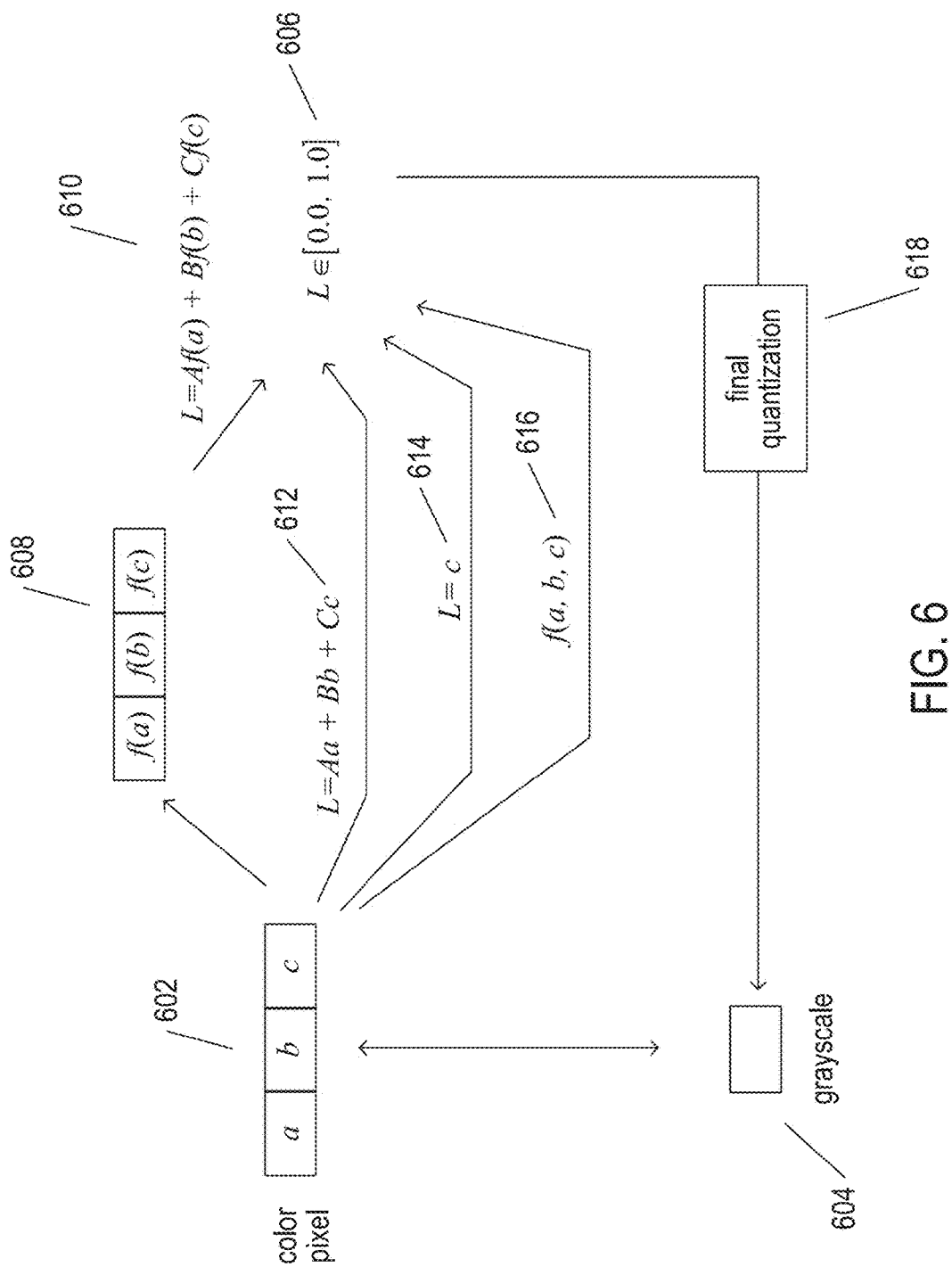
FIG. 6 illustrates generation of a grayscale or binary image from a color image.

FIG. 6 illustrates generation of a grayscale or binary image from a color image. In a color image, each pixel is generally associated with three values: a, b, and c 602. Different color models employ different values of a, b, and c to represent a particular color. A grayscale image includes only a single intensity value 604 for each pixel. A binary image is a special case of a grayscale image with only two different intensity values, "0" and "1." Commonly, grayscale images may have 256 or 65,536 different intensity values, with each pixel represented by a byte or 16-bit word, respectively. Thus, to transform a color image to grayscale, the three values a, b, and c in each color pixel need to be translated to single intensity value for the corresponding grayscale or binary-image pixel. In a first step, the three color values a, b, and c are transformed to a luminosity value L, generally in a range of [0.0, 1.0] 606. For certain color models, a non-trivial function is applied to each of the color values 608 and the results are summed 610 to produce the luminosity value. In other color models, each color value is multiplied by a coefficient and the results are summed 612 to produce the luminosity value. In yet other color systems, one of the three color values is, in fact, the luminosity value 614. Finally, in the general case, a function is applied to the three color values 616 to produce the luminosity value. The luminosity value is then quantized 618 to produce a grayscale intensity value within the desired range, generally [0, 255] for grayscale images and one of the two intensity values (0,1) for binary images.

Figure 7:
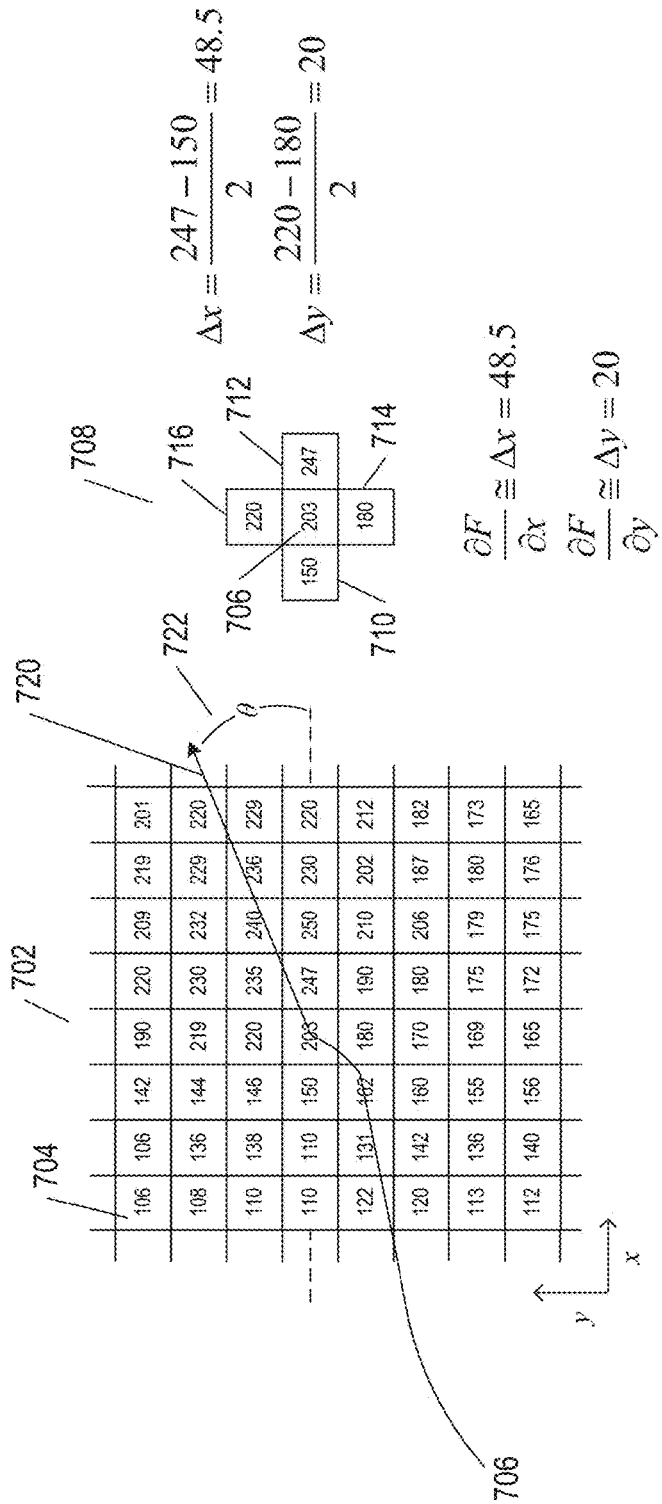
FIG. 7 illustrates a discrete computation of an intensity gradient.

FIG. 7 illustrates a discrete computation of an intensity gradient. In FIG. 7, a small square portion 702 of a digital image is shown. Each cell, such as cell 704, represents a pixel and the numeric value within the cell, such as the value "106" in cell 704, represents a grayscale intensity. Consider pixel 706 with the intensity value "203." This pixel, and four contiguous neighbors, are shown in the cross-like diagram 708 to the right of the portion 702 of the digital image. Considering the left 710 and right 712 neighbor pixels, the change in intensity value in the x direction, Δx, can be discretely computed as:

$$\Delta x = \frac{247 - 150}{2} = 48.5.$$

Considering the lower 714 and upper 716 pixel neighbors, the change in intensity in the vertical direction, Δy, can be computed as:

$$\Delta y = \frac{220 - 180}{2} = 20.$$

The computed Δx is an estimate of the partial differential of the continuous intensity function with respect to the x coordinate at the central pixel 706:

$$\frac{\partial F}{\partial x} \cong \Delta x = 48.5.$$

The partial differential of the intensity function F with respect to the y coordinate at the central pixel 706 is estimated by Δy:

$$\frac{\partial F}{\partial x} \cong \Delta y = 20.$$

The intensity gradient at pixel 706 can then be estimated as:

$$\text{gradient} = \nabla F = \frac{\partial F}{\partial x} i + \frac{\partial F}{\partial y} j = 48.5i + 20j$$

where i and j are the unit vectors in the x and y directions. The magnitude of the gradient vector and the angle of the gradient vector are then computed as:

$$|\text{gradient}| = \sqrt{48.5^2 + 20^2} = 52.5$$

$$\theta = a\tan 2(20, 48.5) = 22.4$$

The direction of the intensity gradient vector 720 and the angle θ 722 are shown superimposed over the portion 702 of the digital image in FIG. 7. Note that the gradient vector points in the direction of steepest increase in intensity from pixel 706. The magnitude of the gradient vector indicates an expected increase in intensity per unit increment in the gradient direction. Of course, because the gradient is only estimated by discrete operations, in the computation illustrated in FIG. 7, both the direction and magnitude of the gradient are merely estimates.

Figure 8:
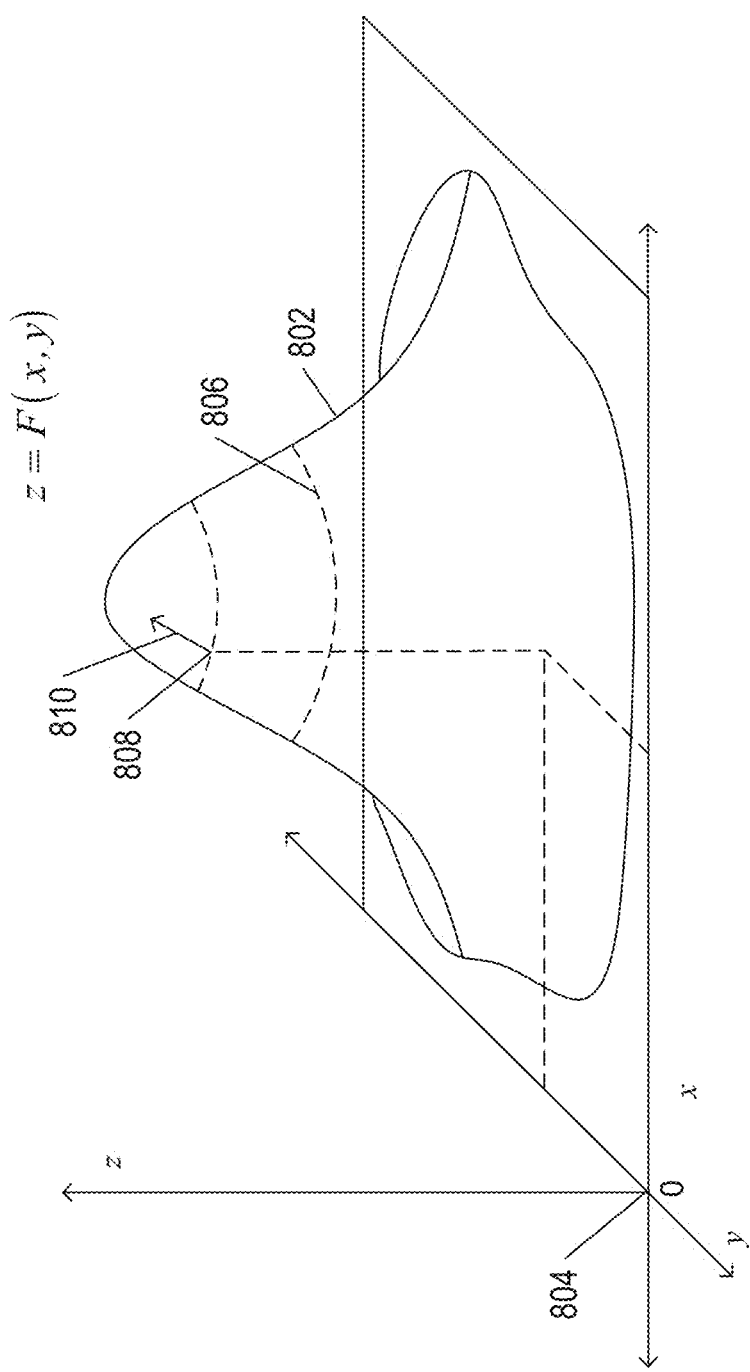
FIG. 8 illustrates a gradient computed for a point on a continuous surface.

FIG. 8 illustrates a gradient computed for a point on a continuous surface. FIG. 8 illustrates a continuous surface z=F(x,y). The continuous surface 802 is plotted with respect to a three-dimensional Cartesian coordinate system 804, and has a hat-like shape. Contour lines, such as contour line 806, can be plotted on the surface to indicate a continuous set of points with a constant z value. At a particular point 808 on a contour plotted on the surface, the gradient vector 810 computed for the point is perpendicular to the contour line and points in the direction of the steepest increase along the surface from point 808.

Figure 9:
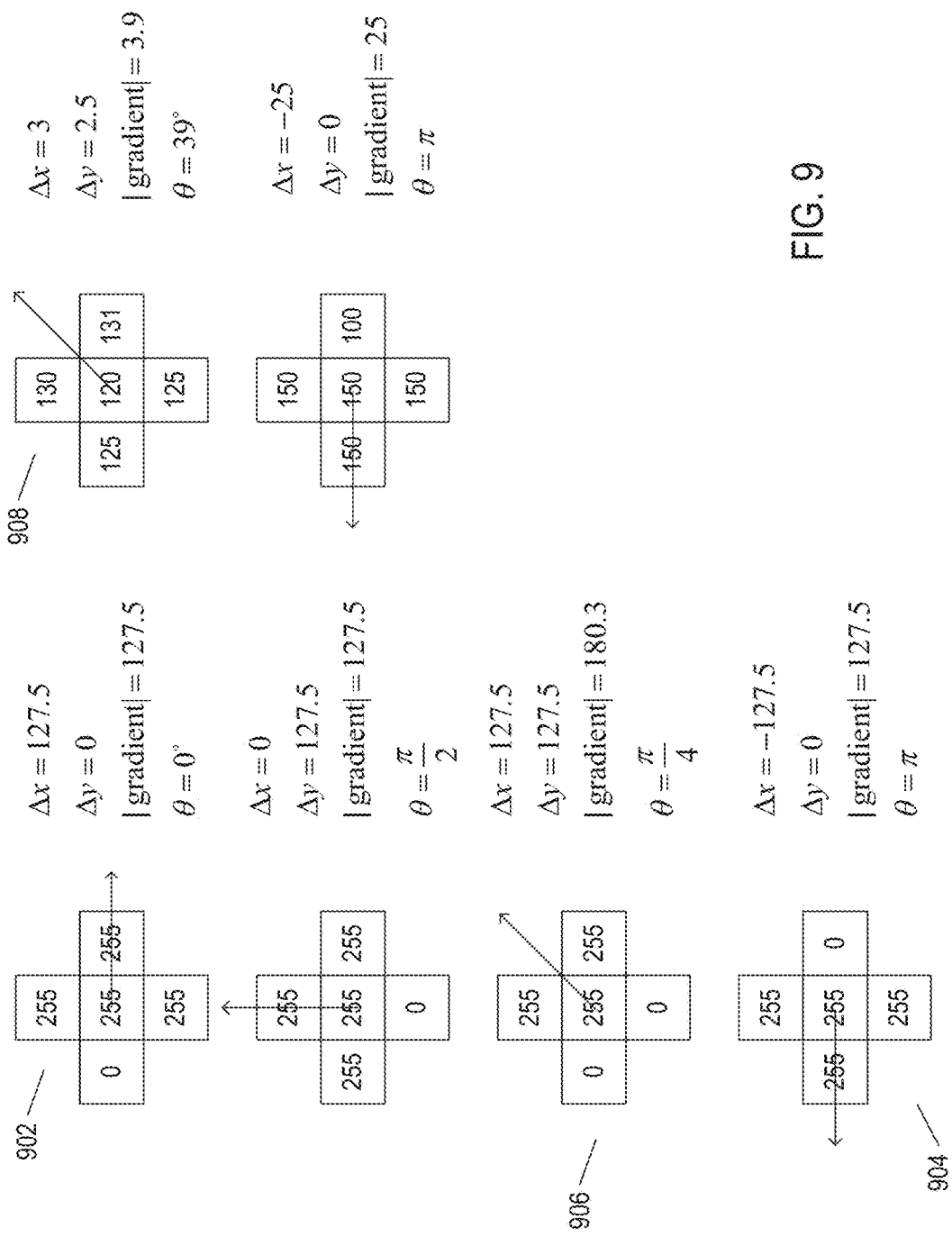
FIG. 9 illustrates a number of intensity-gradient examples.

In general, an intensity gradient vector is oriented perpendicularly to an intensity edge, and the greater the magnitude of the gradient, the sharper the edge. An edge features differences in intensities of the pixels on either side of the edge with common signs or, in other words, the intensity changes in a similar fashion for adjacent lines of pixels perpendicular to the edge. FIG. 9 illustrates a number of intensity-gradient examples. Each example, such as example 902, includes a central pixel for which the gradient is computed and the four contiguous neighbors used to compute Δx and Δy. The sharpest intensity boundaries are shown in the first column 904. In these cases, the magnitude of the gradient is at least 127.5 and, for the third case 906, 180.3. A relatively small difference across an edge, shown in example 908, produces a gradient with a magnitude of only 3.9. In all cases, the gradient vector is perpendicular to the apparent direction of the intensity edge through the central pixel.

Figure 10:
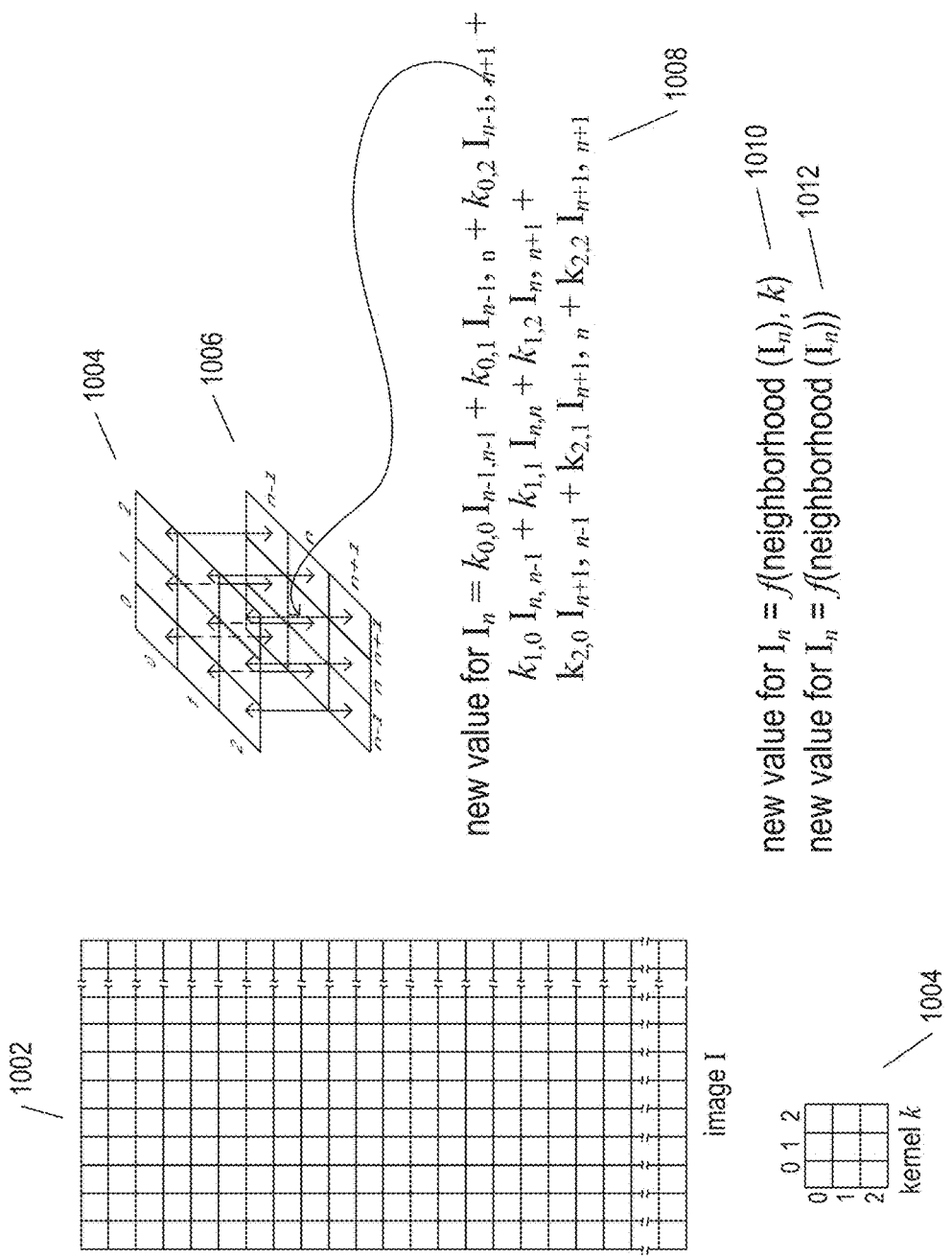
FIG. 10 illustrates application of a kernel to an image.

Many image-processing methods involve application of kernels to the pixel grid that constitutes the image. FIG. 10 illustrates application of a kernel to an image. In FIG. 10, a small portion of an image I 1002 is shown as a rectilinear grid of pixels. A small 3×3 kernel k 1004 is shown below the representation of image I 1002. A kernel is generally applied to each pixel of an image to carry out a kernel-based processing operation on the image. In the case of a 3×3 kernel, such as kernel k 1004 shown in FIG. 10, a modified kernel may be used for edge pixels or the image can be expanded by copying the intensity values in edge pixels to a circumscribing rectangle of pixels so that the kernel can be applied to each pixel of the original image. To apply the kernel to an image pixel, the kernel 1004 is computationally layered over a neighborhood of the pixel 1006 within the image having the same dimensions, in pixels, as the kernel. Application of the kernel to the neighborhood of the pixel to which the kernel is applied produces a new value for the pixel in a transformed image produced by the kernel-based operation. For certain types of kernels and kernel-based operations, the new value for the pixel to which the kernel is applied, $I_n$, is obtained as the sum of the products of the kernel value and pixel aligned with the kernel value 1008. In other cases, the new value for the pixel is a more complex function of the neighborhood about the pixel and the kernel 1010. In yet other types of image processing, a new value for a pixel is generated by a function applied to the neighborhood of the pixel, without using a kernel 1012.

Figure 11:
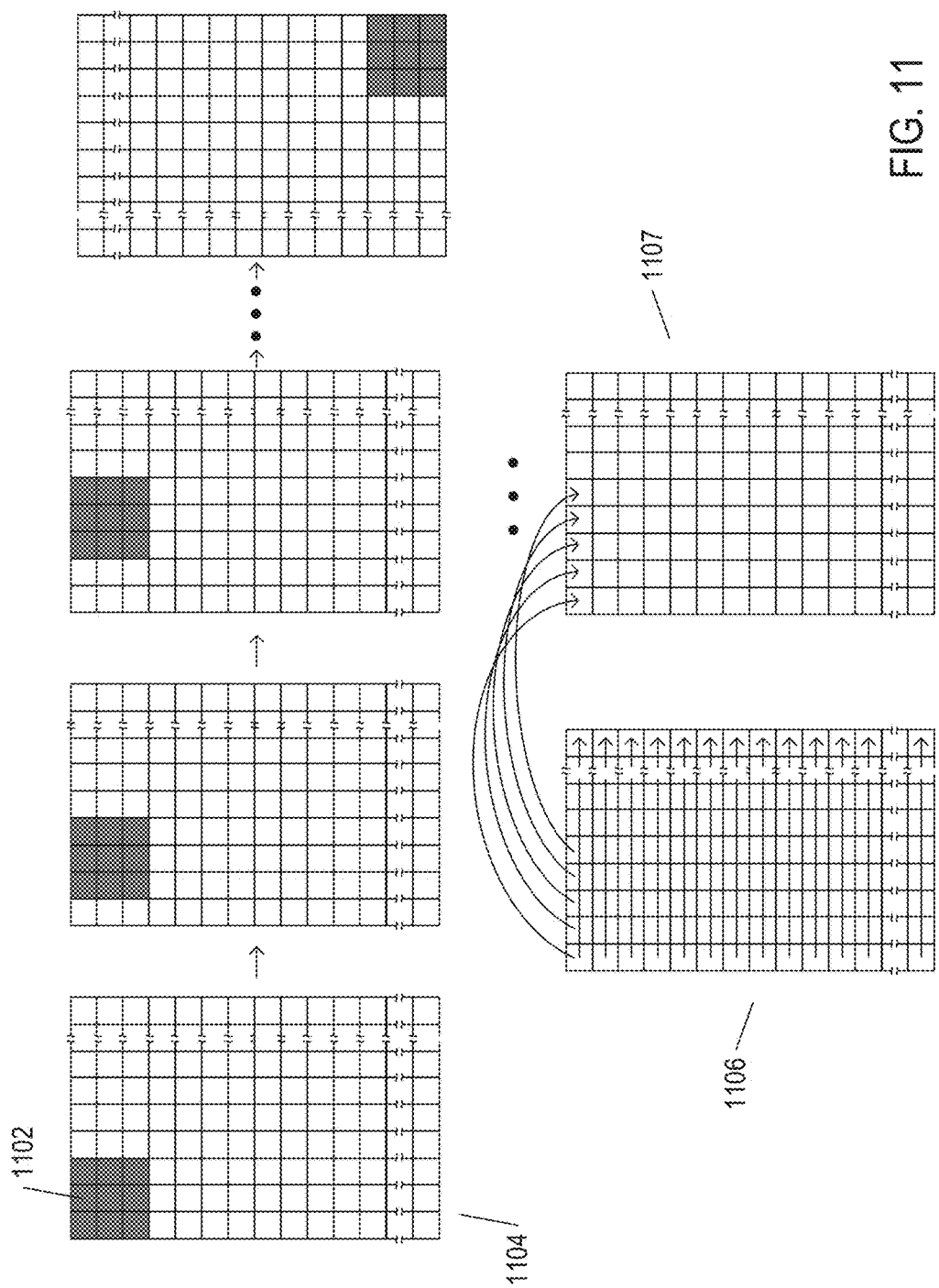
FIG. 11 illustrates convolution of a kernel with an image to produce a transformed image.

FIG. 11 illustrates convolution of a kernel with an image to produce a transformed image. In general, the kernel is sequentially applied to each pixel of an image. In some cases, the kernel is applied only to each non-edge pixel of an image. In FIG. 11, a 3×3 kernel, shown by shading 1102, is sequentially applied to the first row of non-edge pixels in an image 1104. Each new value generated by application of a kernel to a pixel in the original image 1106 is then placed into the transformed image 1107. In other words, the kernel is sequentially applied to the original neighborhoods of each pixel in the original image to produce the transformed values of the pixels included in the transformed image. This process is referred to as "convolution" and is somewhat related to the mathematical convolution operation computed by multiplying Fourier-transformed images and then carrying out an inverse Fourier transform on the product.

Figure 12:
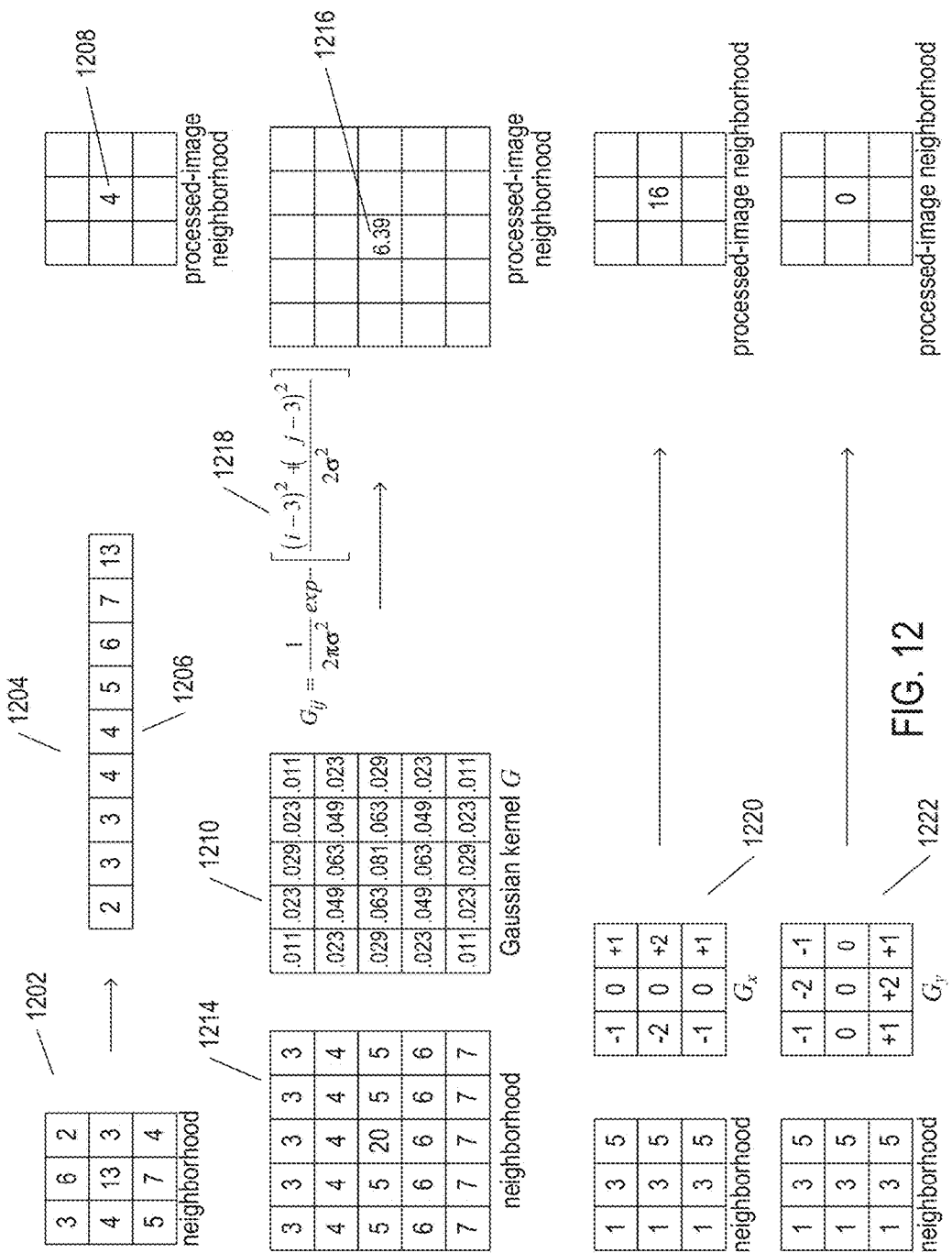
FIG. 12 illustrates example kernel and kernel-like image-processing techniques.

FIG. 12 illustrates example kernel and kernel-like image-processing techniques. In the process referred to as "median filtering," the intensity values of a pixel and the pixels in a neighborhood of the pixel in the original image 1202 are sorted 1204 in ascending-magnitude order and the median value 1206 is selected as the value 1208 for the pixel in the transformed image. Gaussian smoothing and denoising involves applying a Gaussian kernel 1210 to each neighborhood 1214 of the original image to produce the value for the central pixel of the neighborhood 1216 in the corresponding neighborhood of the processed image. The values in the Gaussian kernel are computed by an expression, such as expression 1218, to produce a discrete representation of a Gaussian surface, above the neighborhood, formed by rotation of a bell-shaped curve about a vertical axis coincident with the central pixel. The horizontal and vertical components of the image gradient for each pixel is estimated by application of the corresponding $G_x$ 1220 and $G_y$ 1222 gradient kernels. These are only three of the many different types of convolution-based image-processing techniques.

Methods and Systems to which the Current Document is Directed

Figure 13A:
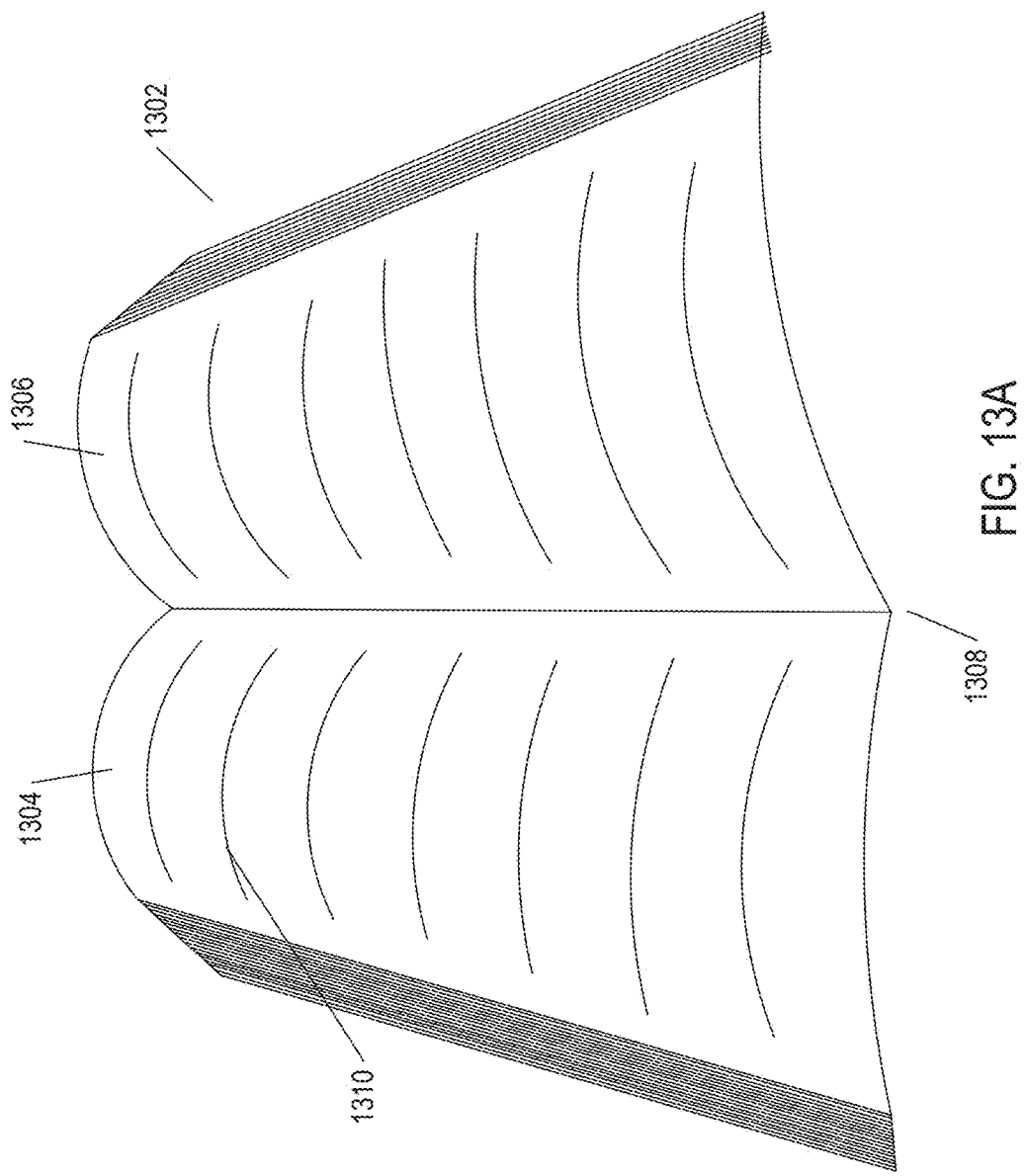
FIG. 13A illustrates one implementation of the method to which the current document is directed.
Figure 13B:
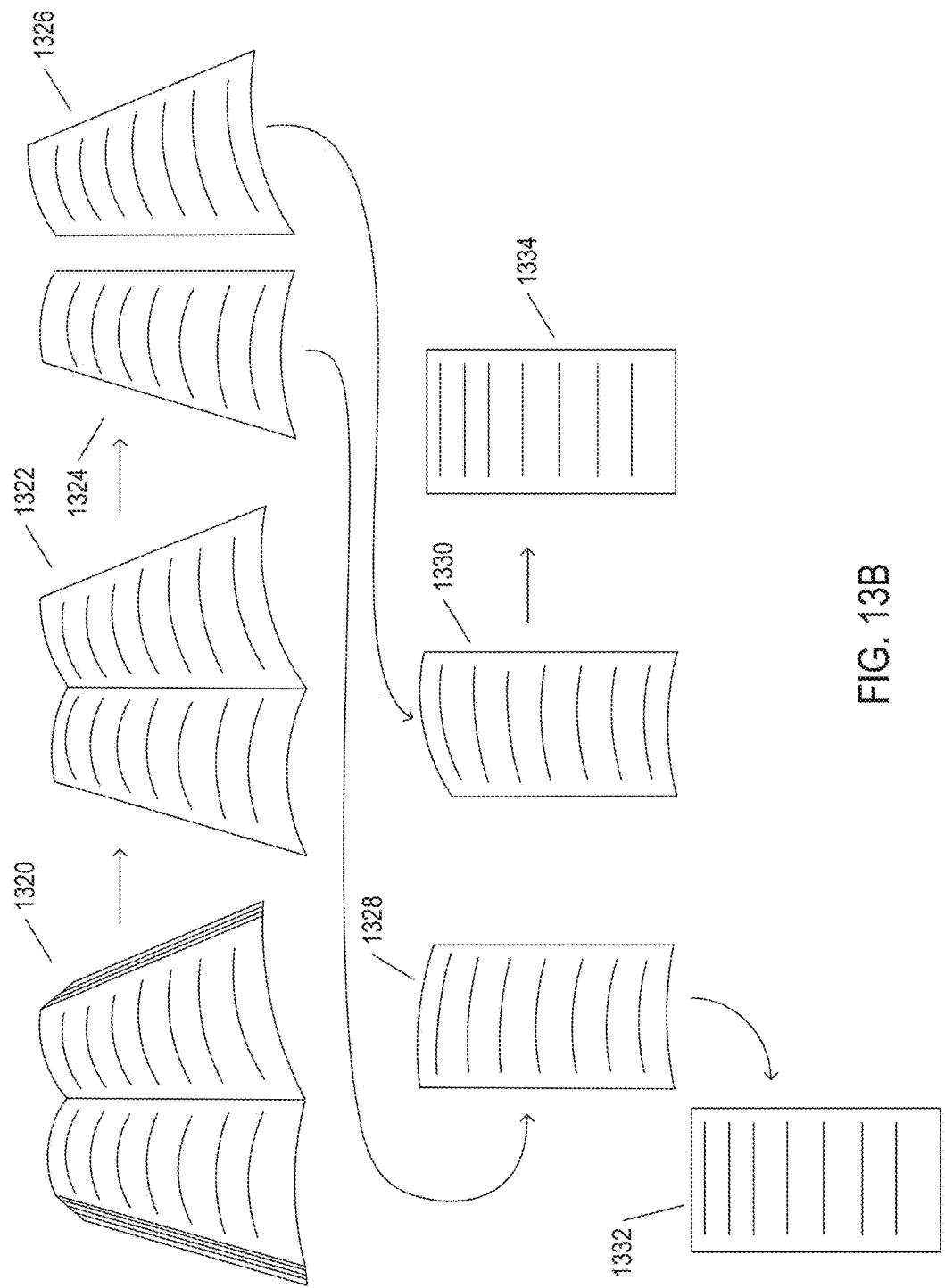
FIG. 13B illustrates one implementation of the method to which the current document is directed.

FIGS. 13A-B illustrate one implementation of the method to which the current document is directed. This implementation specifically addresses text-line curvature in images of open books. However, the same method or similar methods can be used to ameliorate a wide variety of text-line curvature encountered in many different types of digital images that contain text.

FIG. 13A shows an open book. The open book 1302 has two exposed pages 1304 and 1306. Because the pages are anchored along the spine of the book 1308, when the book is opened and placed cover-down on a surface, the pages arc up and away from the spine, curving the page surfaces. In an image of the open book acquired by a digital camera, the text lines, such as text line 1310, are therefore curved, not only because the page surfaces are actually curved, but also because of perspective-induced curvature. However, were the page flattened and viewed from above, the text lines would appear to be linear and the symbols and words contained in the text lines would appear to be arranged in a familiar rectilinear pattern. When text lines are curved and distorted due to perspective and to curvature in the pages of an open book, the characters and symbols within the text lines are distorted and nonlinearly compressed, which significantly complicates automated optical-character recognition of the characters and symbols in a text image.

FIG. 13B illustrates processing steps undertaken by the currently disclosed method to process the image of the open book, discussed above with reference to FIG. 13A. The image of the open book 1320 is processed in a first step to isolate only the portion of the image corresponding to the two pages of the book 1322. In a next step, separate images are prepared for each of the two pages 1324 and 1326. In each of these two single-page images, the page is rotated, when not vertically oriented in the original image 1320, to be vertically oriented. In a next step carried out on each of the two images 1324 and 1326, the single-page image is processed so that the non-spine-adjacent edge of the page is also vertically oriented, or parallel to the spine-adjacent edge, producing images 1328 and 1330. In a final step, the curved top and bottom edges of each image are straightened, along with the text lines within the page, to produce final processed images 1332 and 1334 in each of which the page appears to be rectangular, as if acquired from directly above a centroid of the page with the optical axis of the imaging device normal to the page. There are many additional operations that can be performed, including rescaling, sharpening, and other image-processing operations that further improve the page image for optical character recognition.

Figure 14A:
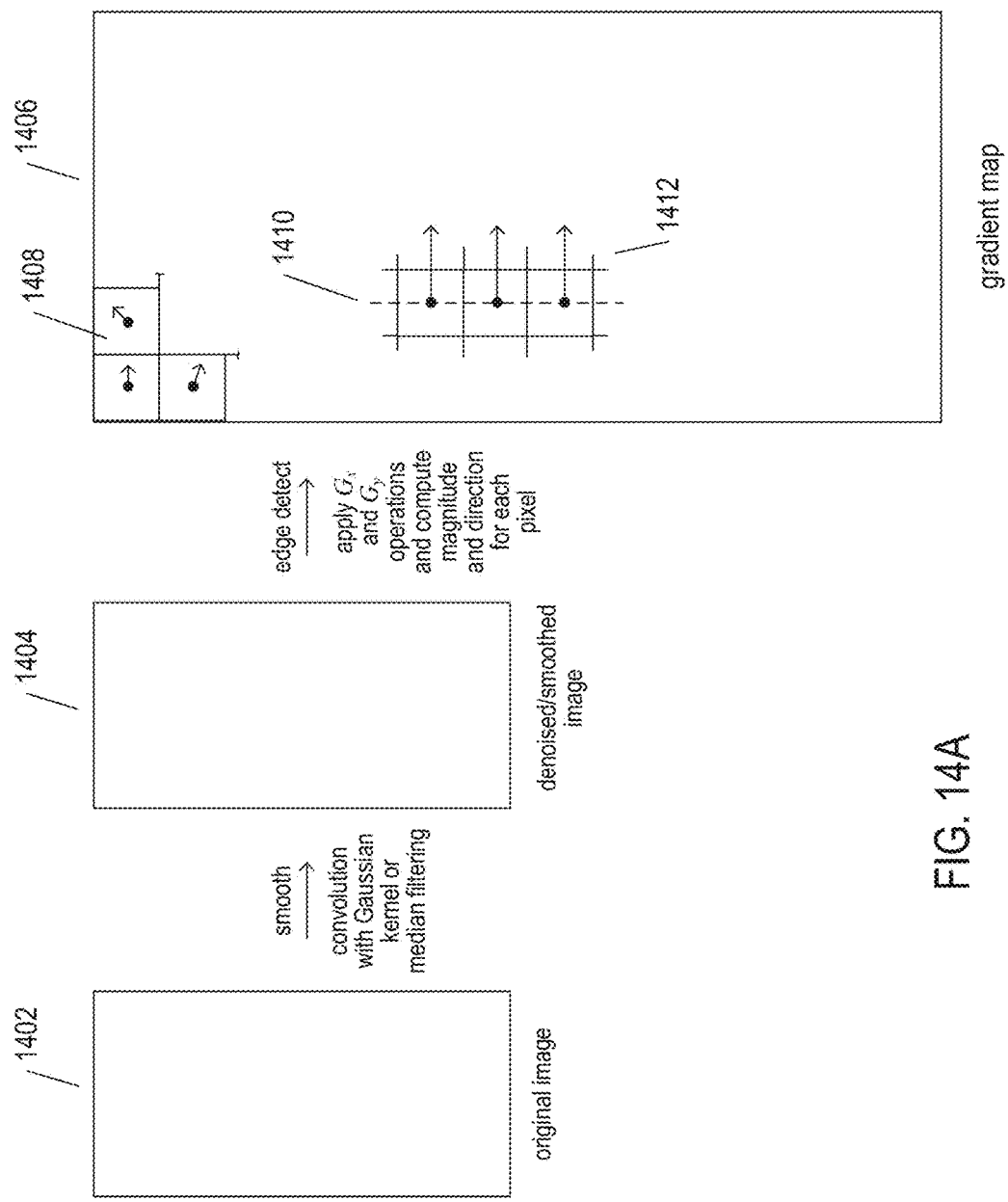
FIG. 14A illustrates initial processing of a page image in order to prepare for aligning the vertical edges of the page, as described above with reference to FIG. 13B.
Figure 14B:
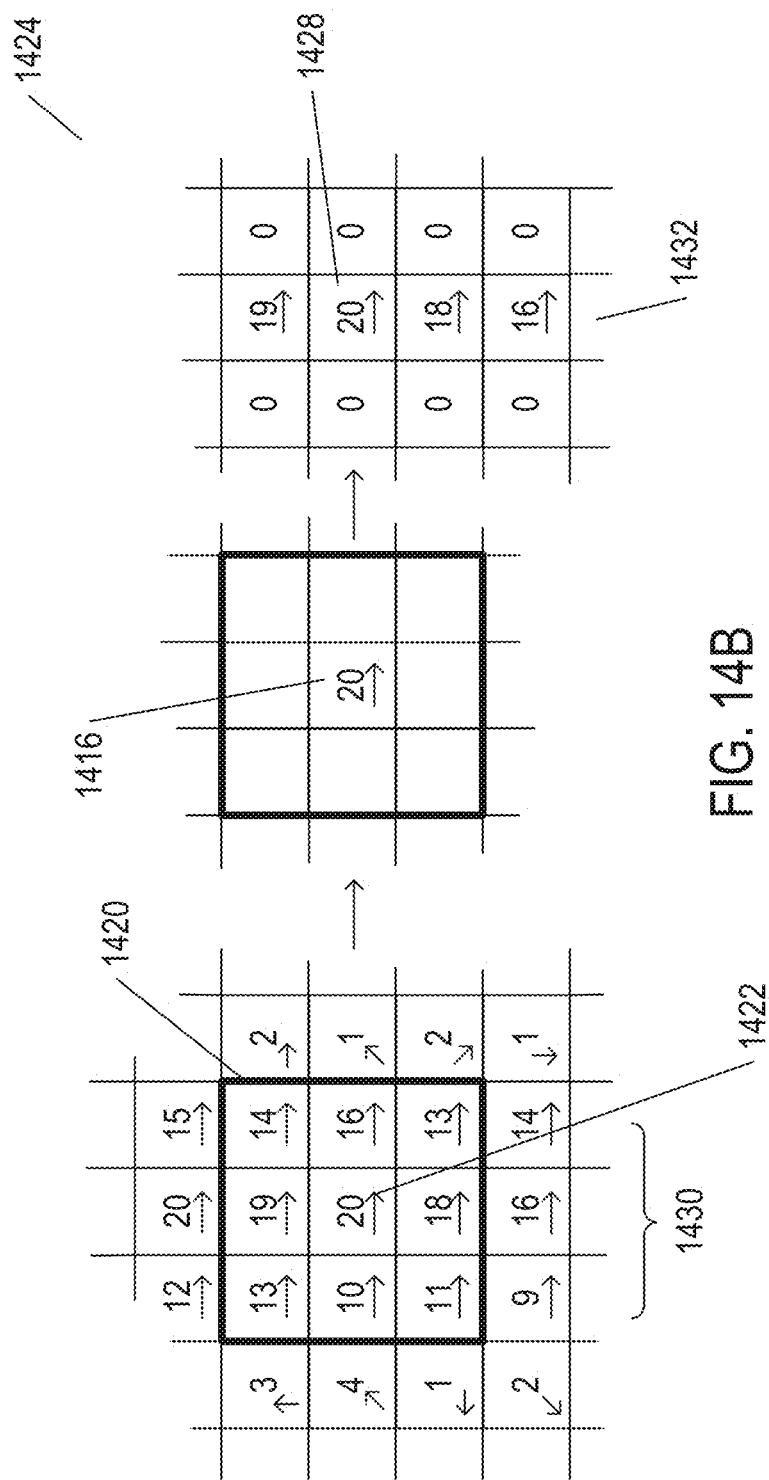
FIG. 14B illustrates initial processing of a page image in order to prepare for aligning the vertical edges of the page, as described above with reference to FIG. 13B.
Figure 14C:
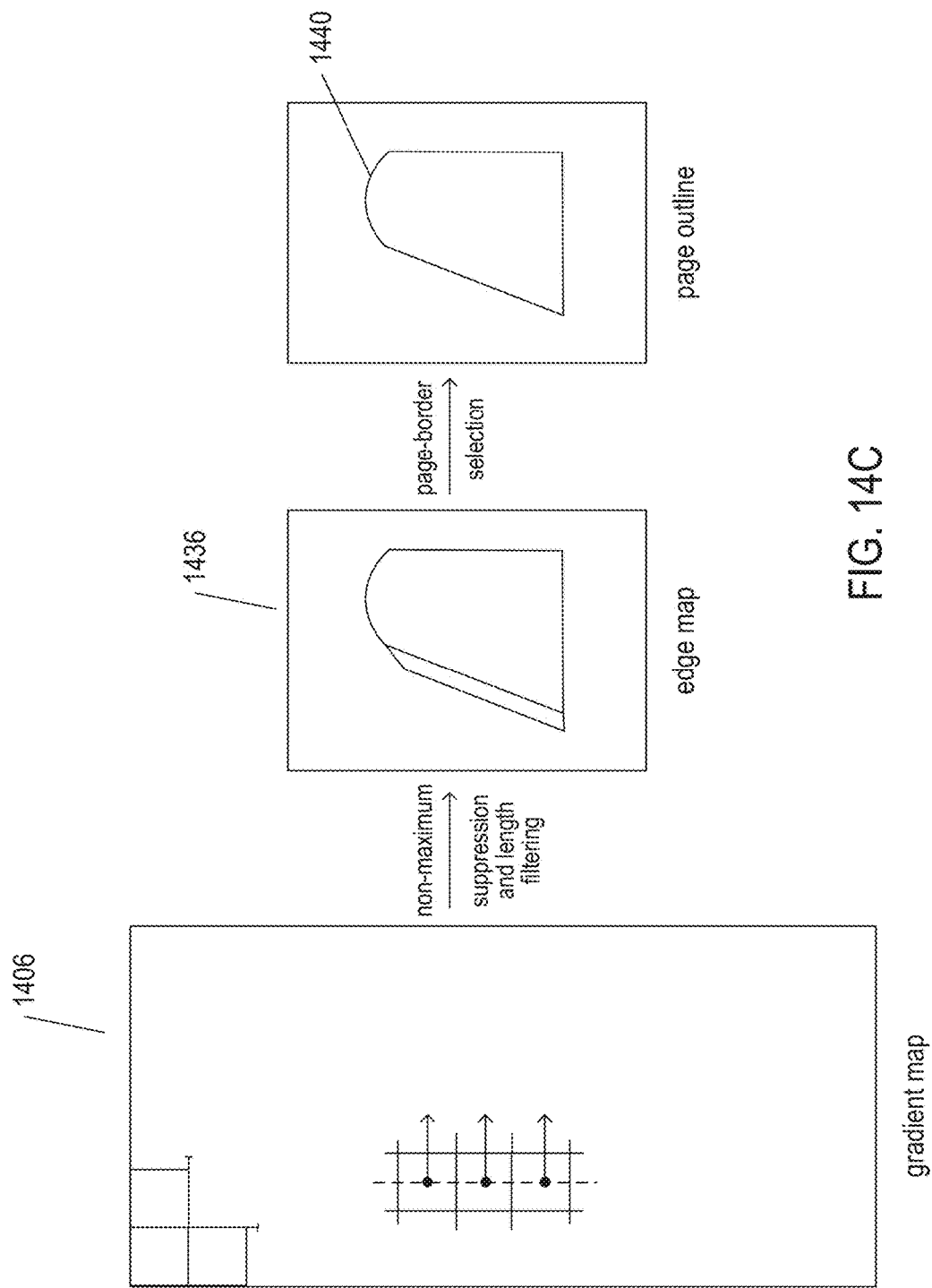
FIG. 14C illustrates initial processing of a page image in order to prepare for aligning the vertical edges of the page, as described above with reference to FIG. 13B.

FIGS. 14A-C illustrate initial processing of a page image in order to prepare for aligning the edges of the page parallel to the spine, as described above with reference to FIG. 13B. As shown in FIG. 14A, the original page image 1402 is convolved with a Gaussian kernel, or a median-filtering technique is applied to the image, to produce a denoised and smoothed image 1404. Then, the two gradient kernels $G_x$ and $G_y$ are separately applied to the denoised and smoothed image to produce two gradient-component maps from which a gradient map 1406 is obtained, as discussed above with reference to FIGS. 7-9. In the gradient map, each pixel, such as pixel 1408, is associated with a gradient direction and a gradient magnitude. Edges, such as the outline of a page in a page image, can be detected from the gradient map as a line or curve of pixels with associated gradient vectors having similar orientations, having directions perpendicular to the line or curve, and having relatively large magnitudes. For example, as shown in FIG. 14A, a vertical edge 1410 within the image would correspond to a column 1412 of pixels in the gradient map with large-magnitude vectors pointing in the same direction and perpendicular to the edge. Gradient-magnitude thresholding and various continuity-based techniques can be employed to extract edges from the gradient map corresponding to intensity boundaries within the original image. Other well-known edge-detection methods are similarly applied, in alternative implementations, to detect edges in the page image.

As shown in FIG. 14B, a non-maximum-suppression technique applied as a function to pixel neighborhoods within the gradient map is employed to thin the edges so that well-defined edges can be extracted from the page image. In FIG. 14B, a 3×3 neighborhood 1420 about a central gradient-map cell or element 1422 is used to decide whether or not to retain the value of the central cell or element 1422 in a transformed image 1424. When the central pixel has the maximum magnitude along the gradient direction within the neighborhood 1426, then it is retained 1428 in the transformed gradient map produced by non-maximum suppression. Thus, non-maximum gradient magnitudes perpendicular to an edge are suppressed, or set to 0, in order to thin a multi-pixel edge 1430 in the original gradient map to a single-pixel edge 1432 in the transformed gradient map.

As shown in FIG. 14C, non-maximum suppression and edge-length filtering is applied to the gradient map 1406 in order to produce an edge map 1436 from which the outline of the page 1440 can be extracted using the edges in the edge map and additional geometrical and intensity characteristics of pages. The additional characteristics may include using color information from the original open-book image to differentiate text pixels from background pixels, using expected shapes and sizes of books and book pages, and other information to filter the page edges from other, additional intensity edges discovered during the edge-detection processing discussed above with reference to FIGS. 14A-B.

Figure 15A:
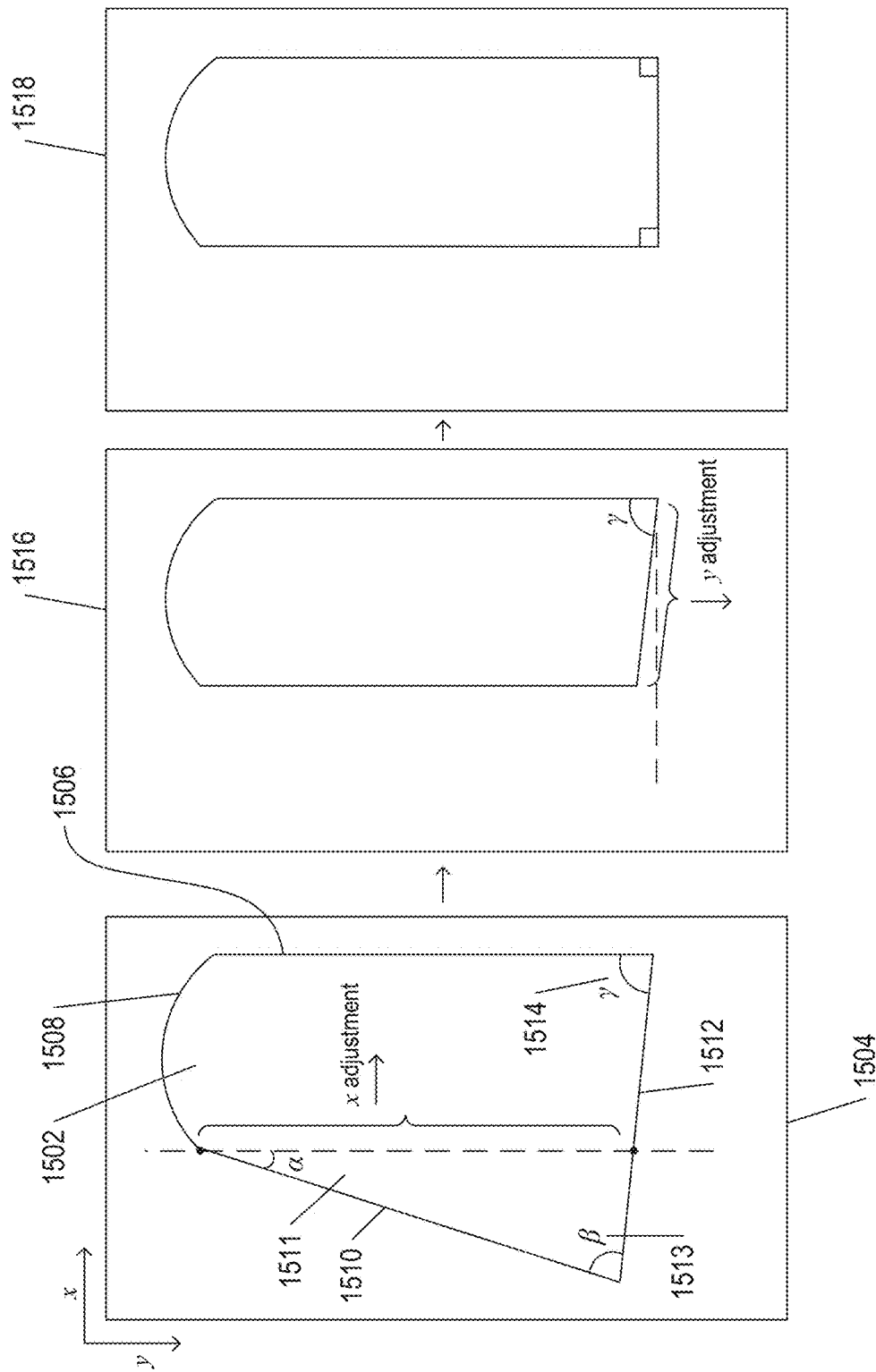
FIG. 15A illustrates one approach to page-edge alignment, discussed above with reference to FIG. 13B.
Figure 15B:
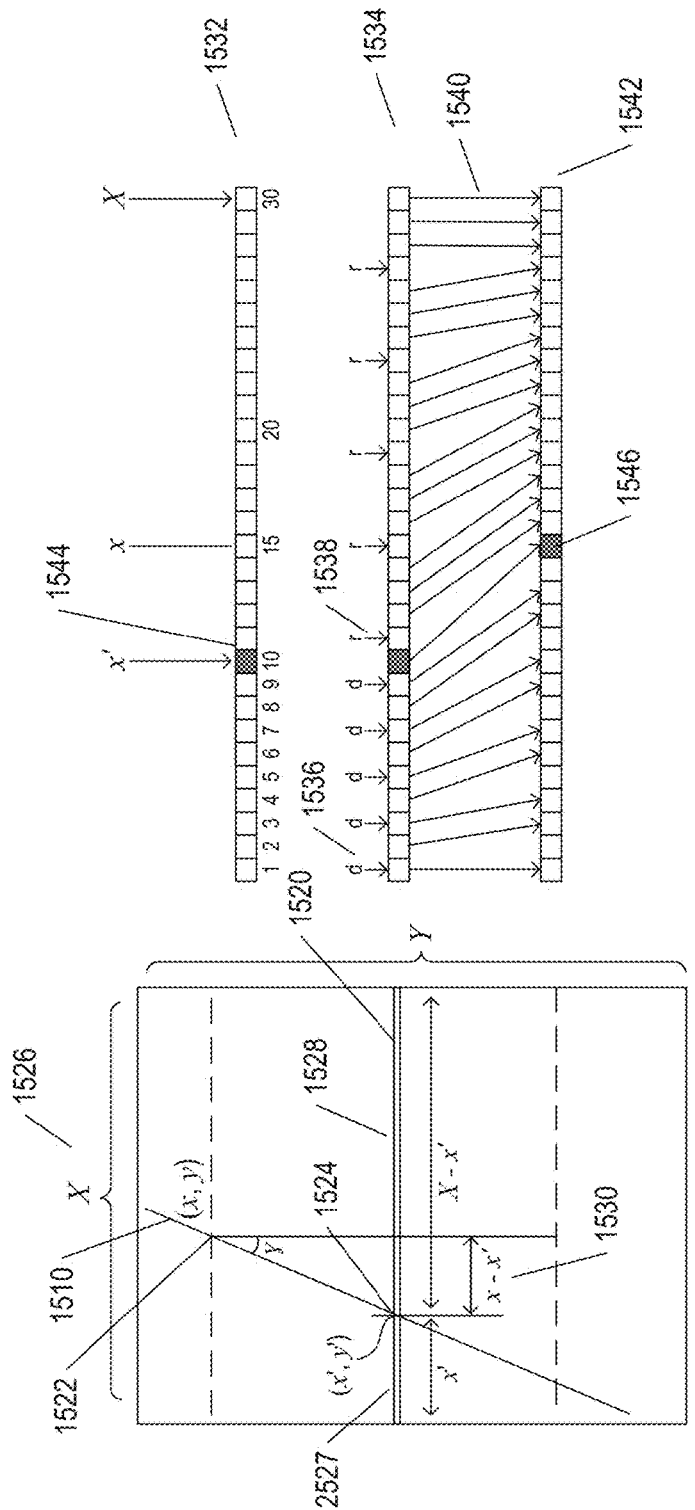
FIG. 15B illustrates one approach to page-edge alignment, discussed above with reference to FIG. 13B.

FIGS. 15A-B illustrate one approach to vertical-page-edge alignment, or correction of the vertical perspective of the page, discussed above with reference to FIG. 13B. As shown in FIG. 15A, the page outline extracted from the non-maximum-suppressed gradient map is superimposed over the original page image to identify the page 1502 within the page image 1504. The page image is then rotated so that the spine-adjacent edge 1506 of the page is vertical. At this point in the process, the top 1508 and bottom 1512 edges of the page are generally curved, the edge of the page parallel, but not adjacent, to the spine 1510 may be inclined with respect to the vertical direction by an angle α 1511, and the bottom edge of the page 1512 may be oriented with respect to edge 1510 by an angle β 1513 and inclined from the vertical direction by an angle γ 1514. In a first step, pixels within the image are shifted in order to adjust the non-spine edge to a vertical orientation, as shown in intermediate image 1516, and, in a second step, pixels are reorganized within the image in order to adjust the bottom edge 1512 to be horizontal 1518.

FIG. 15B illustrates one method for adjusting the orientation of a page edge. FIG. 15B illustrates the adjustment of the edge parallel, but not adjacent, to the spine so that it has a vertical orientation. Each horizontal line of pixels in the image is adjusted. For the horizontal line of pixels 1520, FIG. 15B shows a number of values obtained from the geometry of edge 1510 within the text image. The top corner of the page 1522 has coordinates (x,y). The intersection 1524 of the horizontal line of pixels 1520 and edge 1510 has coordinates (x',y'). The width of the page has a value X 1526. The point 1524 divides the horizontal line of pixels into two sections, one of length x' 1527 and the other of length X-x' 1528. In order to adjust the horizontal lines of pixels 1520 to bring edge 1510 to a vertical orientation, x-x' pixels 1530 need to be removed from the second portion 1528 of the horizontal line and the same number of pixels need to be added to the first portion 1527 of the horizontal pixel line. The horizontal pixel line 1532 is again shown on the right-hand, top portion of FIG. 15B. In a replicated depiction 1534, small vertical arrows labeled with the letter "d," such as arrow 1536, indicate pixels that are doubled within the first portion of the line of pixels and small vertical arrows labeled with the letter "r," such as arrow 1538, indicate pixels to be removed from the second portion of the line of pixels. Longer arrows, such as arrow 1540, illustrate a mapping between the pixels in the original horizontal pixel line 1532 and in a transformed horizontal pixel line 1542 following the pixel-doubling and pixel-deletion operations. As can be seen by comparing the original horizontal line of pixels 1534 with the transformed horizontal line of pixels 1542, the pixel intensity value at the position x' in the original line of pixels, indicated by shading 1544, is shifted to the right 1546 in the transformed horizontal pixel line 1542. The intensities of pixels added to the first portion of the pixel line and the intensities of the two pixels adjacent to each pixel removed from the second portion of the line of pixels may be modified to avoid sharp discontinuities in pixel-intensity gradients. As shown in FIG. 15B, pixels are doubled and removed at fixed intervals across the line of pixels, to avoid local distortions. Many other techniques and variations on the technique illustrated in FIG. 15B can be used to adjust the orientation of a page edge within the page image, in alternative implementations, or to correct the vertical perspective of the page. In certain cases, for example, the page edge may not be visible in the original image, so that other signposts or landmarks within the image are employed to carry out an equivalent operation, without the use of the page edge. The illustrated method is slightly modified to adjust the edge parallel, but not adjacent, to the spine in the image of the opposite page in a two-page book image.

Figure 16B:
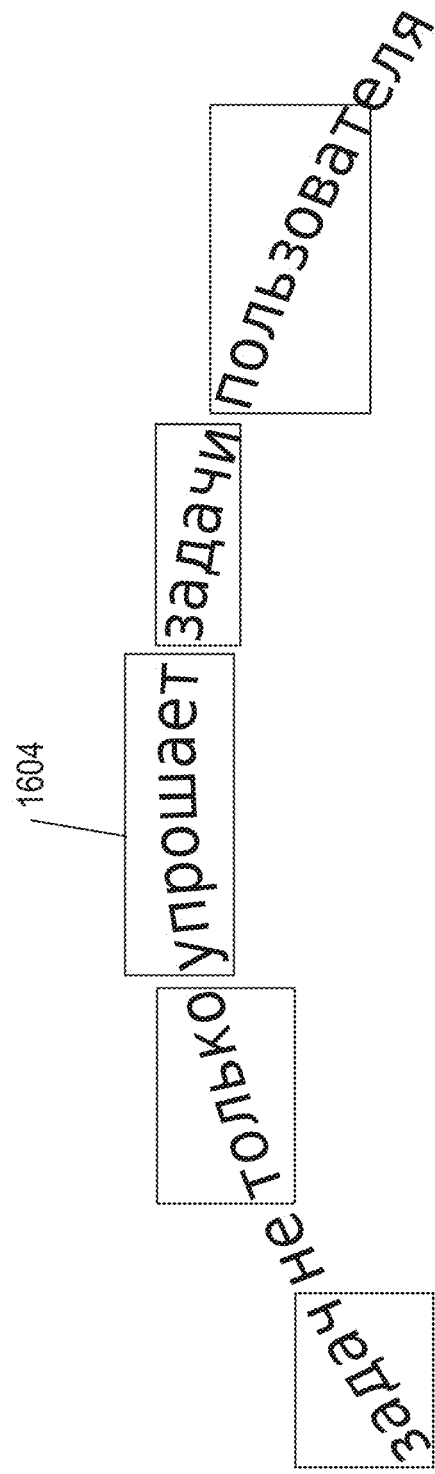
FIG. 16B illustrates fragment blocking.
Figure 16C:
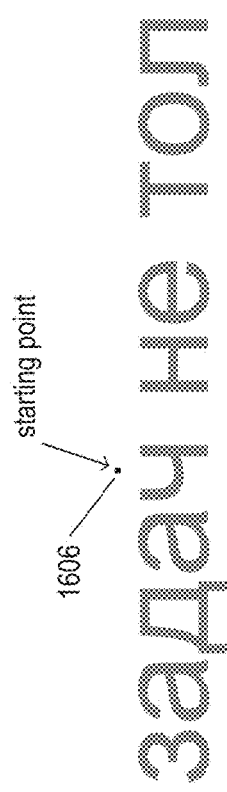
FIG. 16C illustrates fragment blocking.
Figure 16D:
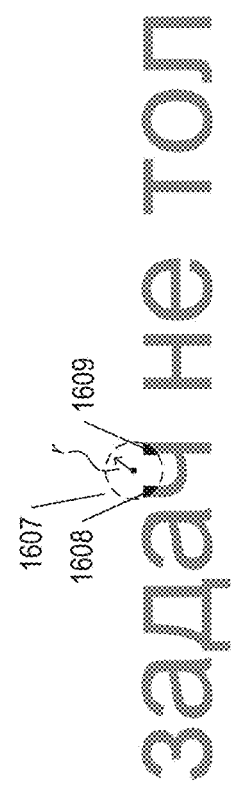
FIG. 16D illustrates fragment blocking.
Figure 16E:
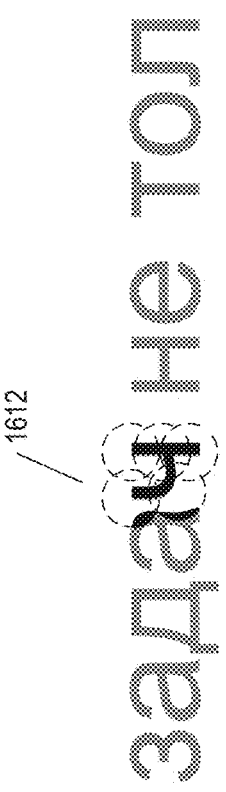
FIG. 16E illustrates fragment blocking.
Figures 16F, 16G:
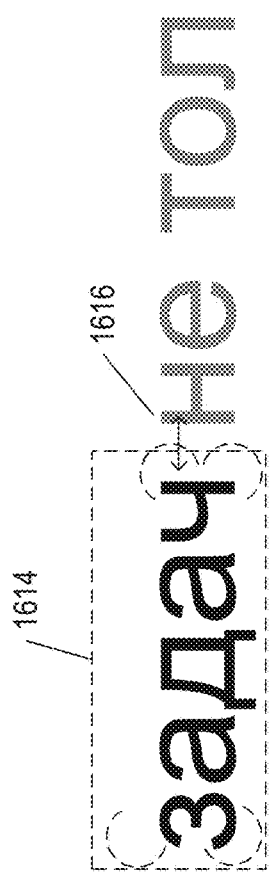
FIG. 16F illustrates fragment blocking.
FIG. 16G illustrates fragment blocking.

FIGS. 16A-G illustrate fragment blocking. As shown in FIG. 16A, a line of text 1602 within a page image may be curved. In a first step of fragment blocking, as shown in FIG. 16B, words, word fragments, and/or other collections of contiguous symbols and characters within a text line are recognized by an approach not based on computationally intensive optical-character-recognition techniques. In certain implementations, fragment recognition is carried out on a binary version of a page image, with pixels contained in characters or symbols, referred to as character pixels, assigned one of two values and the non-character pixels assigned to other of the two values. As discussed below, the differentiation between character and non-character pixels can be made by using an intensity threshold or by more complex processes. In FIG. 16B, each of the identified fragments, and fragments of multiple words is shown within a rectangle, such as rectangle 1604. In the following discussion, the term "fragment" is used to describe symbol aggregations that include words, word fragments, and aggregated fragments of multiple words. One possible non-character-recognition approach to identifying words, word fragments, and other collections of symbols and characters within a page image is illustrated in FIGS. 16C-G. In a first step, as shown in FIG. 16C, a number of starting points, or seed points, are distributed throughout the page image. In FIG. 16C, an initial starting point 1606 lies above a final character of a word. From the initial starting point, a search of a disk-like space of radius r 1607 is made in order to find any character pixels within the disk-like area. Character pixels may be identified as pixels having less than a threshold intensity value, for text images in which the characters are black on a white or light background. In FIG. 16D, two small regions 1608 and 1609 of the final character in the word, shown shaded in FIG. 16D, include character pixels within in the disk-shaped area and form the nucleus of a word or word fragment. As shown in FIG. 16E, similar searches are undertaken from the character pixels identified in the previous search iteration 1612 and the process continues, as shown in FIG. 16F. Finally, as shown in FIG. 16G, no additional character pixels can be found within a distance r from any of the pixels identified for the word or fragment, as a result of which the search ends and the fragment enclosed within the dashed rectangle 1614 becomes a recognized word or word fragment. Note that the distance r is selected to be significantly shorter than the average or typical distance s 1616 between words, in order to facilitate recognition of words and word fragments rather than aggregated words. However, in many cases, the non-character-recognition fragment search may end up returning fragments that contain portions of two or more words as well as aggregated words.

Figure 17A:
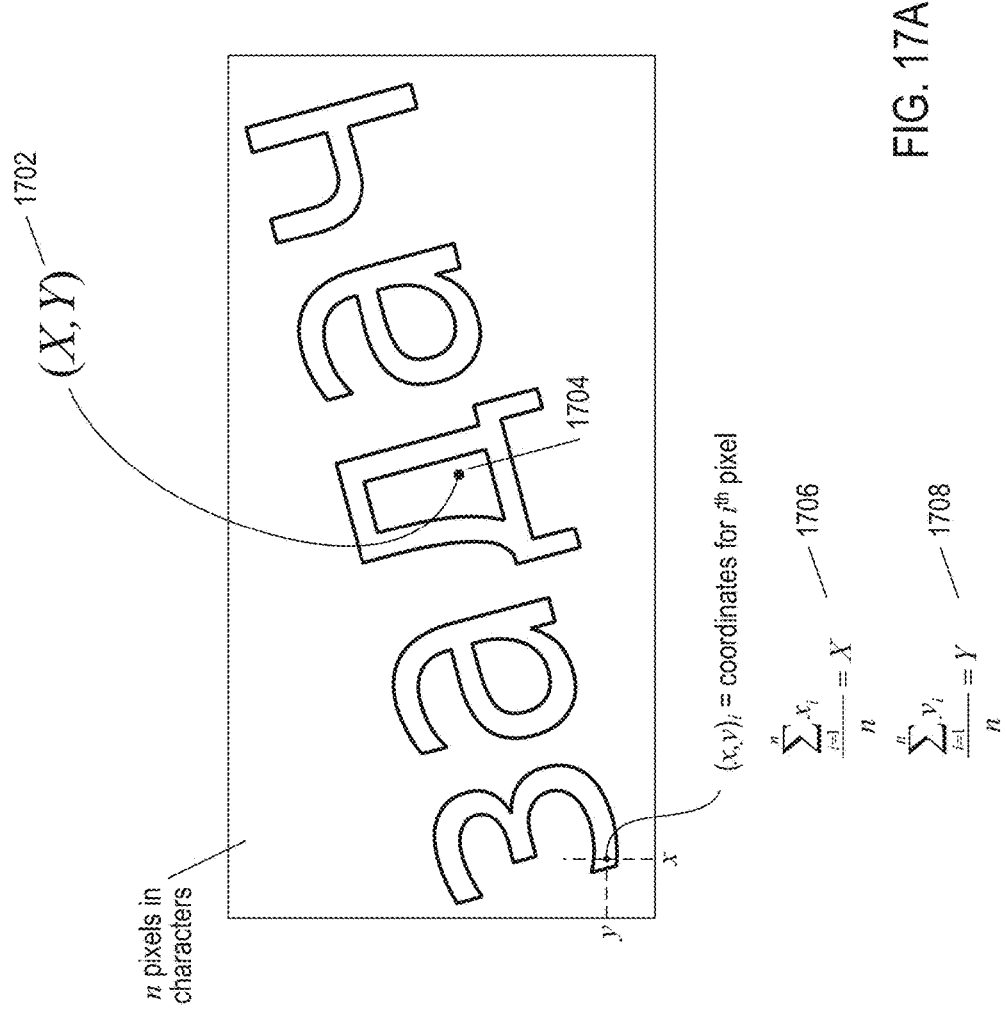
FIG. 17A illustrates the fragment-blocking process.
Figure 17B:
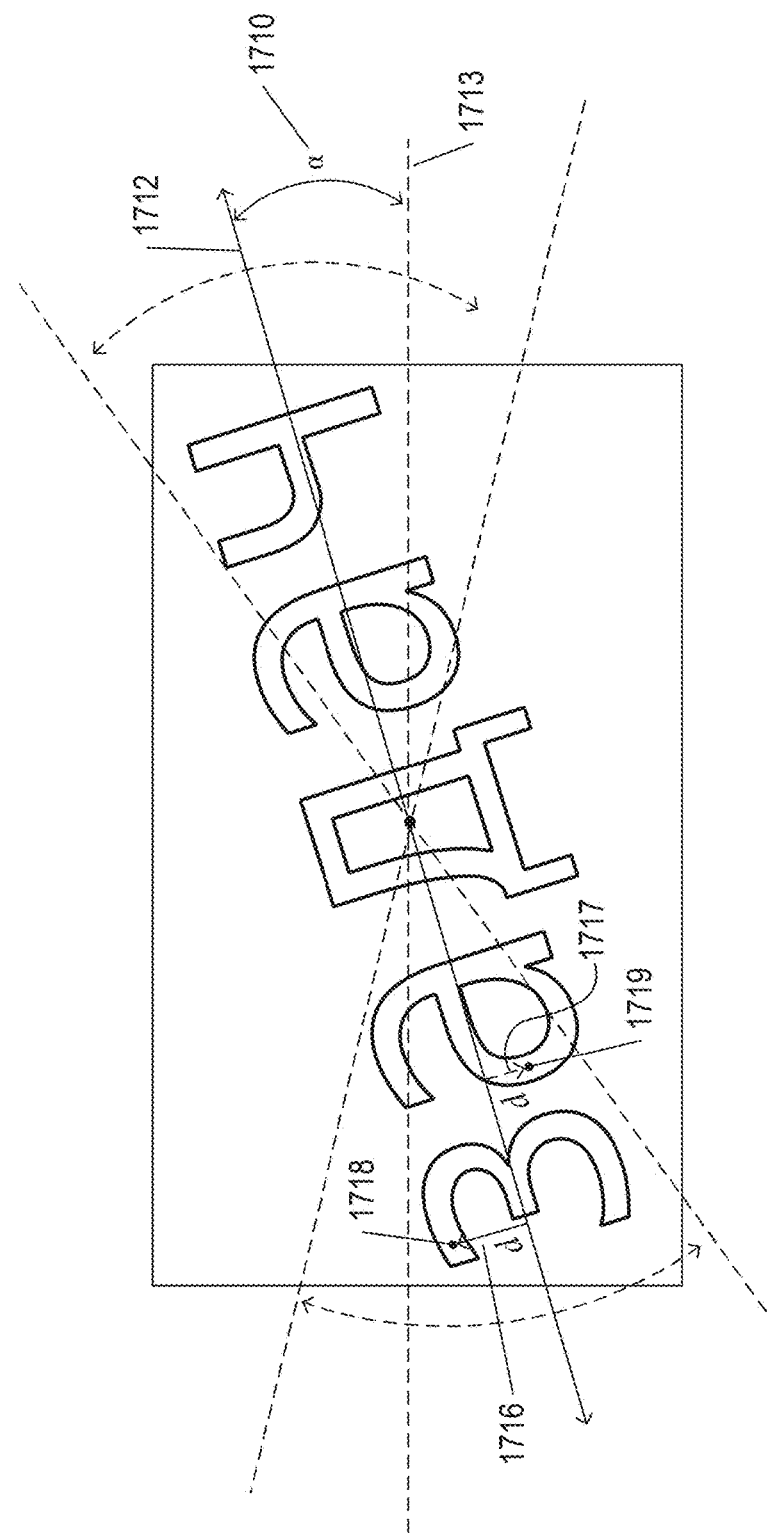
FIG. 17B illustrates the fragment-blocking process.

Next, the initially recognized fragments are blocked. FIGS. 17A-D illustrate the fragment-blocking process. As shown in FIG. 17A, the coordinates 1702 for the centroid 1704 of a fragment are easily computed as the average x coordinate 1706 and the average y coordinate 1708 for all character pixels i within the fragment. Then, as shown in FIG. 17B, the angle α 1710 of inclination of a principle axis 1712 of the fragment with respect to the horizontal direction 1713 can be computed as a minimization problem 1714 in which the angle α is chosen as the angle that minimizes the distances d 1716 and 1717 of all the character pixels, including character pixels 1718 and 1719, within the fragment.

Figure 17C:
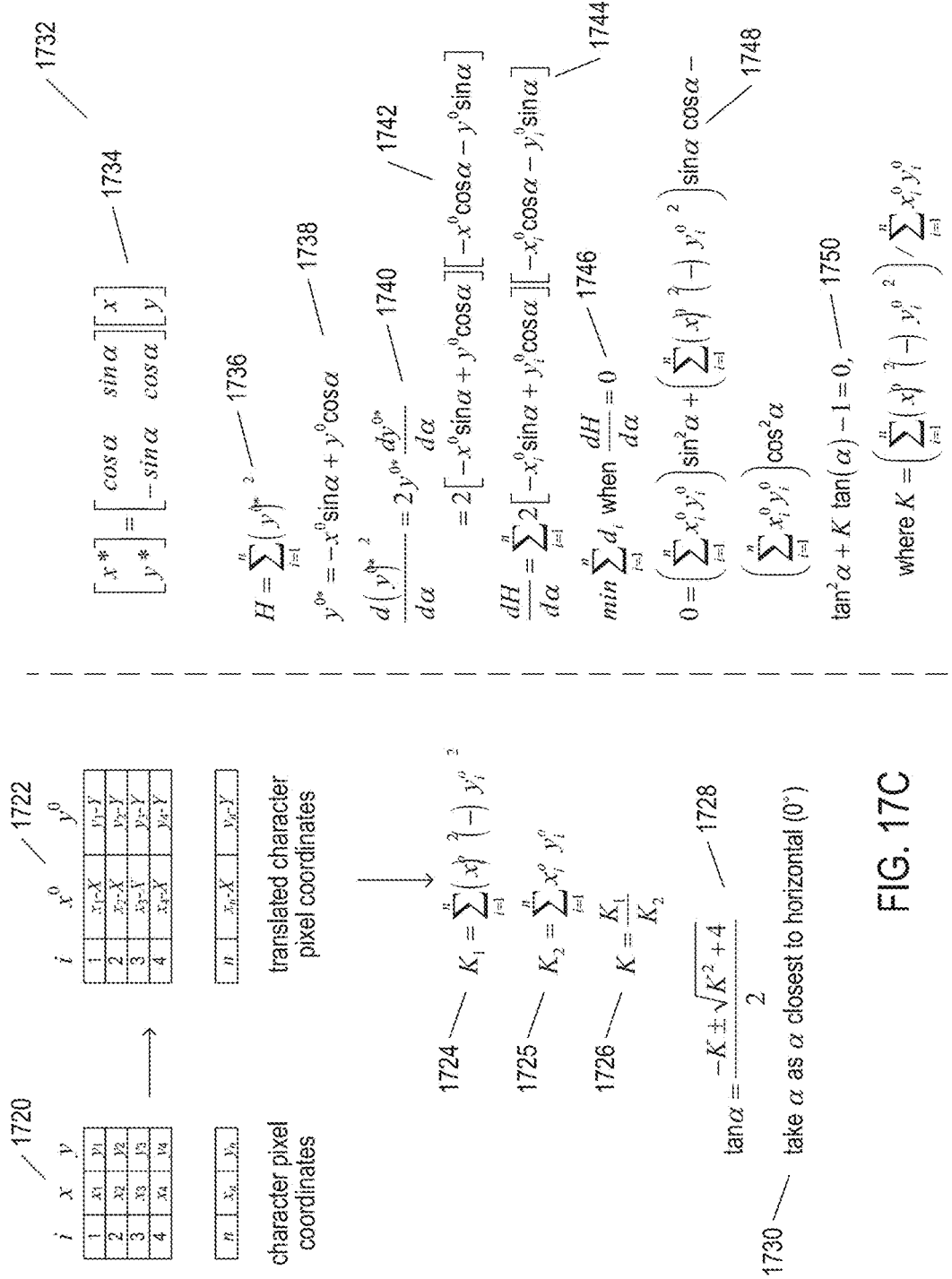
FIG. 17C illustrates the fragment-blocking process.
Figure 17D:
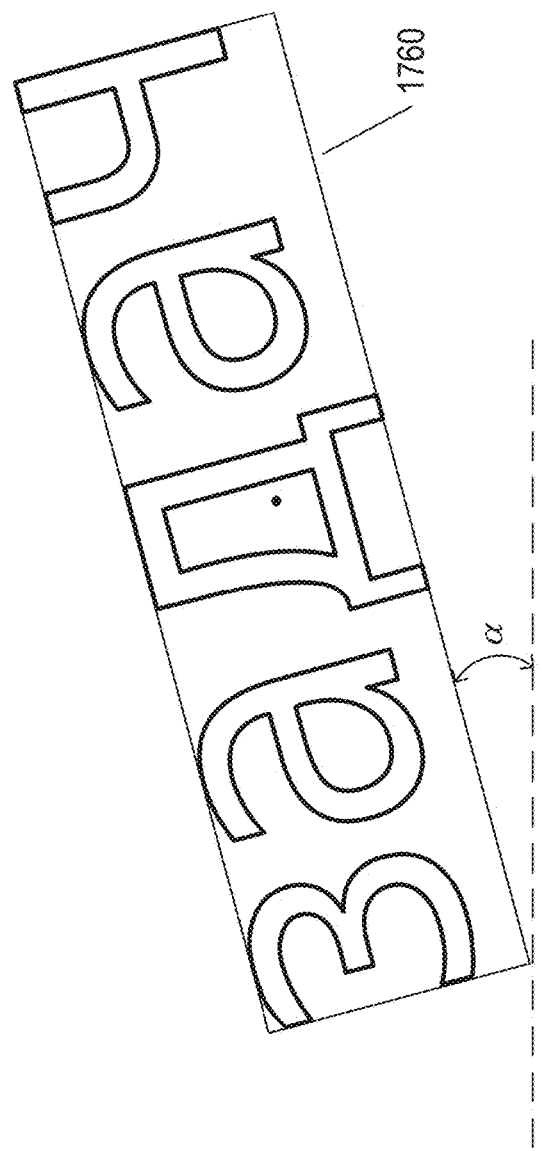
FIG. 17D illustrates the fragment-blocking process.

FIG. 17C illustrates one method for determining the inclination angle α. First, the character pixel coordinates are tabulated in table 1720. Next, the coordinates are translated to coordinates relative to the computed centroid with coordinates (X,Y) and tabulated in table 1722. From these translated coordinates, the three values $K_1$, $K_2$, and K are computed 1724-1726. The tangent of α is given by expression 1728. There are two possible angles given by expression 1728 corresponding to the two orthogonal principle axes of the word fragment. The inclination angle α is chosen as the angle of the two computed angles closest to the horizontal angle θ 1730. Alternatively, the angle representing the angle of the central axis of the fragment with respect to the horizontal direction may be chosen. On the right side of FIG. 17C 1732, a derivation is provided for this method. First, rotation of the fragment by an angle α transforms pixel coordinates according to multiplication of a rotation matrix and original-coordinate vector 1734. The value H is computed as the sum of the squared y coordinates for the character pixels 1736 as expressed in the transformed coordinates 1722. An expression for the coordinate $y^{0*}$ of a pixel following rotation of the pixel by an angle α about the centroid is computed from the matrix expression as expression 1738. The derivative of this expression with respect to the angle α is provided by expressions 1740 and 1742. The derivative of the value H with respect to the angle of rotation a is then provided by the expression 1744. The sum of the distances $d_i$ of the pixels from the principle axis is minimized when the derivative of H with respect to α is 0, as indicated by expression 1746. Solution of this expression 1748 produces a quadratic formula in a 1750. Expression 1728 is the solution of the quadratic formula. Once the centroid and angle of inclination α have been determined for a fragment, the fragment is enclosed in a minimal enclosing rectangle 1760, as shown in FIG. 17D. In alternative implementations, parallelograms or quadrilaterals may be used instead of rectangles. The angle of inclination of the main axis of the minimal enclosing rectangle to the horizontal is generally the computed angle α. In cases in which angle α is incorrectly chosen as that for a different principle axis, subsequent fragment filtering generally removes fragments with incorrectly chosen inclination angles.

Figure 18B:
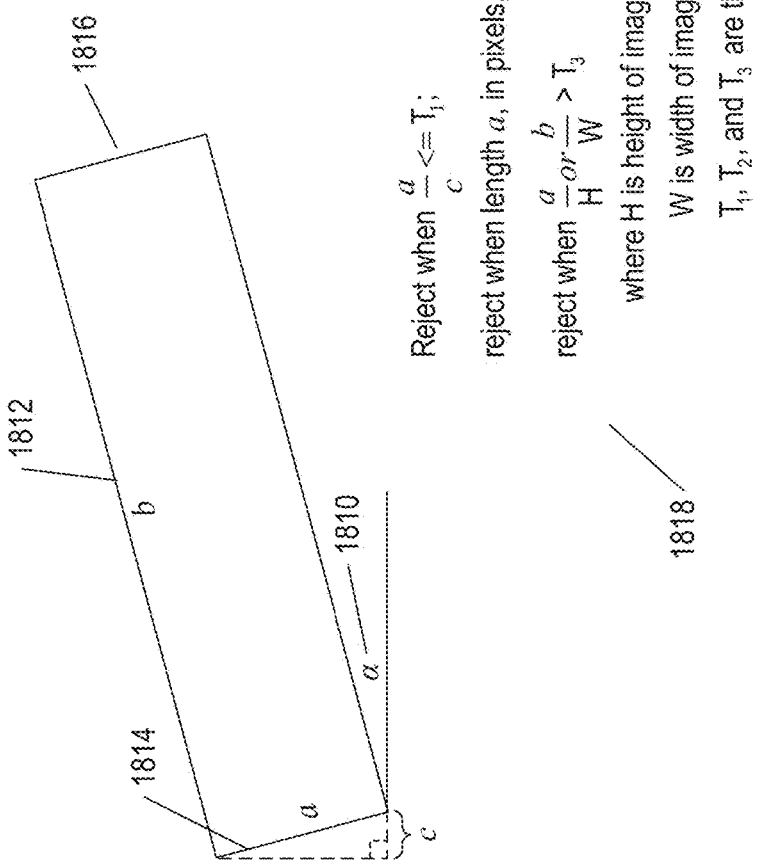
FIG. 18B illustrates a first filtering step applied to the initial blocked fragments obtained by the fragment-blocking method discussed with reference to FIGS. 17A-D.

FIGS. 18A-B illustrate a first filtering step applied to the initial blocked fragments obtained by the fragment-blocking method discussed with reference to FIGS. 17A-D. As diagrammatically indicated in FIG. 18A, a blocked-fragment filter is applied to the initial blocked fragments within the page image 1802 to remove undesirable blocked fragments and produce a set of filtered blocked fragments 1804. FIG. 18B shows one filter that may be applied to filter-blocked fragments. Each blocked fragment has an angle of inclination with respect to the horizontal α 1810, a long-side length b 1812, and a short-side length a 1814. The projection of side 1814 of length a onto the horizontal direction has a length c. The blocked fragment 1816 is rejected, or filtered, when the ratio of a to c is less than a first threshold $T_1$, when the length a is less than a second threshold $T_2$, and/or when the ratio of a to the height of the image or the ratio of b to the width of the image is greater than a third threshold $T_3$ 1818. The first filtering criteria is equivalent to rejecting the blocked fragment when α is greater than a threshold angle. Other filtering criteria may be employed to select the most suitable blocked fragments for generation of an initial model for the curvature of the page image, including requiring the lengths a and b to fall within certain ranges, requiring the area of the minimal enclosing rectangle to fall within a range, and other criteria.

Figure 19A:
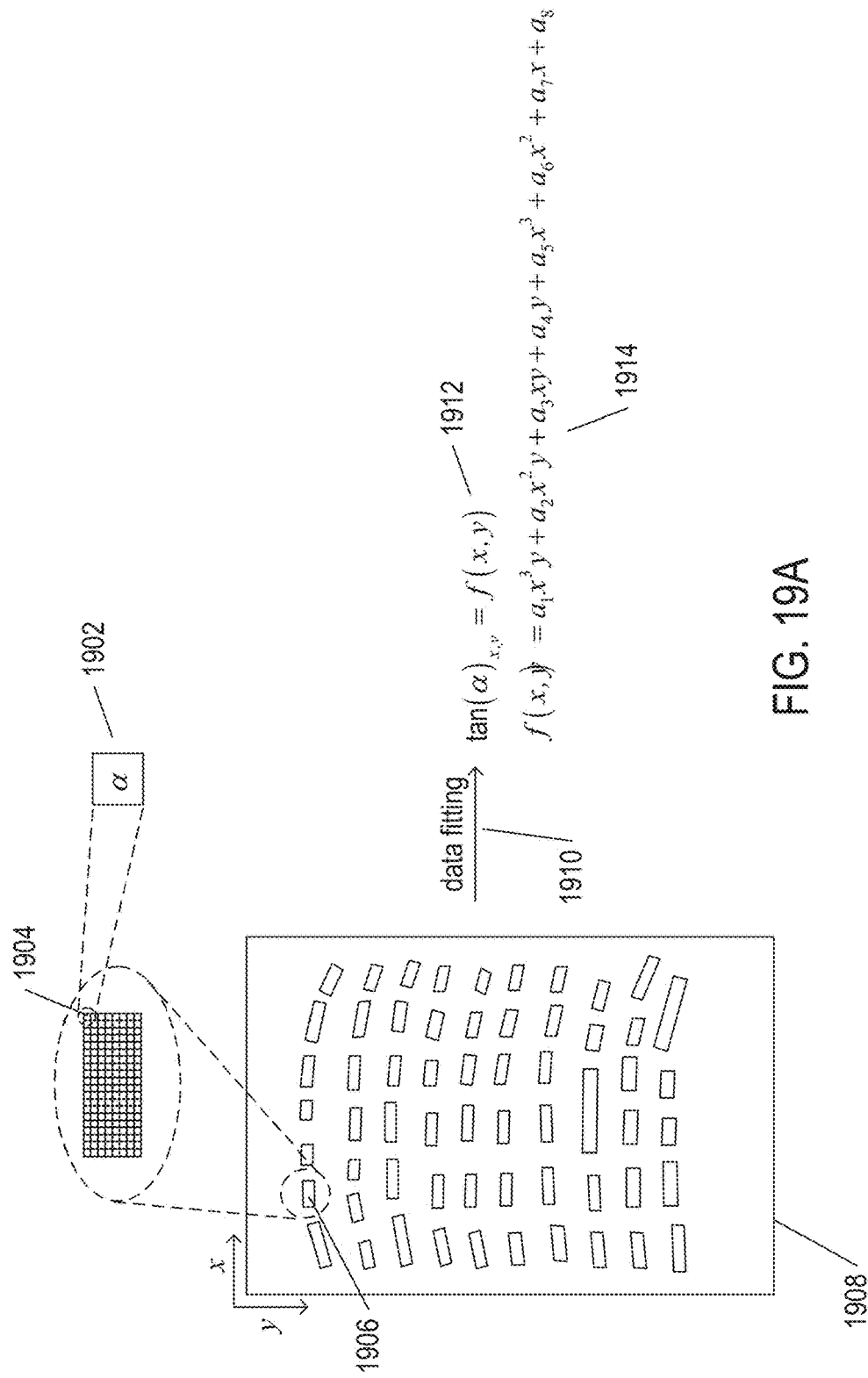
FIG. 19A illustrates generation of an initial model for the text-line curvature within a page-image.
Figure 19B:
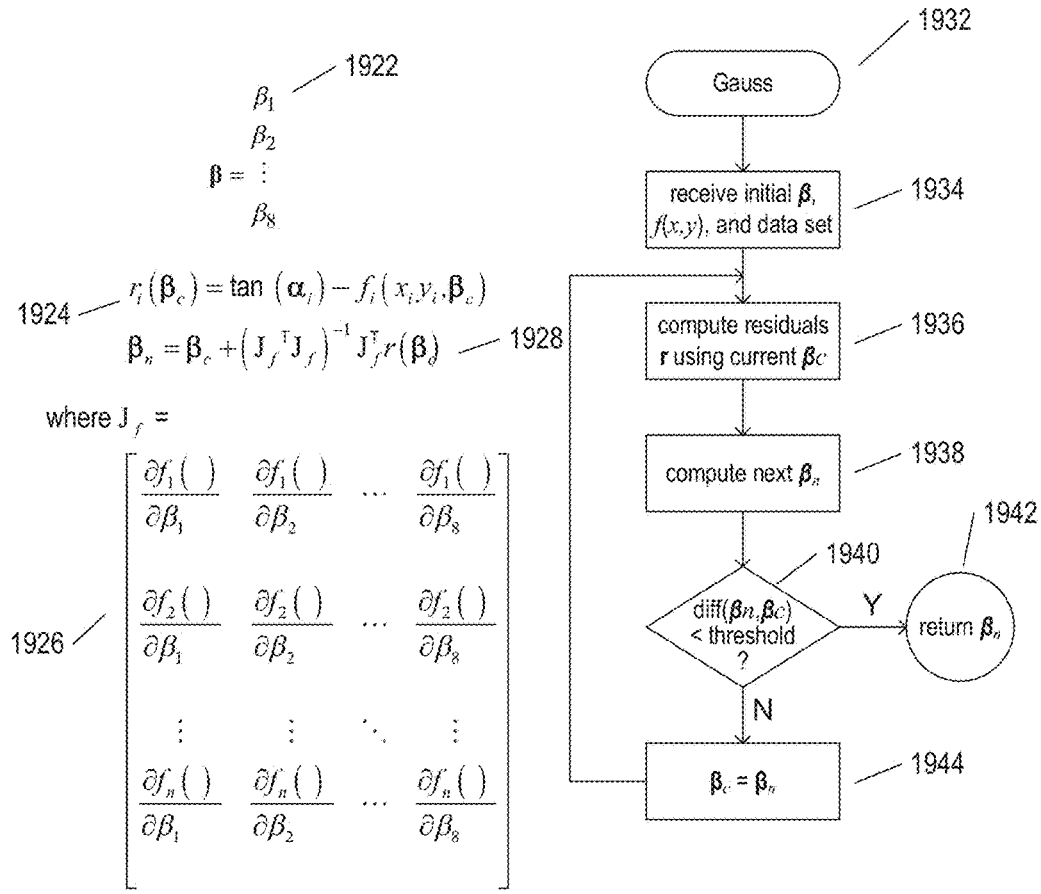
FIG. 19B illustrates generation of an initial model for the text-line curvature within a page-image.

FIGS. 19A-B illustrate generation of an initial model for the text-line curvature within a page-image. Each pixel in page image 1908 that fall within the borders of a blocked fragment are assigned inclination angles equal to the inclination angle α of the blocked fragment in which the pixels are located. In FIG. 19A, assignment of the inclination angle α 1902 to the page-image pixel 1904 within blocked fragment 1906 of the page image 1908 is illustrated. Only pixels coincident with the centroids of the blocked fragments are assigned angles of inclination. Then, a data-fitting method 1910 is applied to the coordinates and assigned inclination angles α for all the pixels at the centroids of blocked fragments to determine a function $f(x,y)$ 1912 that returns the tangent of the inclination angle α at coordinates x,y within page image 1908. In one implementation, the function $f(x,y)$ is a polynomial of degree 3 in x and degree 1 in y 1914 with eight coefficients $a_1$-$a_8$. The coefficients are assigned values by the data-fitting method 1910. Note that the function $f(x,y)$, referred to as the "initial model," returns an inclination angle α for any position (x,y) within the page image, and not only for the positions within blocked fragments. In other words, the initial model is general but is obtained by data fitting from a subset of the pixels within the image.

FIG. 19B illustrates one method, referred to as the "Gauss-Newton method," for fitting the inclination angle and coordinate data obtained from the blocked fragments to the polynomial function $f(x,y)$. First, the data-fitting problem is restated 1920 in FIG. 19B. The coefficients $\beta_1$, $\beta_2$, ... $\beta_8$ can be considered to be a vector β 1922. A guess is made for the values of these coefficients to generate an initial vector β. The difference between the tangents returned by function $f(x,y)$ with the current values of β and the tangents of the observed inclination angles is expressed as a set of n residuals $r_i$ 1924, where n is the number of pixels with assigned inclination angles α. Each residual is the difference between the tangent of the inclination angle α assigned to the pixel and the inclination angle computed for the pixel by function $f(x,y)$ assuming the current values for the coefficients $\beta_c$. A new value for the coefficients vector, $\beta_n$, can be computed from the current values of the coefficients vector, $\beta_c$, from the computed residuals and the Jacobean $J_f$ for the function $f(x,y)$ 1926, as shown in expression 1928. Note that the Gauss-Newton method minimizes the sum of the squared residuals 1930. The Gauss-Newton method is illustrated in the small control-flow diagram 1932. The method starts with an initial β, the function $f(x,y)$, and a data set 1934. In an iterative loop, the method computes residuals $r_1, r_2, \ldots, r_n$, where r is a vector of residuals, from the data set and function $f(x,y)$ assuming the current coefficients $\beta_c$ in step 1936. Then, using expression 1928, a new set of coefficients $\beta_n$ is computed in step 1938. When the difference between the new coefficients and previous coefficients is less than a threshold value, as determined in step 1940, the new coefficients are returned as the coefficients for function $f(x,y)$ 1942. Otherwise, $\beta_c$ is assigned to $\beta_n$, in step 1944, and another iteration is undertaken. This control-flow diagram is somewhat simplistic, in that the Gauss-Newton method is not guaranteed to converge. Thus, in addition to the difference test in step 1940, the method generally employs an iteration-number cutoff and other techniques to ensure that the method does not iterate endlessly. Other data-fitting methods can be used in alternative implementations, such as the Nonlinear Conjugate Gradient Method, variations of many other curve-fitting techniques, including non-linear curve-fitting methods, such as the Levenberg-Marquart method. In one implementation, a system of linear equations is obtained by generating derivatives of the parameters, based on squares of the angles of inclination for each blocked-fragment centroid, and solved using Gaussian elimination, rather than an iterative data-fitting method.

Figure 20:
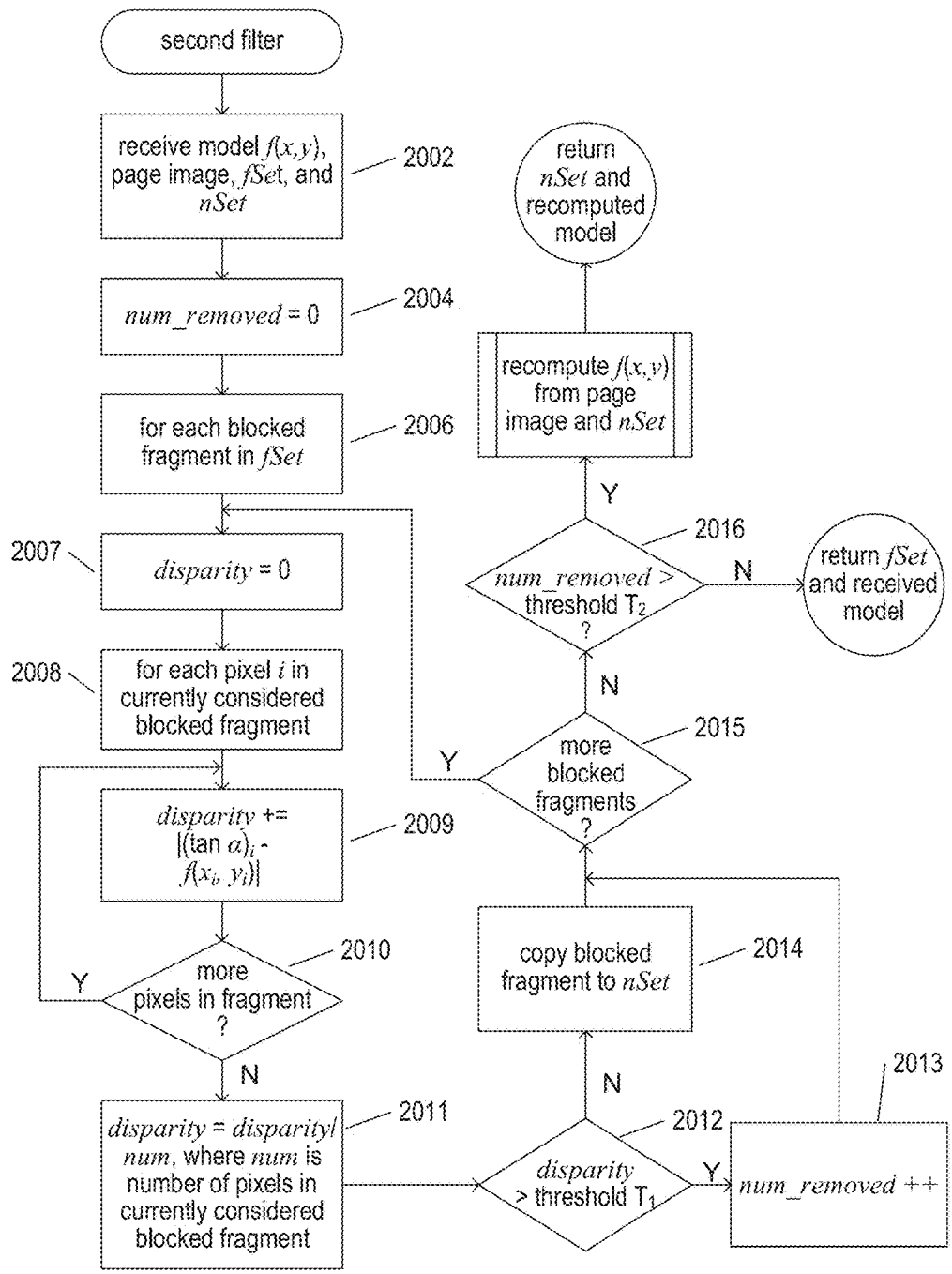
FIG. 20 provides a control-flow diagram for a second filtering of blocked fragments.

Once the initial model is obtained, by a data-fitting method such as that discussed above with reference to FIGS. 19A-B, the blocked fragments are again filtered. FIG. 20 provides a control-flow diagram for a second filtering of blocked fragments. In step 2002, the filter receives the model $f(x,y)$, the page image, a current set of blocked fragments fSet, and an empty result set nSet. In step 2004, the local variable num_removed is set to 0. In the for-loop of steps 2006-2015, each blocked fragment in the set fSet is considered. The local variable disparity is set to 0 in step 2007. Then, in the inner for-loop of steps 2008-2010, the sum of the residuals for the pixels in the currently considered block fragment is computed. In step 2011, an average disparity is computed and the local variable disparity is set to this value. When the average disparity is greater than the threshold value, as determined in step 2012, the local variable num_removed is incremented, in step 2013. Otherwise, the blocked fragment is moved to the blocked-fragment set nSet. When there are more blocked fragments to evaluate, as determined in step 2015, control returns to step 2007. Otherwise, in step 2016, the filter determines whether the number of removed blocked fragments is greater than a threshold value. When the number of removed blocked fragments is greater than the threshold value, the model is recomputed from the current set of blocked fragments in the set variable nSet, and nSet and the recomputed model are returned. Otherwise, the original set of blocked fragments fSet in the received model are returned.

Figure 21A:
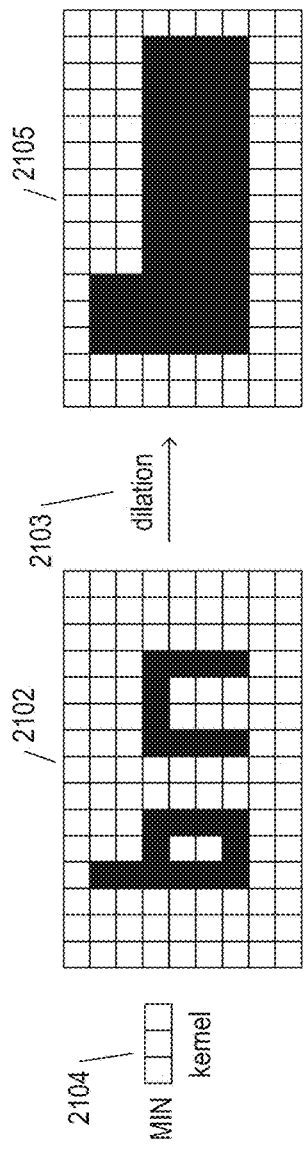
FIG. 21A illustrates dilation, erosion, closing, and opening operations that are used, in a described implementation of the currently disclosed methods, to generate filled contours corresponding to text lines in a text-containing image.
Figure 21B:
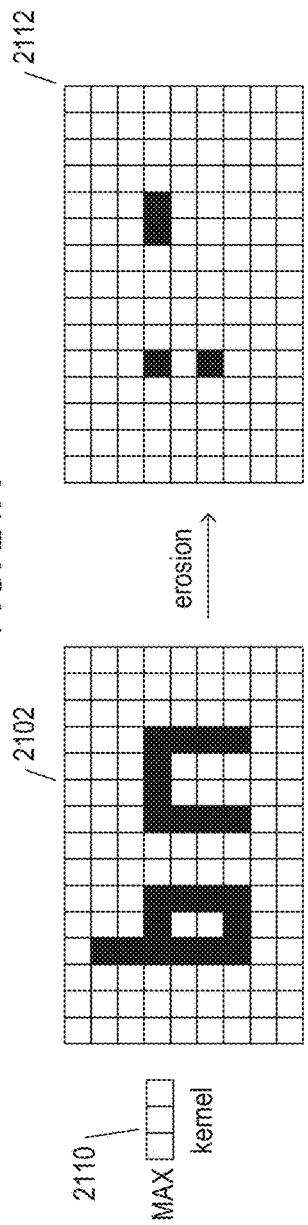
FIG. 21B illustrates dilation, erosion, closing, and opening operations that are used, in a described implementation of the currently disclosed methods, to generate filled contours corresponding to text lines in a text-containing image.

FIGS. 21A-F illustrate dilation, erosion, closing, and opening operations that are used, in a described implementation of the currently disclosed methods, to generate filled contours corresponding to text lines in a text-containing image. FIGS. 21A-F all use the same illustration conventions, next described with respect to FIG. 21A. On the left side of FIG. 21A, a small portion of a text image 2102 is shown. This is a binary image in which the value "0" represents a black, or text, pixel and the value "1" represents white space. A horizontal dilation operation 2103 is carried out by convolving the image 2102 with a horizontal kernel 2104. When the central pixel of the kernel overlays a pixel within the image, the pixel within the image generated by convolution receives the value of the minimum value of pixels in the image overlain by the kernel pixels. This has the effect of dilating or horizontally expanding dark-pixel-containing regions of the image. The result of applying a three-pixel horizontal dilation kernel 2104 to image 2102 is the dilated image 2105. FIG. 21B shows a horizontal erosion operation. The horizontal erosion operation is, in a sense, opposite from the horizontal dilation operation. In the horizontal erosion operation, a three-pixel horizontal kernel 2110 is convolved with the initial image 2102, with the image pixel overlain by the central pixel in the kernel 2110 receiving, in the image produced by convolution, the maximum value of any pixel in the image overlain by pixels in the kernel. This has the effect of eroding, or thinning, any dark-pixel-containing regions in the image. In FIG. 21B, application of the erosion kernel through a convolution process to the original image 2102 results in the eroded image 2112. Note that the examples of FIGS. 21A-F are artificial, in that character features in text pages generally have widths or more than a single pixel.

Figure 21C:
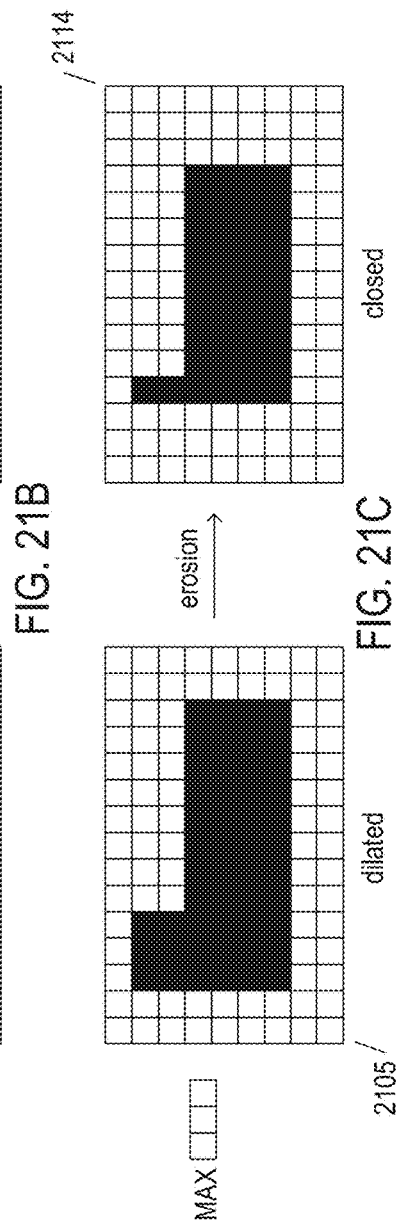
FIG. 21C illustrates dilation, erosion, closing, and opening operations that are used, in a described implementation of the currently disclosed methods, to generate filled contours corresponding to text lines in a text-containing image.

As shown in FIG. 21C, when the initially dilated image 2105 produced by convolving the original image with a horizontal dilation operator is eroded, by convolving the dilated image with a horizontal erosion operator, a closed image 2114 is produced. The closing operation is thus a two-part operation in which an image is first dilated and then eroded.

FIGS. 21D-E illustrate the opening operation. An opening operation is opposite from the closing operation, involving first eroding an image and then dilating the image. In FIG. 21D, the closed image 2114 produced by eroding the dilated image, as discussed above with reference to FIG. 21C, is eroded to produce an intermediate image 2116. In FIG. 21E, the intermediate image 2116 is dilated to produce an opened image 2118. The technique employed in the currently described implementation of the currently disclosed method is summarized in FIG. 21F, where an initial image 2102 is dilated, eroded, again eroded, and then dilated, equivalent to first being closed and then being opened to produce the closed-and-then-opened image 2118. As can be seen in FIG. 21F, the closing-and-then-opening operation replaces characters in a text line with a filled text-line contour 2120.

Figure 22:
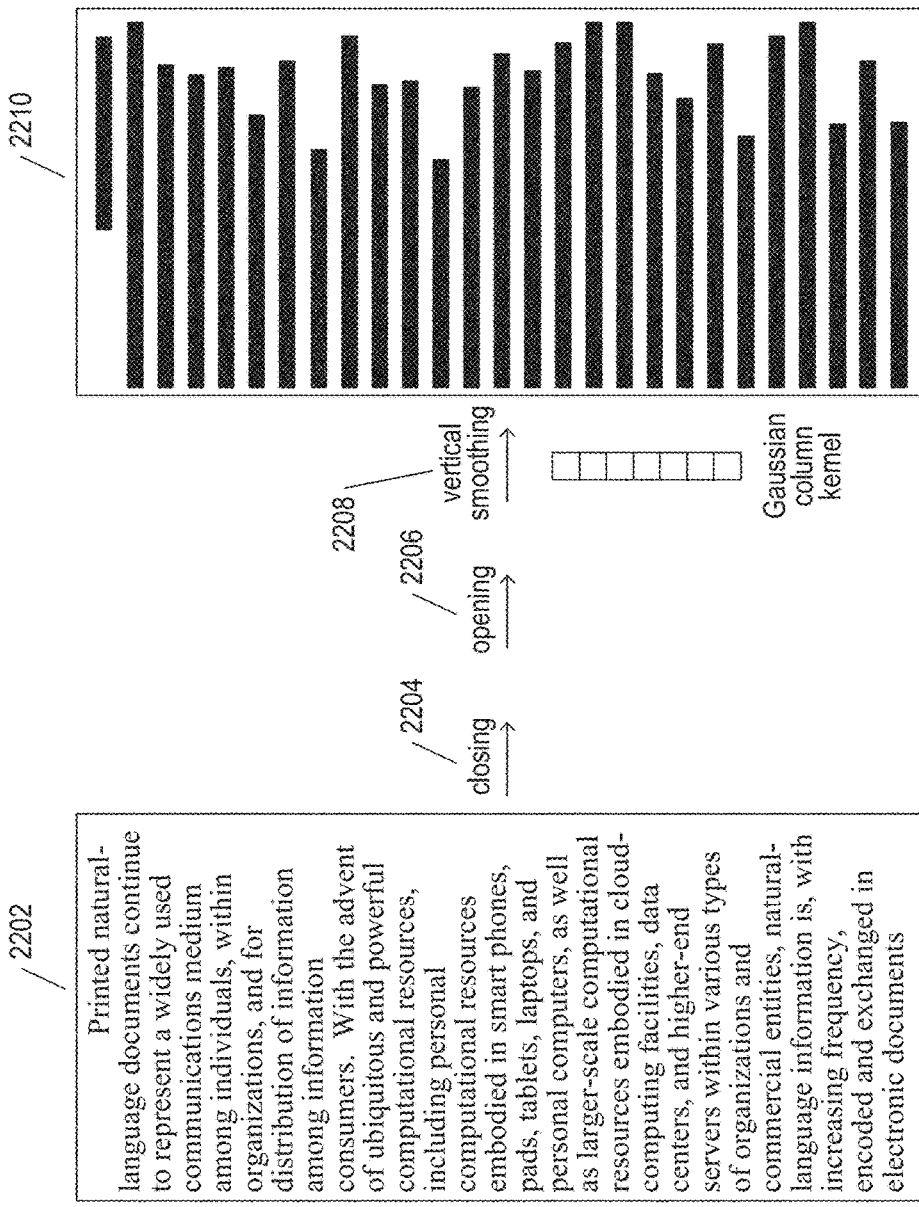
FIG. 22 illustrates the closing-and-then-opening operation carried out on a text-containing image to produce filled contours corresponding to the text lines.

FIG. 22 illustrates the closing-and-then-opening operation carried out on a text-containing image to produce filled contours corresponding to the text lines. The text-containing image 2202 is subject to closing 2204, then opening 2206, followed by a vertical smoothing operation 2208 in which the opened image is convolved with a Gaussian column kernel, or another kernel that produces a similar effect, to smooth the image in the vertical direction. The result 2210 is an image in which the text lines are replaced by horizontal darkened rectangles, or filled contours, corresponding to the text lines. In general, in one implementation, the horizontal kernels employed in the closing-and-then-opening operation have widths, in pixels, equal to a closest odd number to the width of the page image, in pixels, divided by 50 pixels, but with a minimum width of 11 pixels. In general, in one implementation, the vertical kernel employed in the closing-and-then-opening operation has a height, in pixels, equal to a closest odd number to the height of the page image, in pixels, divided by 200 pixels, but with a minimum height of 11 pixels.

Figure 23A:
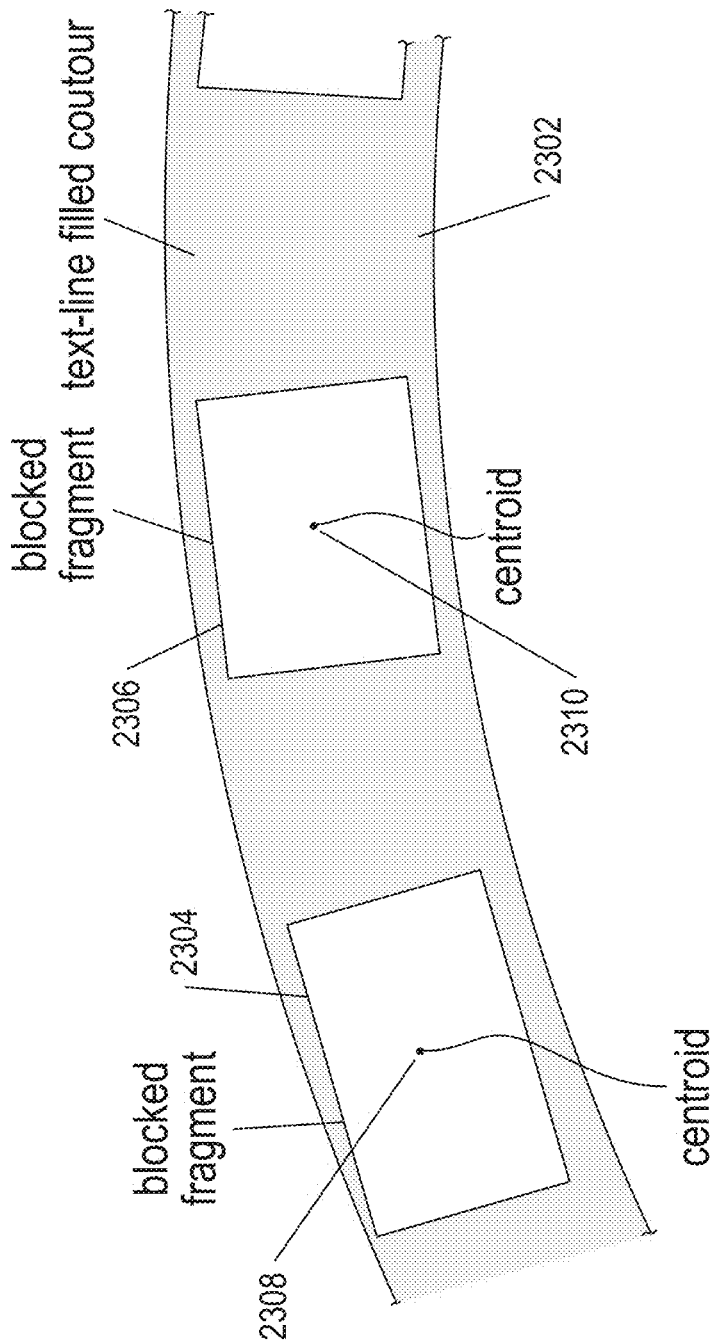
FIG. 23A illustrates generation of curved-text-line segments from the centroids of the blocked fragments.
Figure 23B:
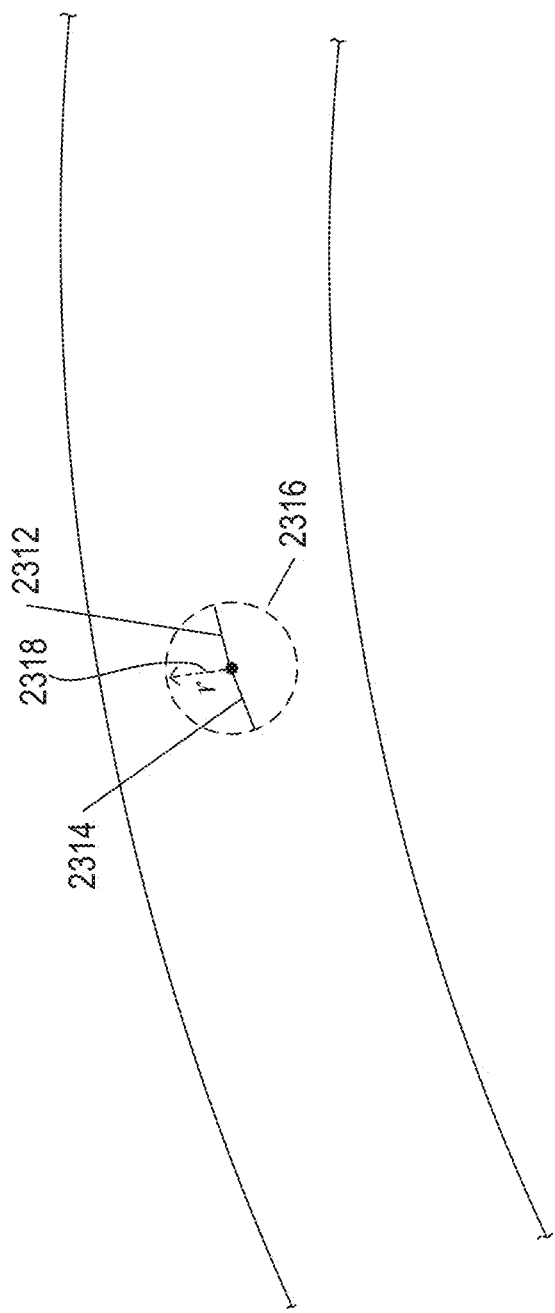
FIG. 23B illustrates generation of curved-text-line segments from the centroids of the blocked fragments.
Figure 23C:
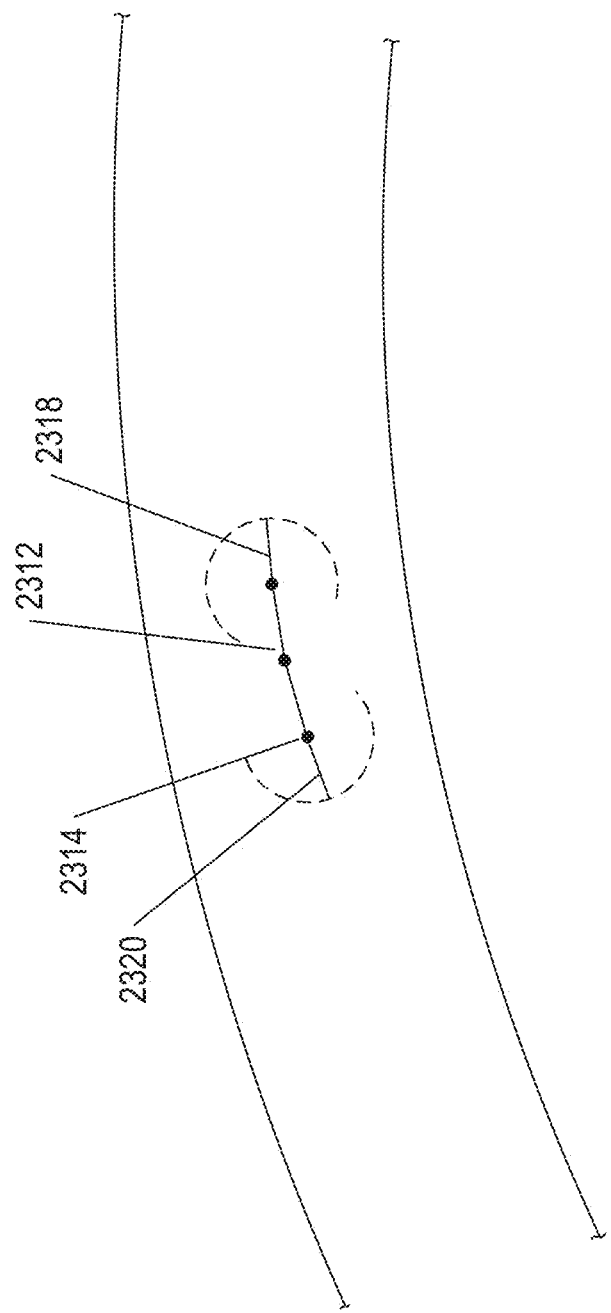
FIG. 23C illustrates generation of curved-text-line segments from the centroids of the blocked fragments.
Figure 23D:
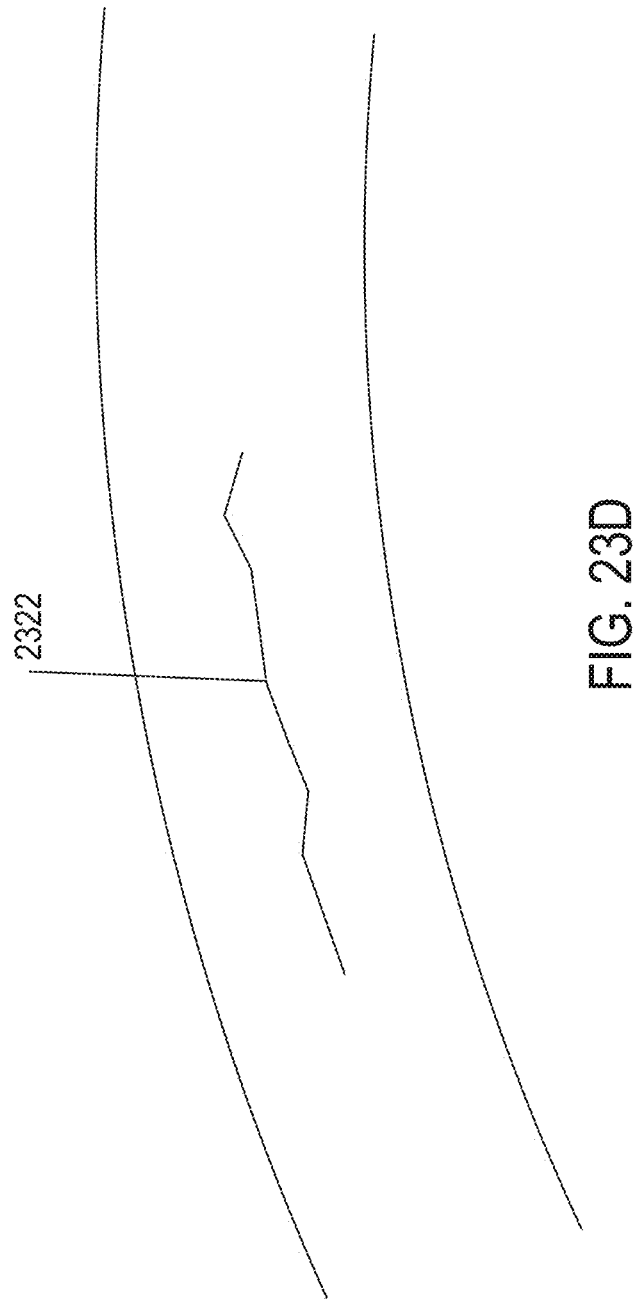
FIG. 23D illustrates generation of curved-text-line segments from the centroids of the blocked fragments.

FIGS. 23A-D illustrate generation of curved-text-line segments from the centroids of the blocked fragments. In FIG. 23A, a filled contour 2302 is shown containing two blocked fragments 2304 and 2306. Each blocked fragment is associated with a centroid, 2308 and 2310, respectively. As shown in FIG. 23B, from each centroid of a blocked fragment, an initial portion of a curved-text-line segment is constructed, when possible. The segment includes a first portion 2312 and a second portion 2314. The construction of these segment portions is discussed below, with reference to FIGS. 24A-B. In general, the segment is constructed in two directions, with the directions related to the angle of inclination for the centroid based on the model f(x,y). The two initial segment portions 2312 and 2314 have lengths based on a circle 2316 of radius r 2318 centered at the centroid. As shown in FIG. 23C, the initial segment portions 2312 and 2314 are extended to include additional segment portions 2318 and 2320, again with lengths based on circles of radius r about the endpoints of the previous segment portions 2312 and 2314 most recently added to the segment. As shown in FIG. 23D, the segment-construction process continues until the segment can no longer be extended in either direction, producing a final, constructed segment 2322 that is added to segments constructed for the centroids of the blocked fragments. These segments provide angle-of-inclination data points that can be used in a subsequent data-fitting operation to produce a more refined model f(x,y) for the angles of inclination of line segments at points within a text image. In one implementation, the length r is the maximum of the width of the page image, in pixels, divided by 100 pixels or 5 pixels.

Note that, in the figures and discussions, unless otherwise note, the x and y coordinates are pixel coordinates for the pixels within the page image. In addition, binary, grayscale, and original versions of the page image are generally available, and can be used concurrently, as needed. Note also that the model f(x,y) formally returns the tangent of the inclination angle at location (x,y), but it is also informally referred to as returning the inclination angle, since the inclination angle is easily obtained from the tangent of the inclination angle.

Figure 24A:
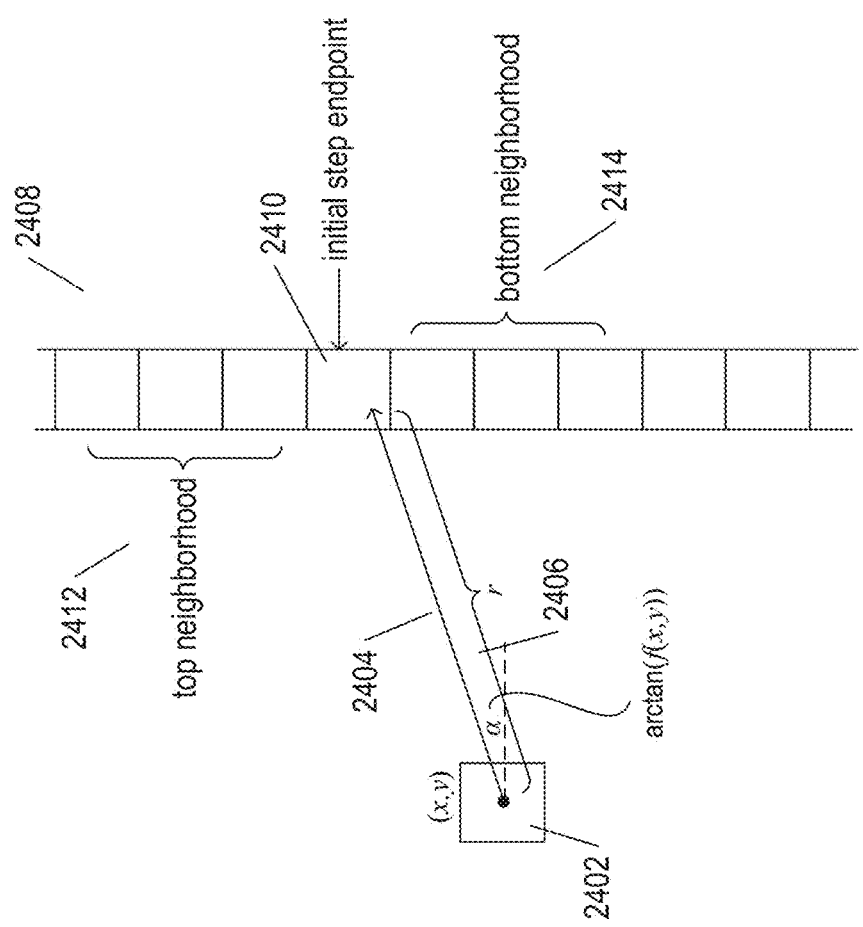
FIG. 24A illustrates construction of a segment portion at the current end of curved text-line segment.
Figure 24B:
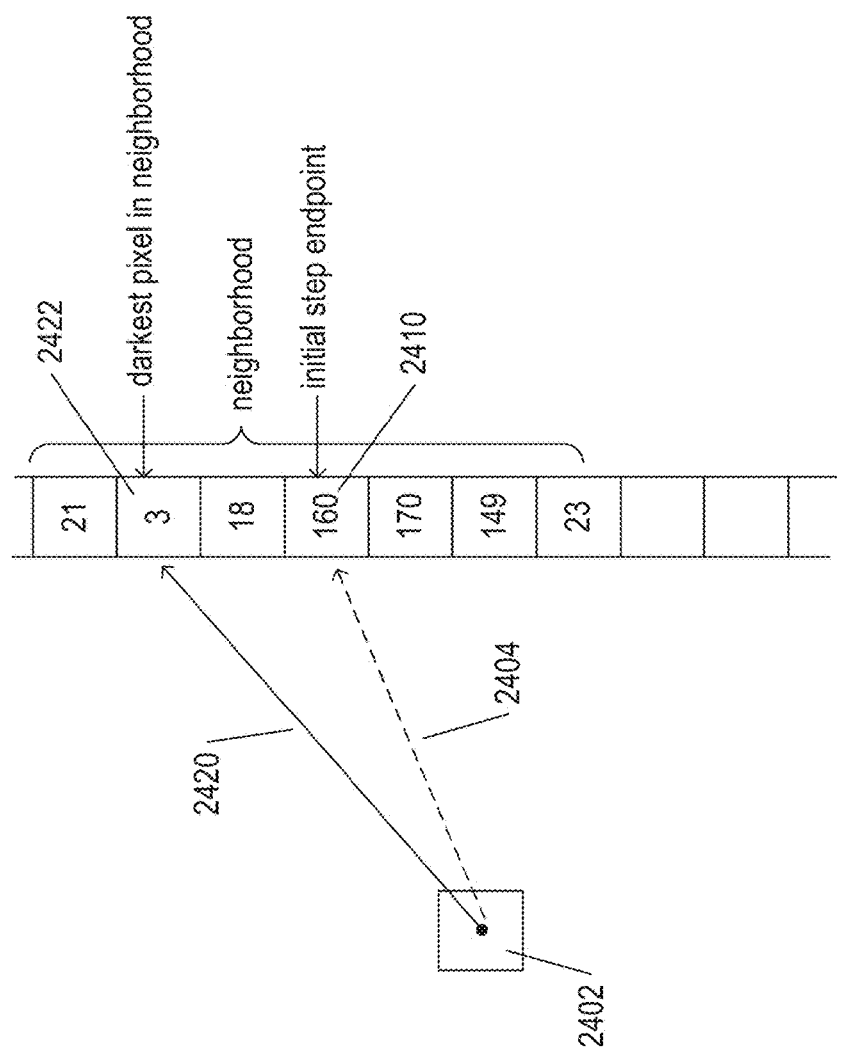
FIG. 24B illustrates construction of a segment portion at the current end of curved text-line segment

FIGS. 24A-B illustrate construction of a segment portion at the current end of curved text-line segment. As shown in FIG. 24A, pixel 2402 represents the current endpoint of a curved text-line segment, or the centroid of a blocked fragment during construction of one of the two initial curved text-line segment portions. First, an initial vector of length r 2404 is constructed from this endpoint with an inclination angle α computed using the model f(x,y) 2406. A vertical column of pixels of the grayscale page image 2408, within the filled contour, in which the head of this initial vector falls is then used to refine the angle of the vector. In the example shown in FIG. 24A, the initial vector falls within pixel 2410 in column 2408. A neighborhood of this pixel including a top neighborhood 2412, a bottom neighborhood 2414, and the pixel itself 2410, is then considered. As shown in FIG. 24B, the initial vector 2404 may be replaced by a final vector 2420 that connects the endpoint pixel 2402 with the pixel 2422 in the neighborhood constructed about the initial step endpoint 2410 with the lowest intensity value when the initial vector does not already correspond to the final vector. According to the grayscale convention, the lower the intensity value, the darker the pixel. Thus, while the model f(x,y) is used to determine the initial vector 2404, this initial vector may be replaced by a different, final vector 2420 when the pixel corresponding to the head of the initial vector does not have the lowest intensity value within the neighborhood constructed about the initial step endpoint. In other words, the vector-construction method assumes that the model is not fully accurate, but is sufficiently accurate to select a range of vector directions. The intensity values in the vertical column of pixels within the constructed neighborhood are then used to select a particular vector direction from within the range of vector directions provided by the model f(x,y). The final vector determines the endpoint of the next curved-text-line segment portion that extends the curved text-line segment. Segments are terminated when a next endpoint for a next segment portion cannot be found using the method of FIGS. 24A-B. In alternative implementations, an endpoint for a next segment portion may be selected from a subset of lowest intensity pixels within the vertical neighborhood.

Once the text-line curves are constructed by the method discussed above with reference to FIGS. 22-24B, they provide more reliable data points for refining the model f(x,y). At this point, the set of data points based on the constructed text-line curves are used in another round of data fitting to the model f(x,y) to generate a final model that computes the tangent of the inclination angles α for each pixel in the page image. The data fitting again uses any of various data-fitting models, such as the data-fitting approach illustrated in FIGS. 19A-B. The data for data fitting may be just those pixels coincident with the text-line curves, or the text-line curves may be expanded within the filled text-line contours, or inclination angles may be computed for off-curve pixels by interpolation. In all cases, the observed inclination-angle data following the construction of the text-line curves generally provides a more reliable basis for model generation.

With an accurate model f(x,y) in hand, the model can be used, at least conceptually, to produce an inclination-angle map of the page image. The inclination-angle map associates an inclination angle α with each pixel or, in some cases, with cells constructed at a finer granularity than the pixel level. In the current discussion, it is convenient to describe steps assuming the presence of an inclination-angle map; however, the inclination-angle map is the data generated by the refined and accurate final data model f(x,y), and can be alternatively generated on the fly rather than pre-computed and stored in an inclination-angle map.

Figure 25:
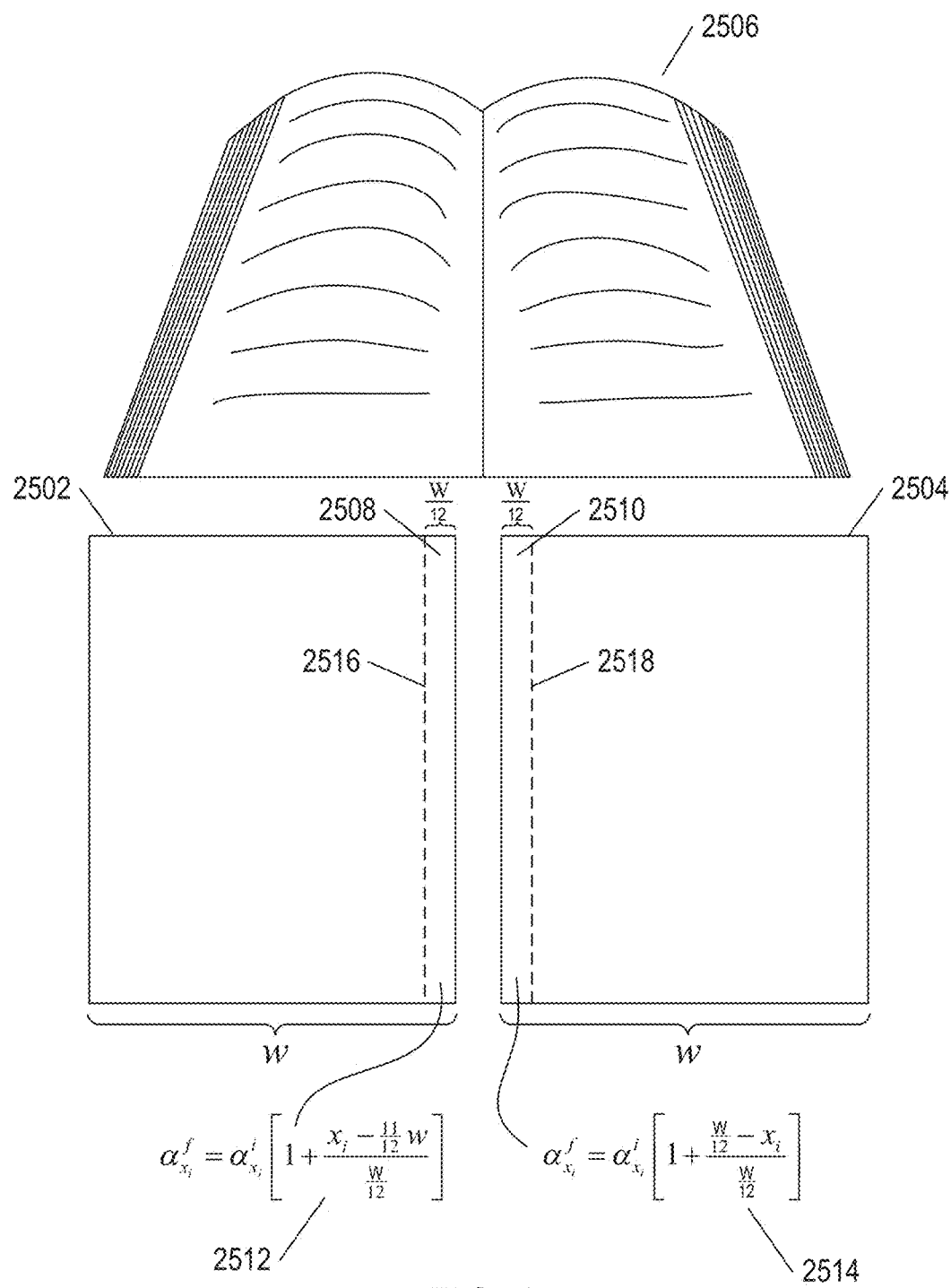
FIG. 25 illustrates the especially distorted regions of page images and computation of correction coefficients.

As it turns out, the region of a page image parallel to, and coincident with, the spine edges of the two pages of an open book are subject to significantly greater perspective-induced distortion and page-curvature than the remaining portions of the page image. FIG. 25 illustrates the especially distorted regions of page images and computation of correction coefficients. In FIG. 25, two page images 2502 and 2504 are shown below the corresponding image of an open book 2506. The especially distorted regions 2508 and 2510 of the two page images 2502 and 2504 lie in the narrow strip of pixels of width $$\frac{W}{12}.$$

In order to handle the additional perspective-induced distortion in these narrow strips, the inclination angle computed by the model f(x,y) for pixels in these narrow regions are modified by multiplication by a left-page coefficient 2512 and a right page-image coefficient 2514. These coefficients have values that the depend on the horizontal location of a pixel within the narrow region, with the coefficient value increasing from 1.0 along the dashed lines 2516 and 2518 to 2.0 along the spine-adjacent edge of the image. Thus, the model f(x,y) is modified and/or the initial inclination-angle map is modified in order to take into consideration the especially distorted regions 2508 and 2510.

Figure 26B:
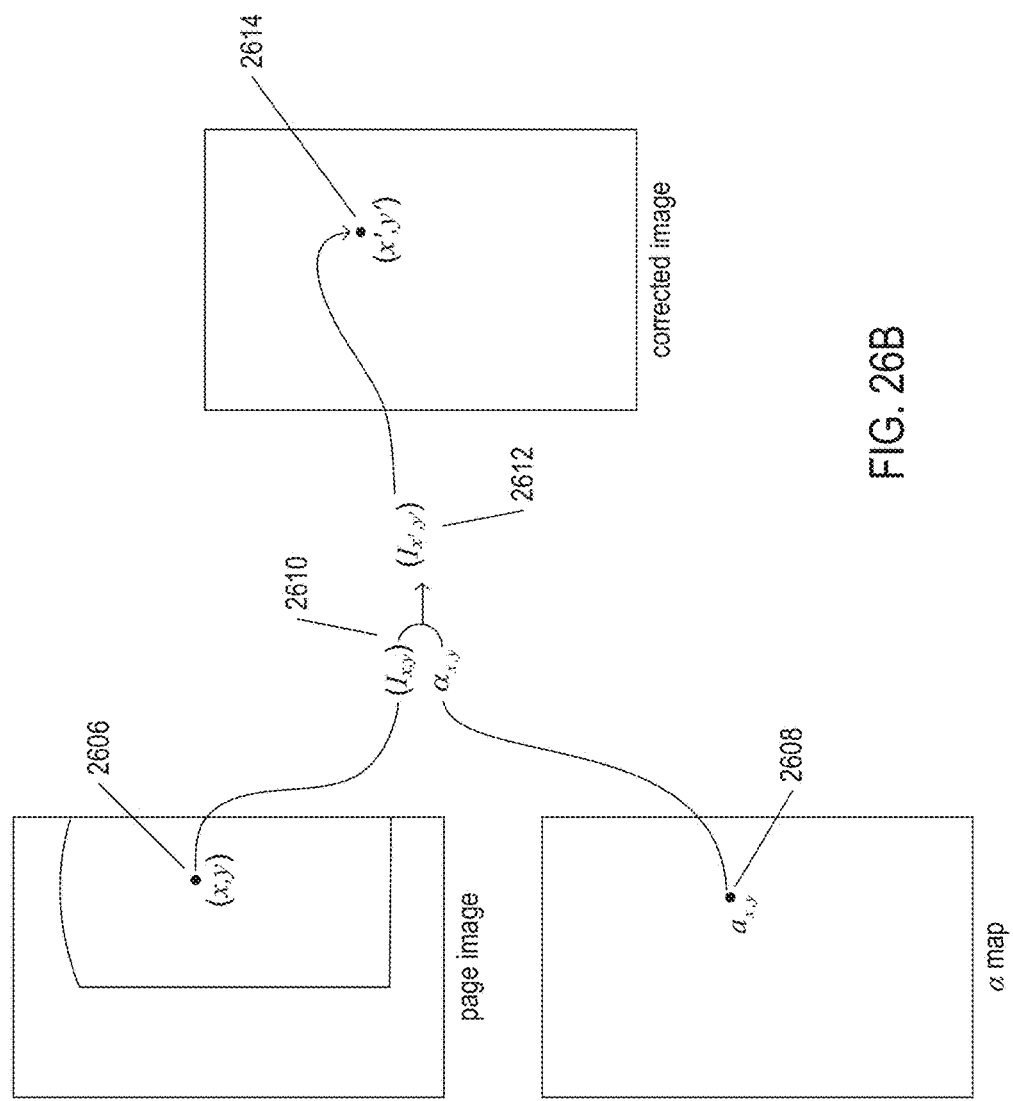
FIG. 26B illustrates straightening of text-line curves within a page image to produce rectilinear text lines using the inclination-angle map that associates an inclination angle with each pixel in the page image.

FIGS. 26A-F illustrate straightening of text-line curves within a page image to produce rectilinear text lines using the inclination-angle map that associates an inclination angle with each pixel in the page image. FIG. 26A illustrates the information at hand following previously discussed processing steps. The information includes the justified and aligned page image 2602, both in grayscale and in color, if originally received in color, and the inclination-angle map 2604. These are used to generate a corrected image in which text-lines and characters and symbols within the text lines have a normal, flat-page rectilinear organization. As shown in FIG. 26B, in the final steps of text-line-curvature correction, the intensity information and coordinates for a pixel in the page image 2606 and the inclination angle for that pixel α 2608 are combined 2610 to generate coordinates for a new position for the pixel 2612 in the corrected image. The pixel is then transferred, or copied, to that new position 2614 in the corrected image. Transferring a pixel means that the intensity value for the pixel is copied into the new location in the correct page image.

Figure 26C:
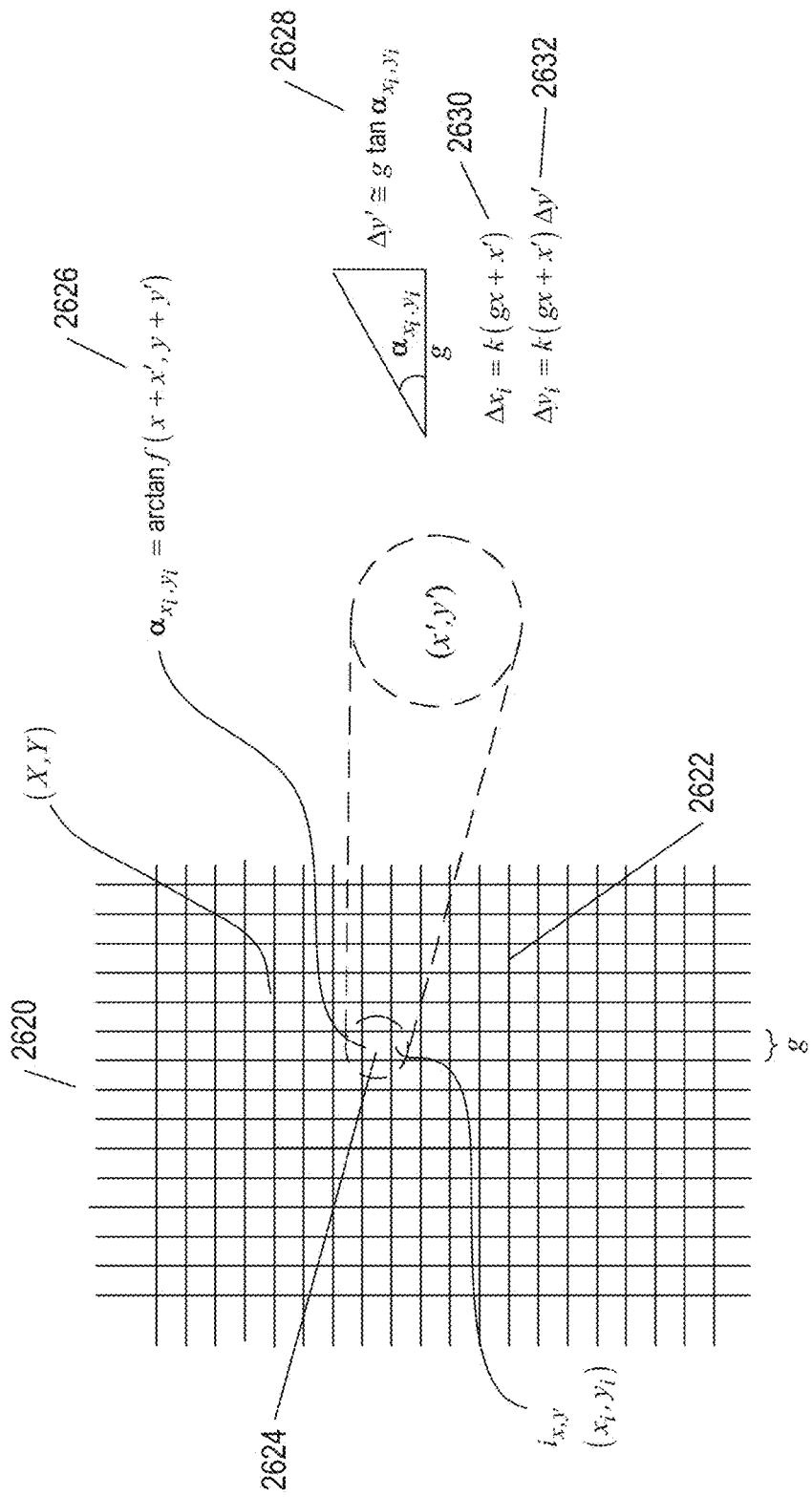
FIG. 26C illustrates straightening of text-line curves within a page image to produce rectilinear text lines using the inclination-angle map that associates an inclination angle with each pixel in the page image.

FIGS. 26C-F provide details of how the page image and inclination-angle map are employed to determine positions in a corrected image to which pixels from the page image are transferred. As shown in FIG. 26C, a first step involves computing local displacements $\Delta_i$ and $\Delta y_i$ for each cell g in a rectilinear grid superimposed over the grid of pixels in the page image. The rectilinear grid 2620 generally has cells of width and height g, where g is an even divisor of the width and height of a pixel. In other words, the local displacements are computed at a finer granularity than the pixel grid. Of course, in alternative implementations, the local displacements may be instead computed for pixels. In FIG. 26C, a pixel 2622 is shown with a darker bounding square than the rectilinear grid of cells 2620. Displacements for a cell $i_{x,y}$ 2624 are computed in the example shown in FIG. 26C. Cell 2624 has coordinates $(x_i, y_i)$ with respect to the cell grid 2620 and has coordinates (x',y') with respect to the grid of cells within the area of pixel 2622. The inclination angle $\alpha_{x_i,y_i}$ for cell 2624 may be directly computed using the model 2626 or, alternatively, may be assigned the inclination angle of the pixel 2622 within which it resides. An intermediate value Δy' for $\Delta y_i$ is computed as g tan $\alpha_{x_i,y_i}$ 2628. Finally, the displacement $\Delta x_i$ is computed by a function k( ) supplied with the argument $x_i$=gx+x' 2630 and the displacement $\Delta y_i$ is obtained by the value returned by the function k( ) times the intermediate value Δy' computed from the inclination angle 2632. The computations shown in FIG. 26C are repeated for each cell in the rectilinear grid of cells 2620 to produce an offset map, with each cell i in the rectilinear grid of cells associated with two offsets: $\Delta x_i$ and $\Delta y_i$.

FIG. 26D illustrates one implementation of the function k( ) used to generate the cell displacements as described with reference to FIG. 26C. As shown in FIG. 26D, the function k computes the value k( ) for cell i 2636. This cell resides within a column of cells 2638 spanning the image of a page. The top cell 2640 and the bottom cell 2642 of the column are used by the function k( ) to compute the value returned by the function k( ). The inclination angles computed for these top and bottom cells are used to construct converging vectors a and b 2644-2645 or converging vectors 2646 and 2647 that create a triangle on the right side or left side of the column of cells, respectively, with an angle β 2648. The cosine of this angle is computed, for either the right-side triangle or left-side triangle, by expression 2650. Note that, in the illustrated example, $\alpha_{top}$ is a negative angle and $\alpha_{bottom}$ is a positive angle. The right-side triangle is appropriate for the left page of an open book and the left-side triangle is appropriate for the right page of an open book. The function k( ) then returns the fraction of the cell width g divided by the pixel width P times the maximum of the cosine of the angle β and 0.4 (2652 in FIG. 26D). The value returned by the function k( ) reflects a compression of symbols in curved text lines that is most pronounced in the most curved portions of the text lines closest to the page edges. Thus, the displacements $\Delta x_i$ and $\Delta y_i$ computed in FIG. 26C take into account both the curvature of the text lines as well as the compression of the text lines due to the curvature. The function returns 1/g when the vectors do not converge.

Figure 26E:
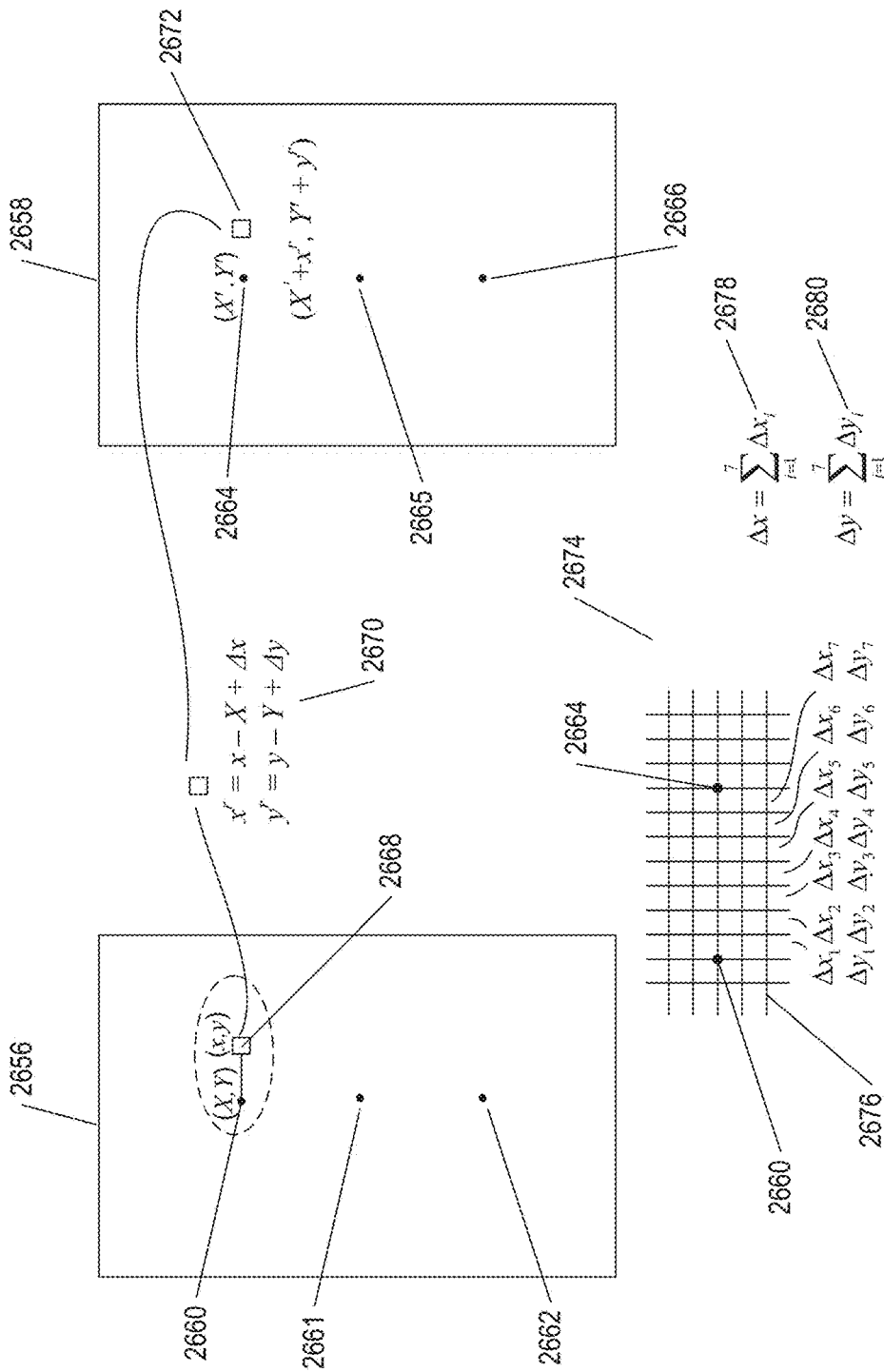
FIG. 26E illustrates straightening of text-line curves within a page image to produce rectilinear text lines using the inclination-angle map that associates an inclination angle with each pixel in the page image.

FIG. 26E illustrates how the computed displacements are used to transfer a pixel in an original location within the page image into a generally different location within the corrected image. Rectangle 2656 represents the page image and rectangle 2658 represents the corrected image. One or more anchor points 2660-2662 are selected in the page image 2656 and corresponding anchor points 2664-2666 are selected in the corrected image 2658. Anchor points are points for which corrected-image coordinates can be computed. As one example, a central point within the page image near a particular character or symbol in the original image may be selected as an anchor point, since a corresponding point in the corrected image can be easily located. In the example shown in FIG. 26E, anchor point 2660 has coordinates X, Y and the corresponding anchor point 2664 has corrected-image coordinates (X',Y'). Consider a pixel 2668 with coordinates (x,y) to the right of anchor point 2660. Relative coordinates $x^r$ and $y^r$ can be computed for pixel 2668 according to expressions 2670. These are the relative coordinates of the pixel with respect to the anchor point in the corrected image. Because of curvature-induced compression, the pixel needs to be moved further to the right. Then, pixel 2668 is positioned 2672 in the corrected image relative to the anchor point 2664 in the corrected image at coordinates $(X'+x^r, Y'+y^r)$. In expressions 2670, the relative position of the pixel with respect to the anchor point in the corrected image $(x^r, y^r)$ is computed as the relative position of the pixel with respect to the anchor point in the page image 2656, (x-X, y-Y) plus a displacement (Δx, Δy). In the lower portions of FIG. 26E 2674, computation of these displacements is illustrated. The two anchor points 2660 and 2664 are shown within the higher granularity cell grid 2676 discussed above with reference to FIG. 26C. The displacement Δx 2678 is computed as the sum of the local displacements associated with each of the cells between anchor point 2660 and anchor point 2664 and the displacement Δy 2680 is similarly computed. For pixels to the left of the anchor point, Δx is subtracted, rather than added, in the formula for $x^r$.

Figure 26F:
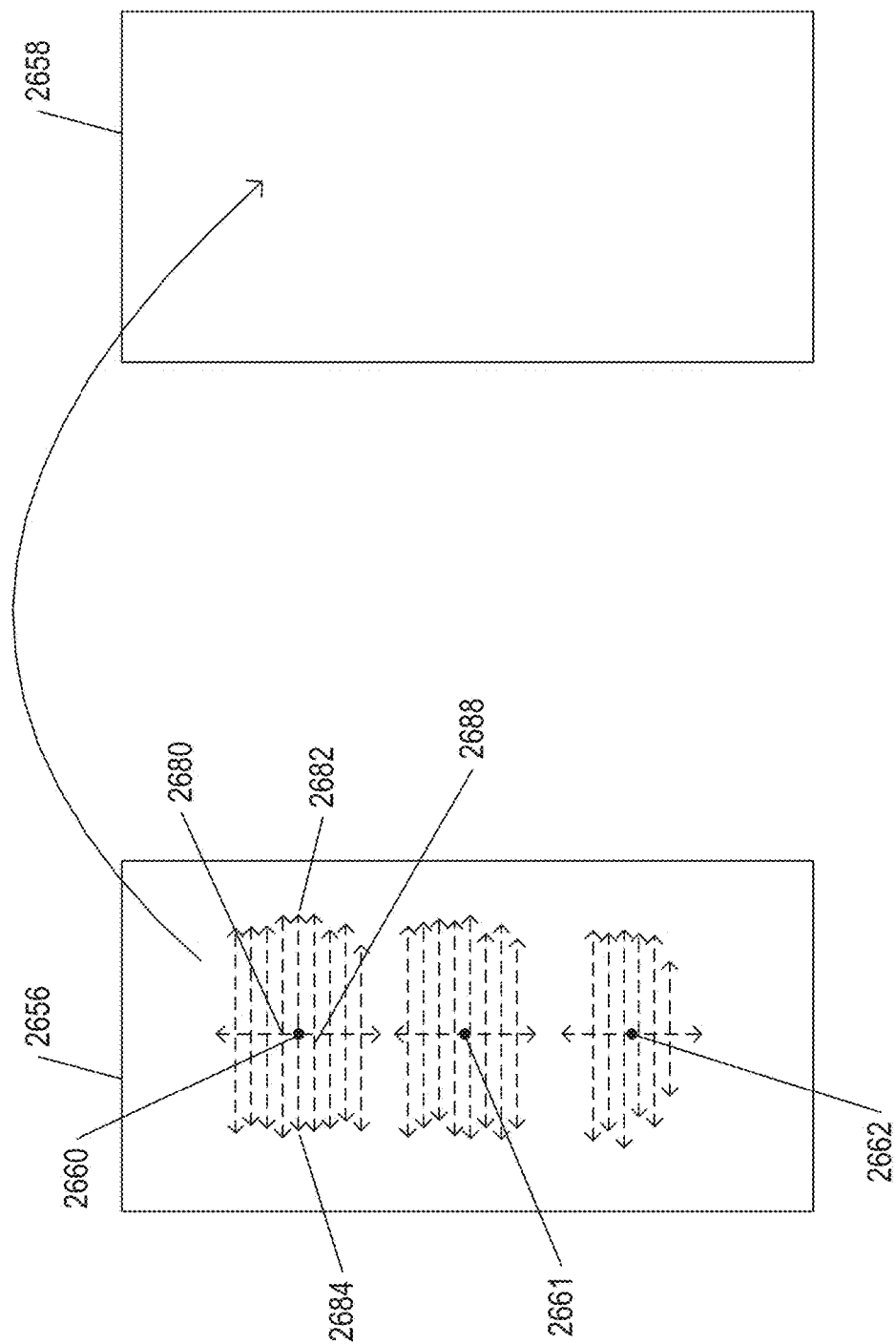
FIG. 26F illustrates straightening of text-line curves within a page image to produce rectilinear text lines using the inclination-angle map that associates an inclination angle with each pixel in the page image.

FIG. 26F illustrates the overall pixel-transfer process. From each anchor point 2660-2662 in the page image, pixels are transferred from the right-pointing 2682 and left-pointing 2684 horizontal pixel vectors emanating from the anchor point to the corrected image 2658 using the method discussed above with reference to FIG. 26E. Then, the next pixels above 2680 and below 2688 at the anchor point are transferred to the corrected image and the horizontal line of pixels including these next two pixels are then transferred according to the method discussed above with reference to FIG. 26E. This approach is used for all of the anchor points 2660-2662 until all of the pixels have been transferred. Alternatively, a single anchor point may be used and the transfer of pixels from the page image to the corrected image may be made based on vectors from the single anchor point to each of the pixels in the page image, with displacements computed along the position vectors of the pixels, taking into account the path length rough cells of the cell grid. In general, the offset map, whether actually generated or considered conceptually, contains sufficient information for transferring pixels from the page image to the corrected image so that, as a result of the transfer, the perspective-induced distortions of the text lines in the page image are corrected in the corrected image, with the symbols and characters in the corrected page image falling within a normal rectilinear-matrix-like organization, with straight, non-curved text lines.

Figure 27A:
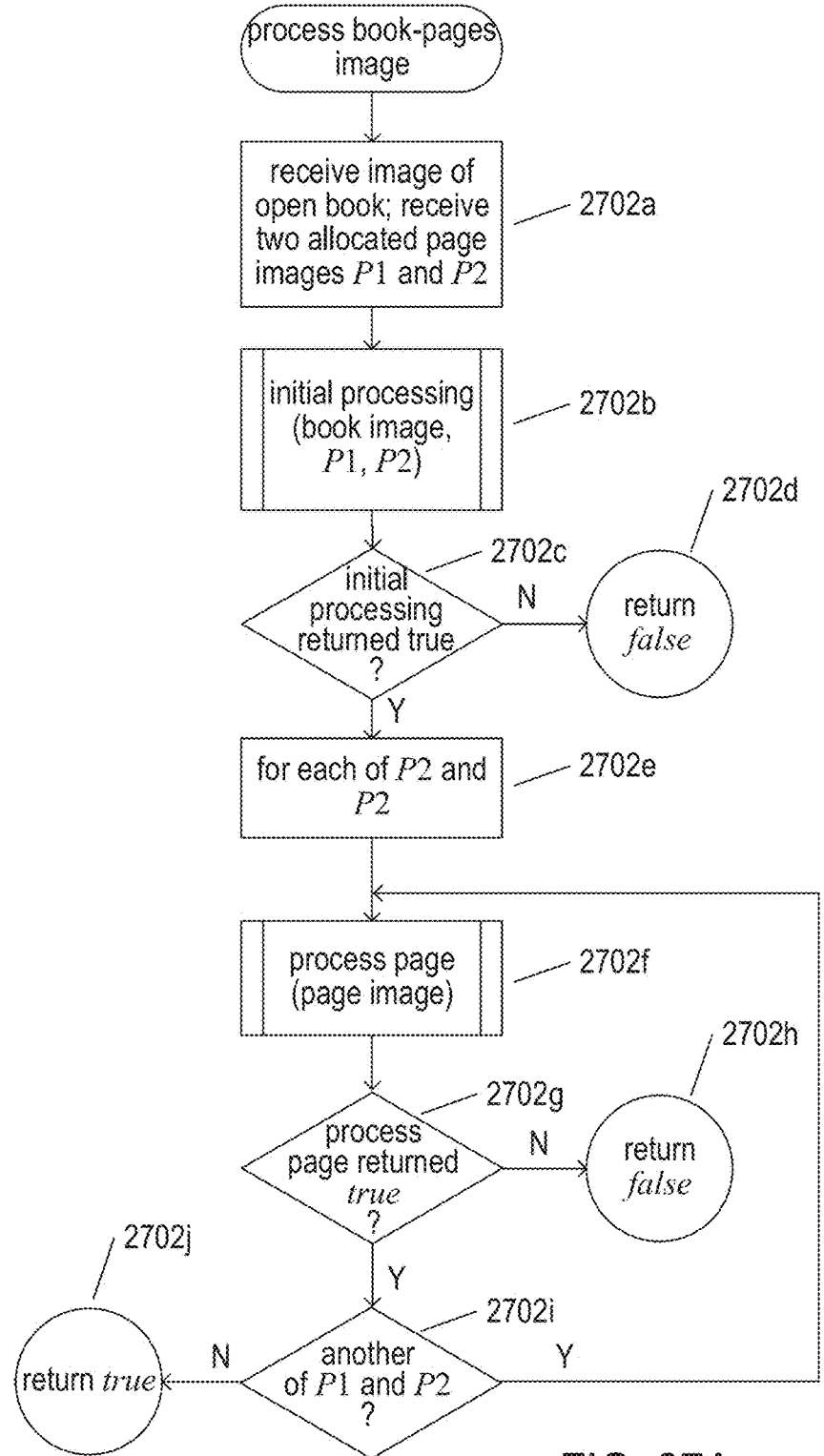
FIG. 27A provides control-flow diagrams that illustrate one implementation of the method for correcting perspective-induced curvature of text lines in images of text captured by mobile devices and other types of text-imaging equipment and appliances.
Figure 27B:
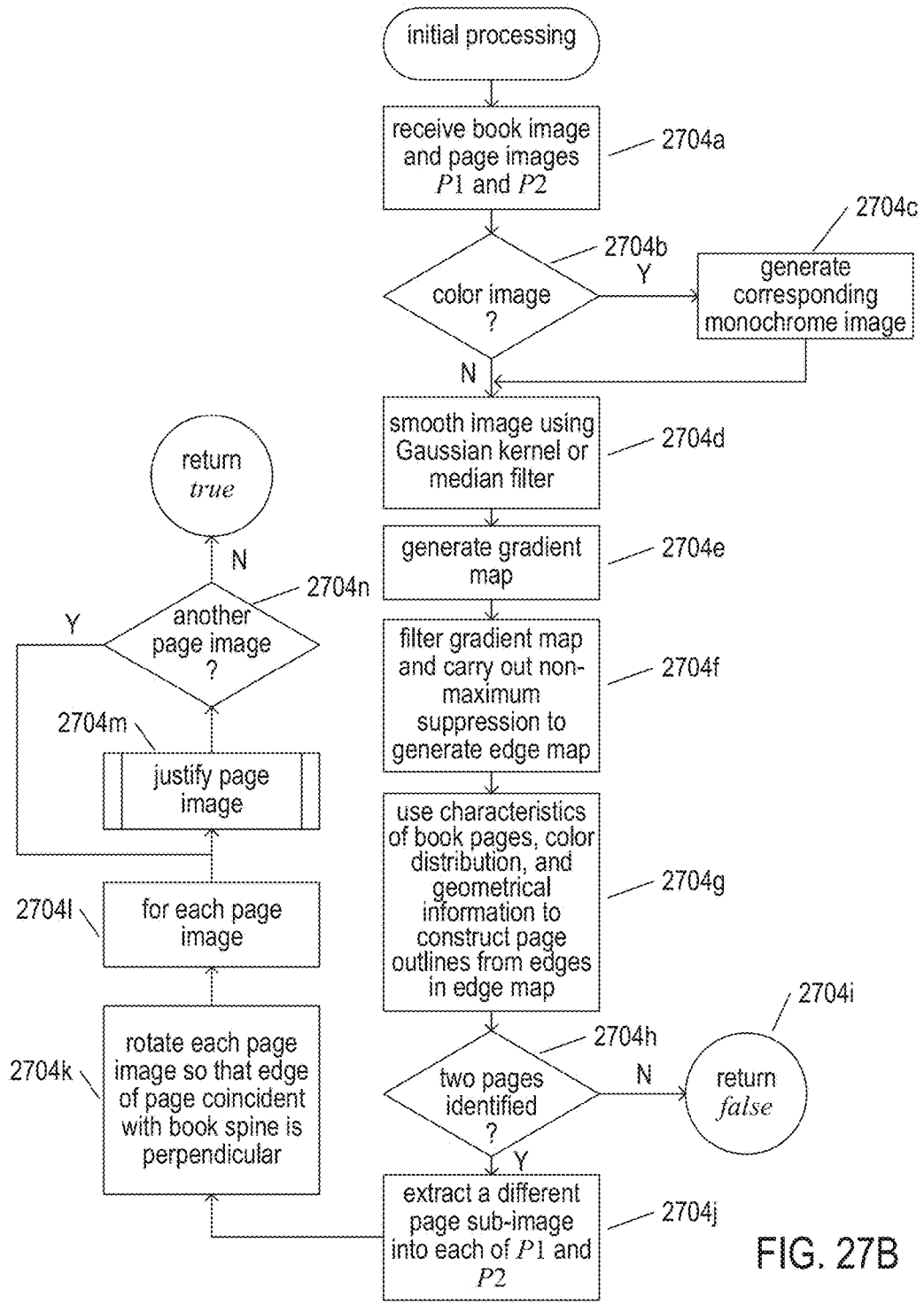
FIG. 27B provides control-flow diagrams that illustrate one implementation of the method for correcting perspective-induced curvature of text lines in images of text captured by mobile devices and other types of text-imaging equipment and appliances.
Figure 27C:
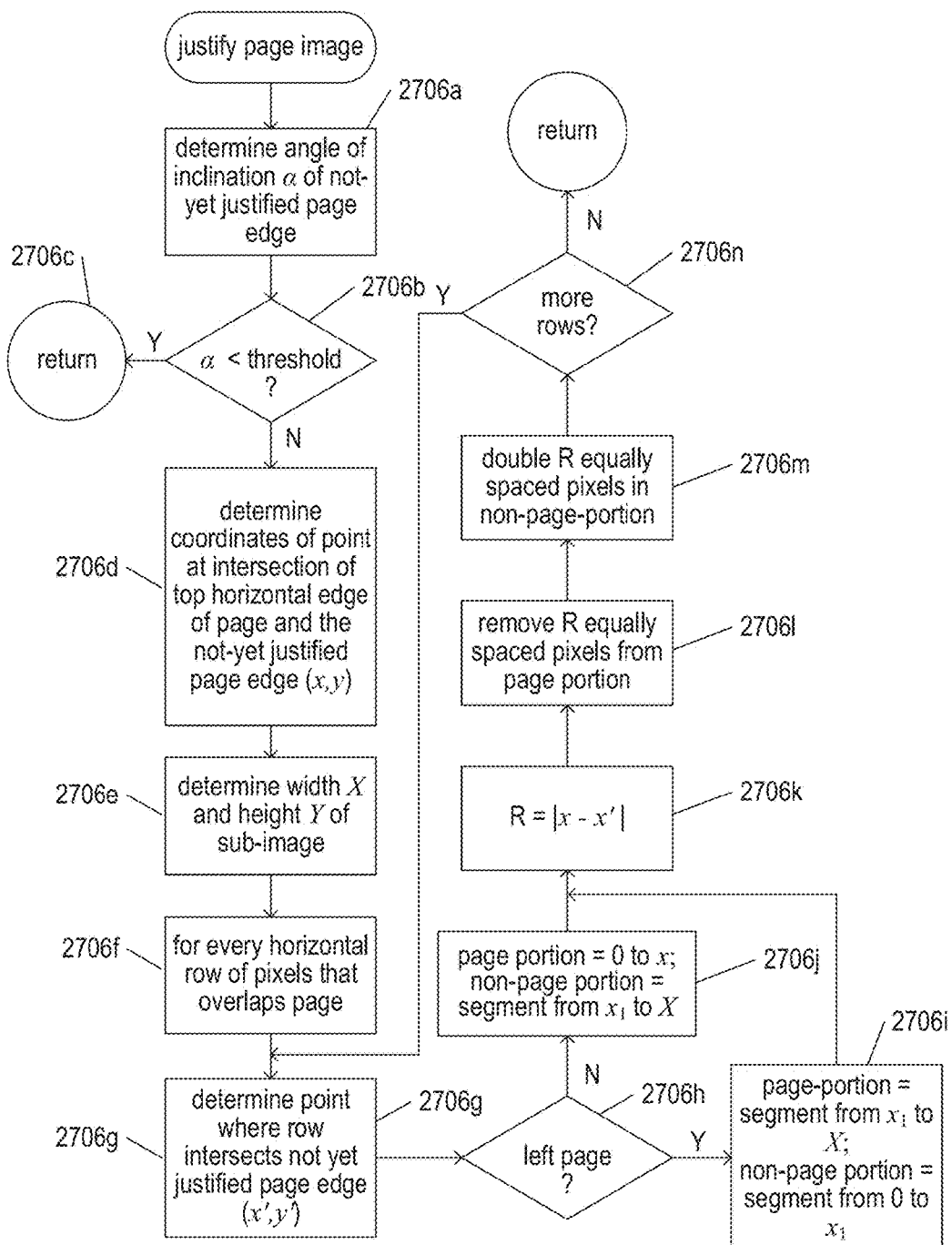
FIG. 27C provides control-flow diagrams that illustrate one implementation of the method for correcting perspective-induced curvature of text lines in images of text captured by mobile devices and other types of text-imaging equipment and appliances.
Figure 27D:
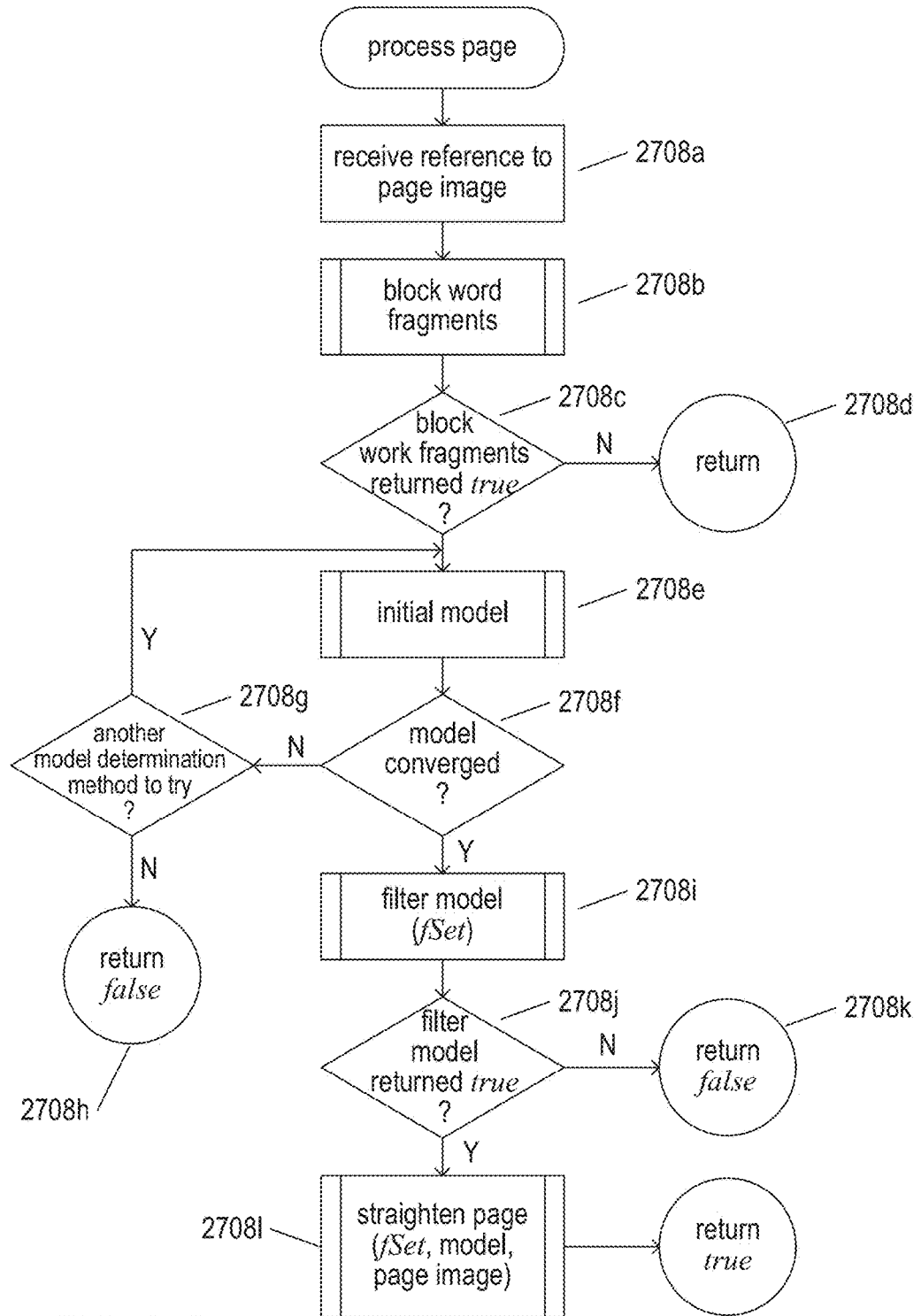
FIG. 27D provides control-flow diagrams that illustrate one implementation of the method for correcting perspective-induced curvature of text lines in images of text captured by mobile devices and other types of text-imaging equipment and appliances.
Figure 27E:
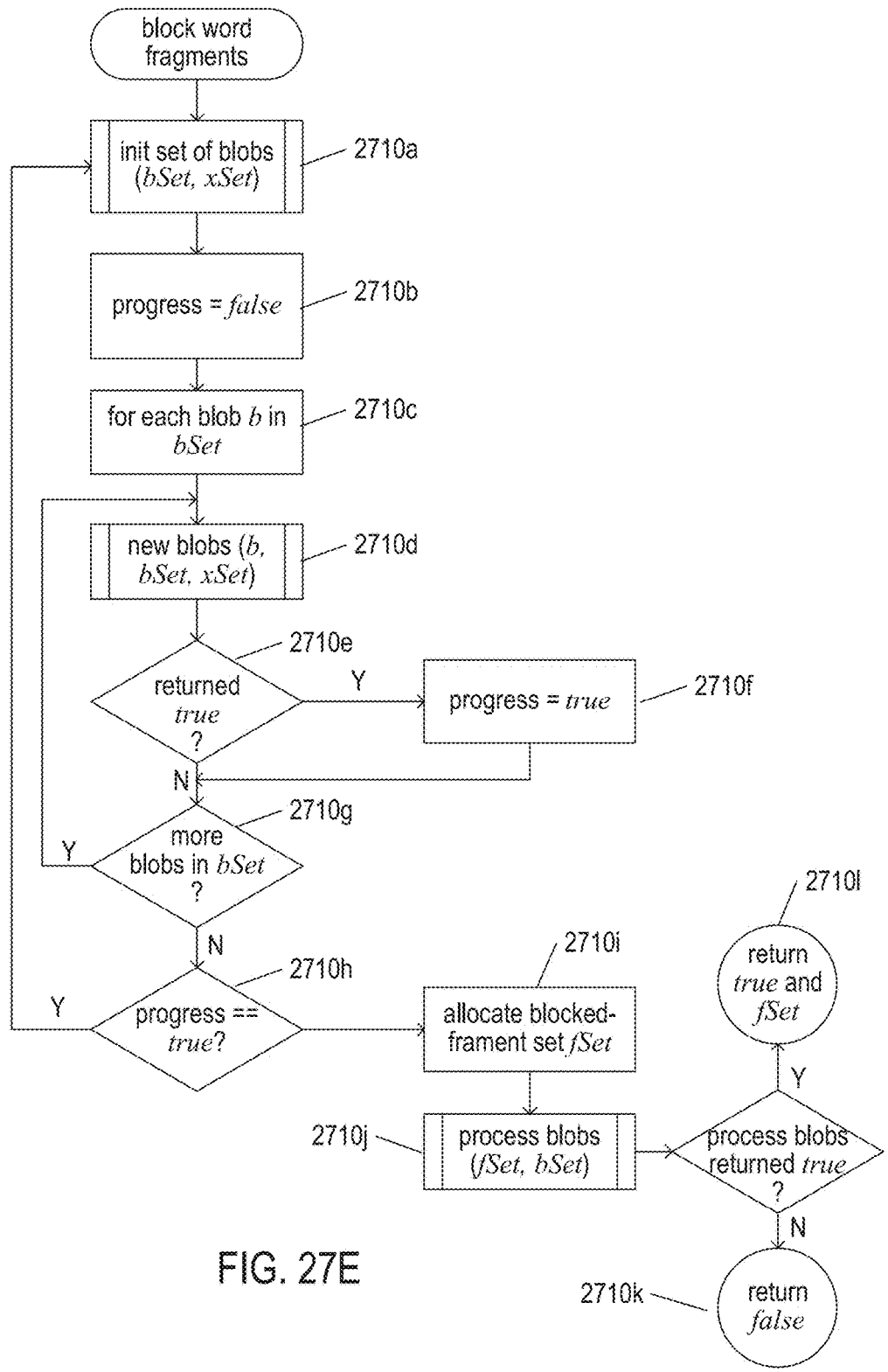
FIG. 27E provides control-flow diagrams that illustrate one implementation of the method for correcting perspective-induced curvature of text lines in images of text captured by mobile devices and other types of text-imaging equipment and appliances.
Figure 27F:
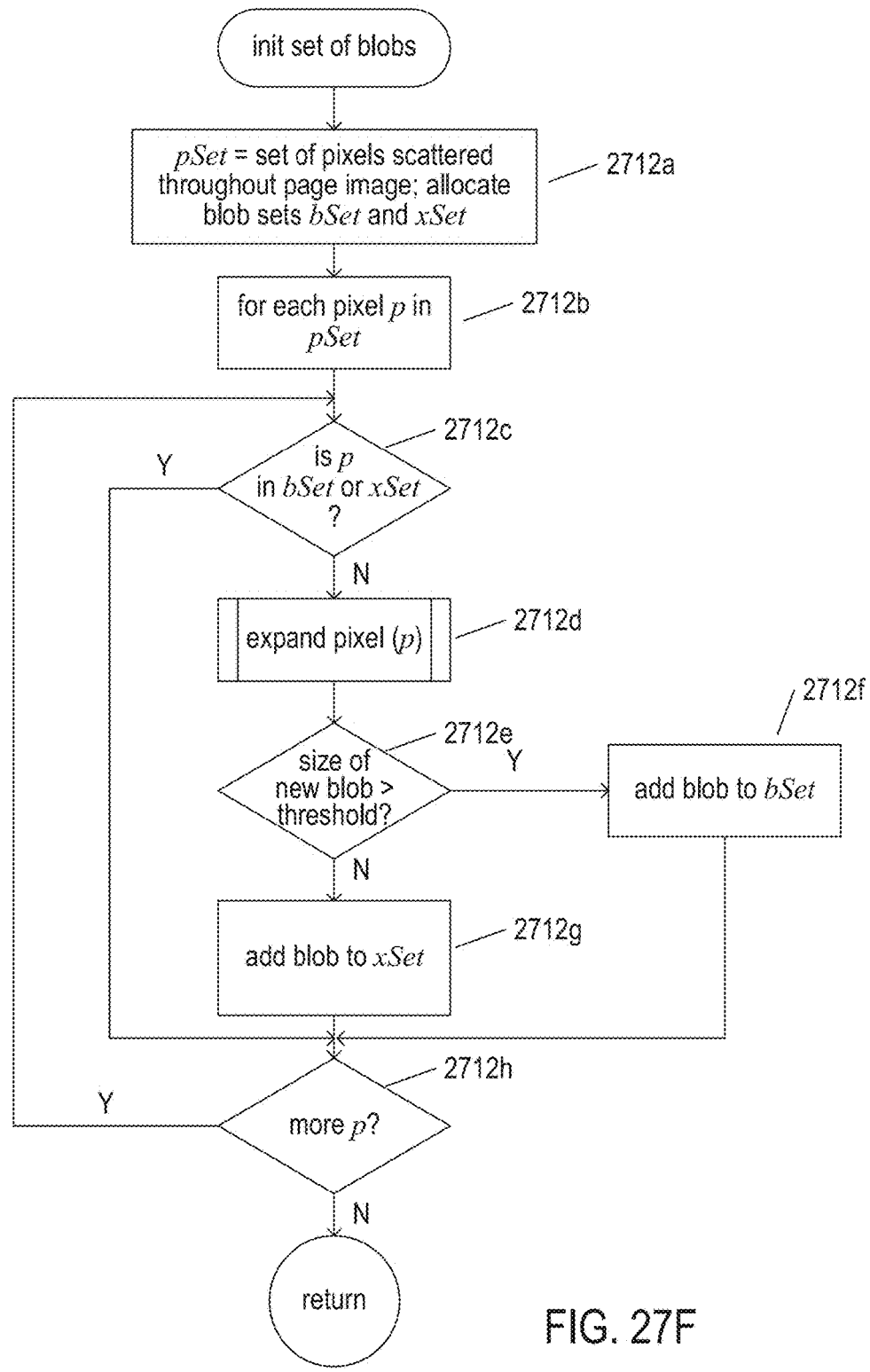
FIG. 27F provides control-flow diagrams that illustrate one implementation of the method for correcting perspective-induced curvature of text lines in images of text captured by mobile devices and other types of text-imaging equipment and appliances.
Figure 27G:
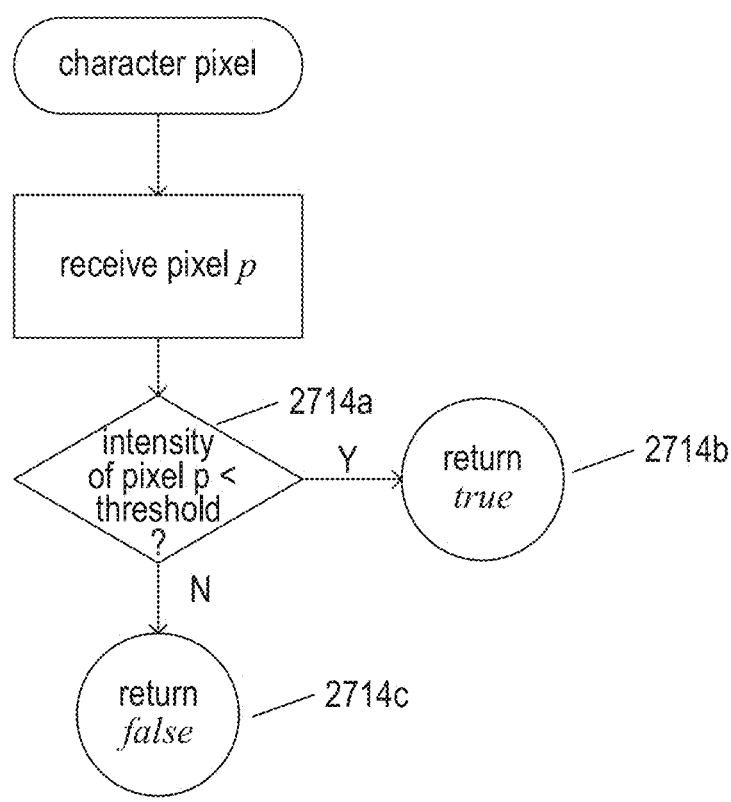
FIG. 27G provides control-flow diagrams that illustrate one implementation of the method for correcting perspective-induced curvature of text lines in images of text captured by mobile devices and other types of text-imaging equipment and appliances.
Figure 27H:
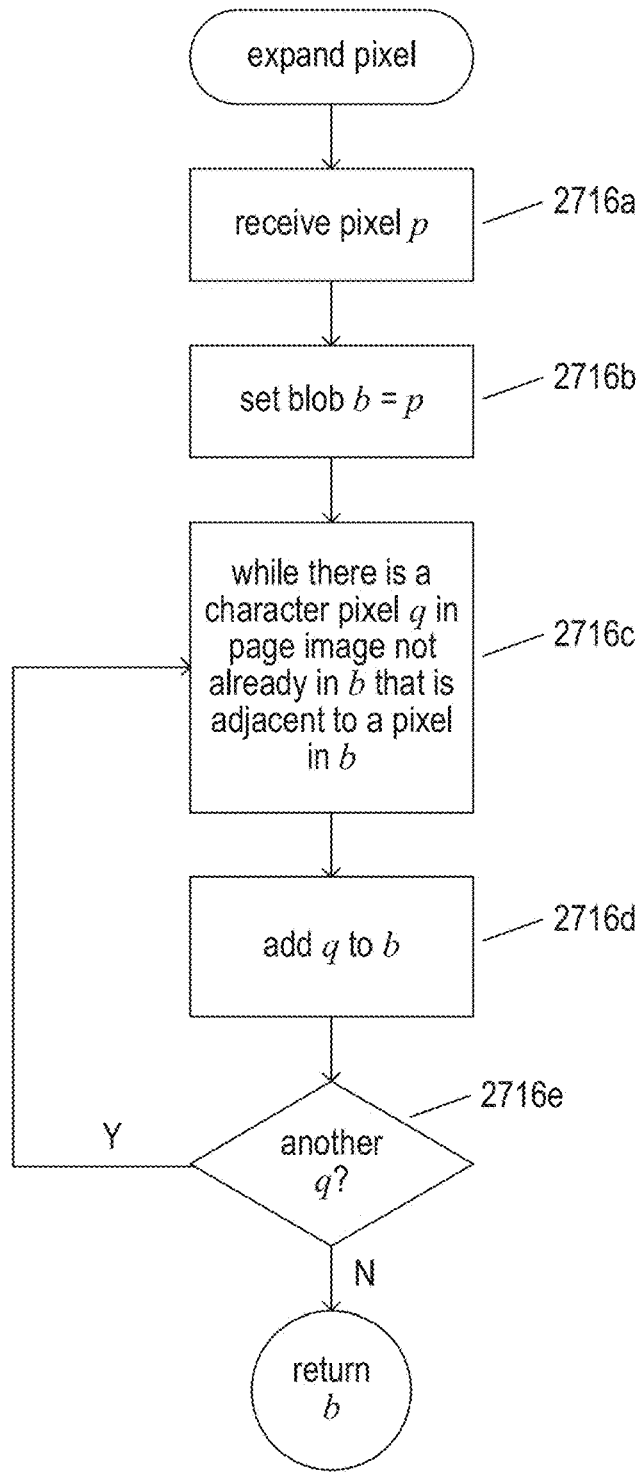
FIG. 27H provides control-flow diagrams that illustrate one implementation of the method for correcting perspective-induced curvature of text lines in images of text captured by mobile devices and other types of text-imaging equipment and appliances.
Figure 271:
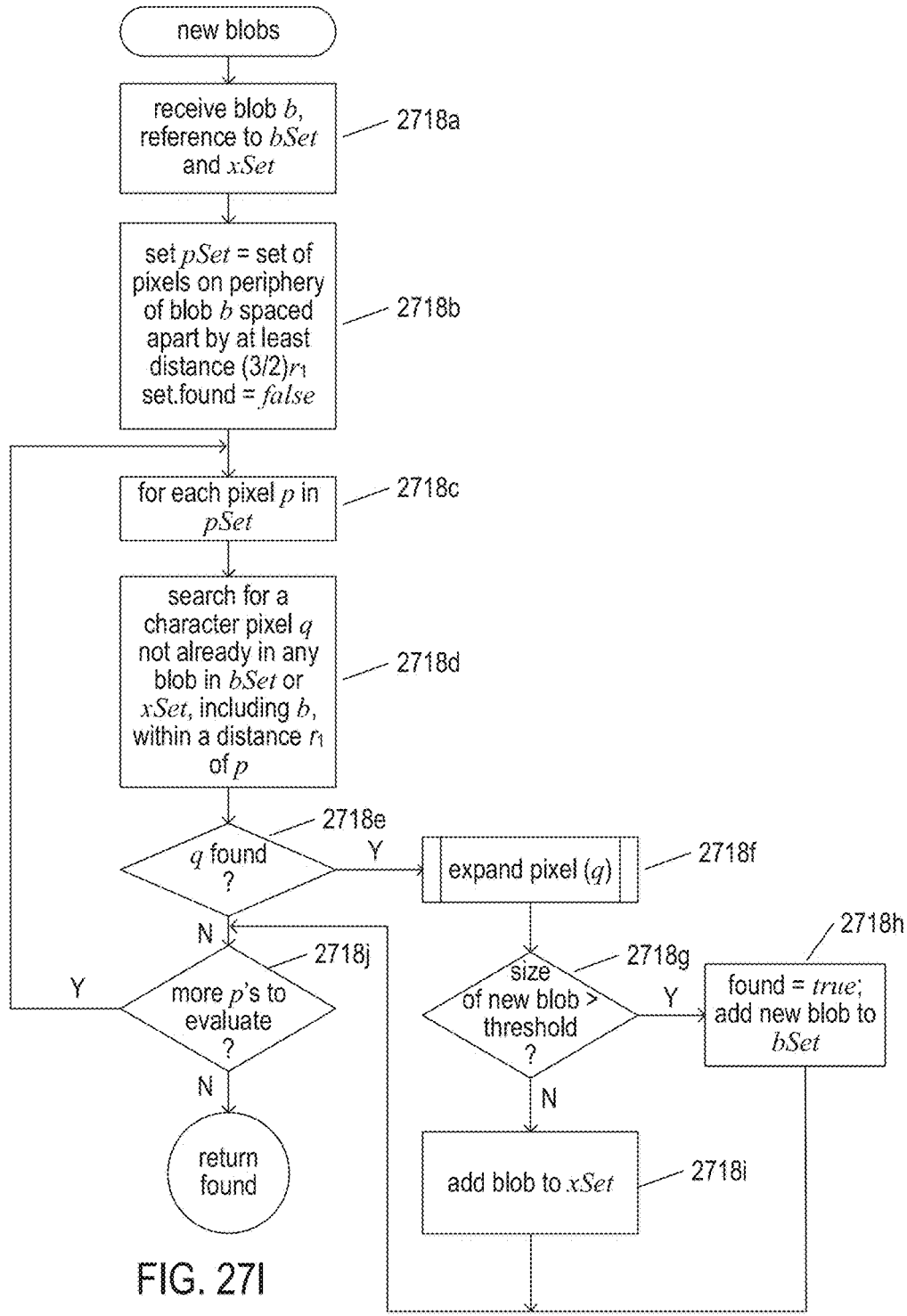
Figure 27J:
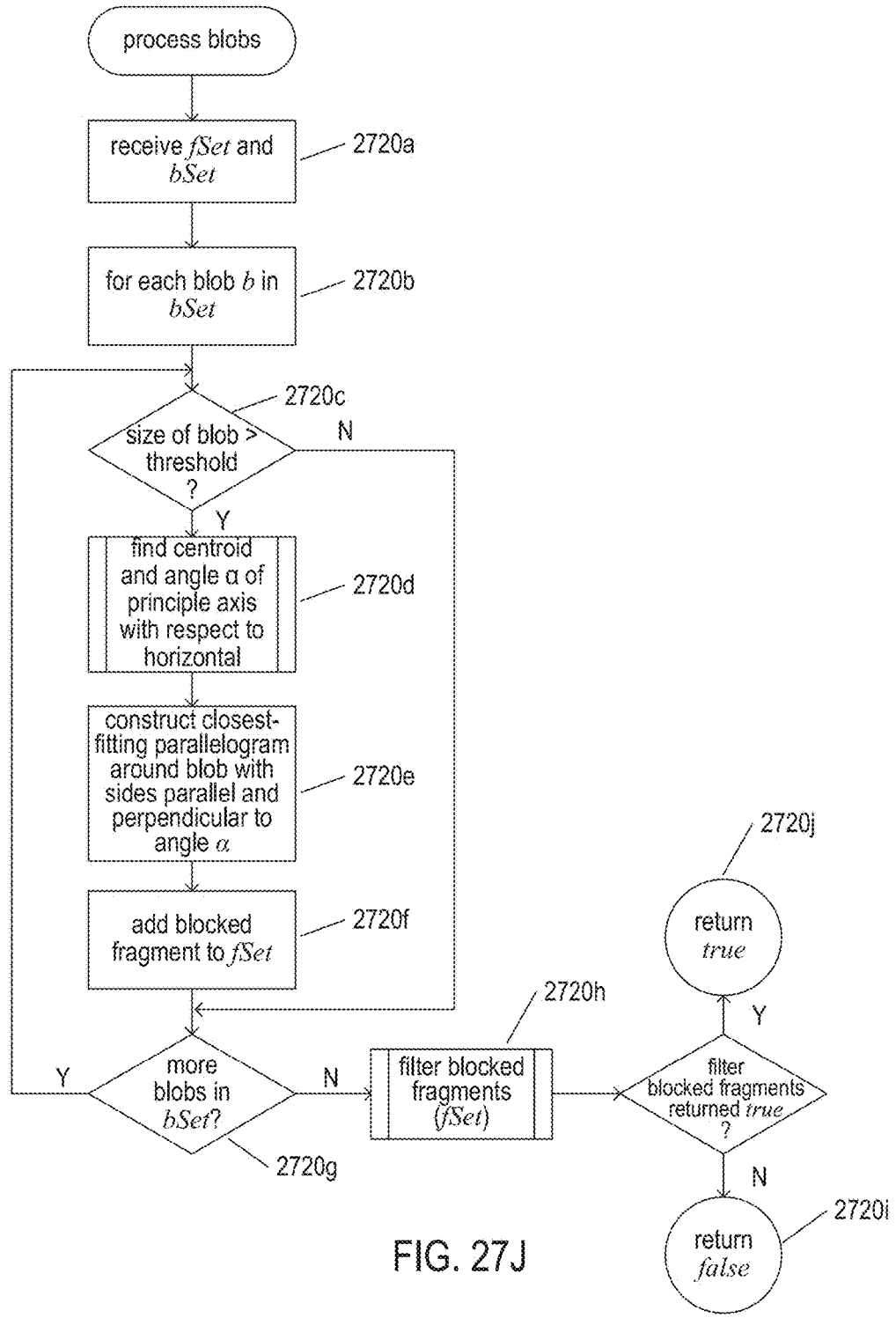
FIG. 27J provides control-flow diagrams that illustrate one implementation of the method for correcting perspective-induced curvature of text lines in images of text captured by mobile devices and other types of text-imaging equipment and appliances.
Figure 27K:
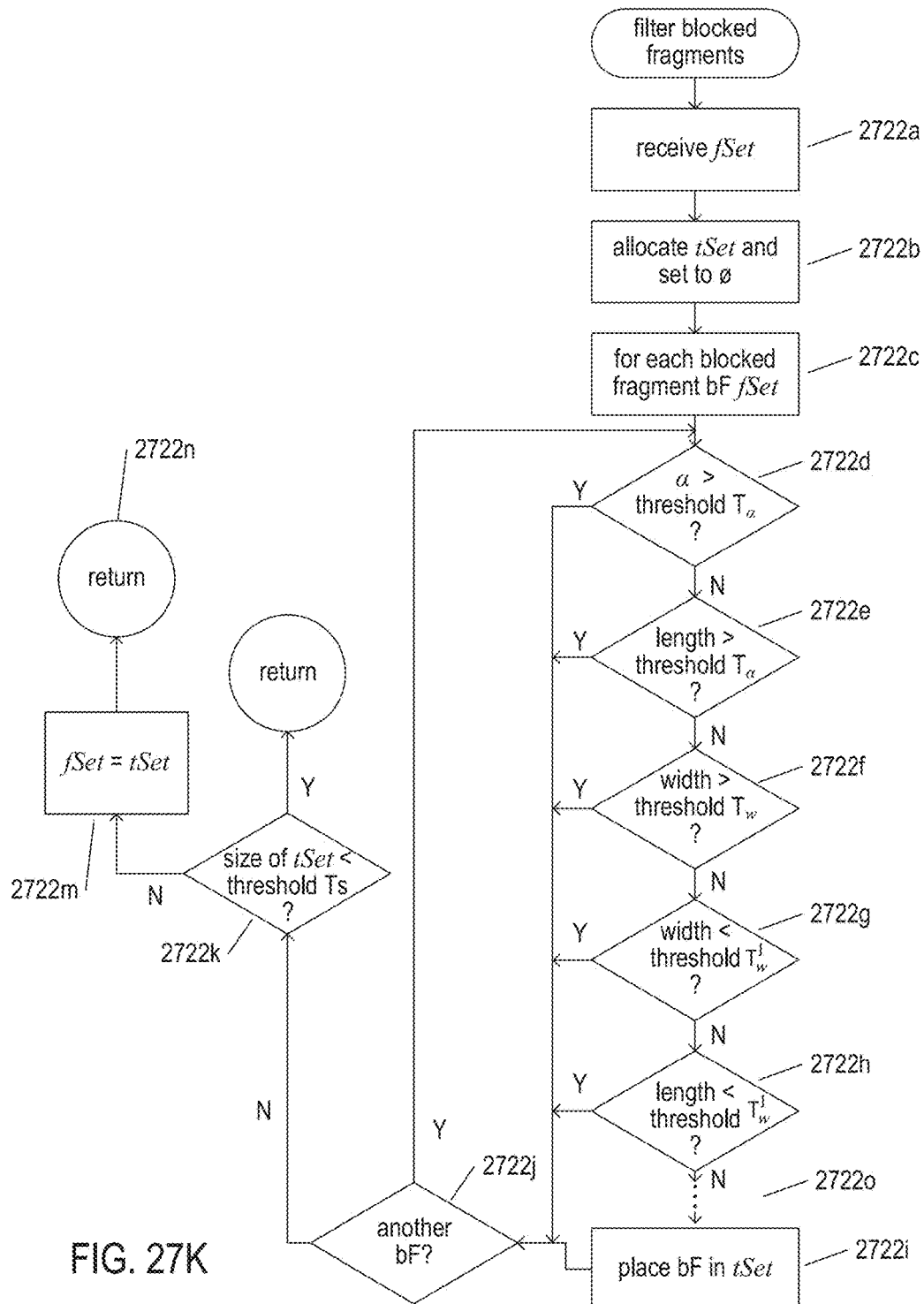
FIG. 27K provides control-flow diagrams that illustrate one implementation of the method for correcting perspective-induced curvature of text lines in images of text captured by mobile devices and other types of text-imaging equipment and appliances.
Figure 27L:
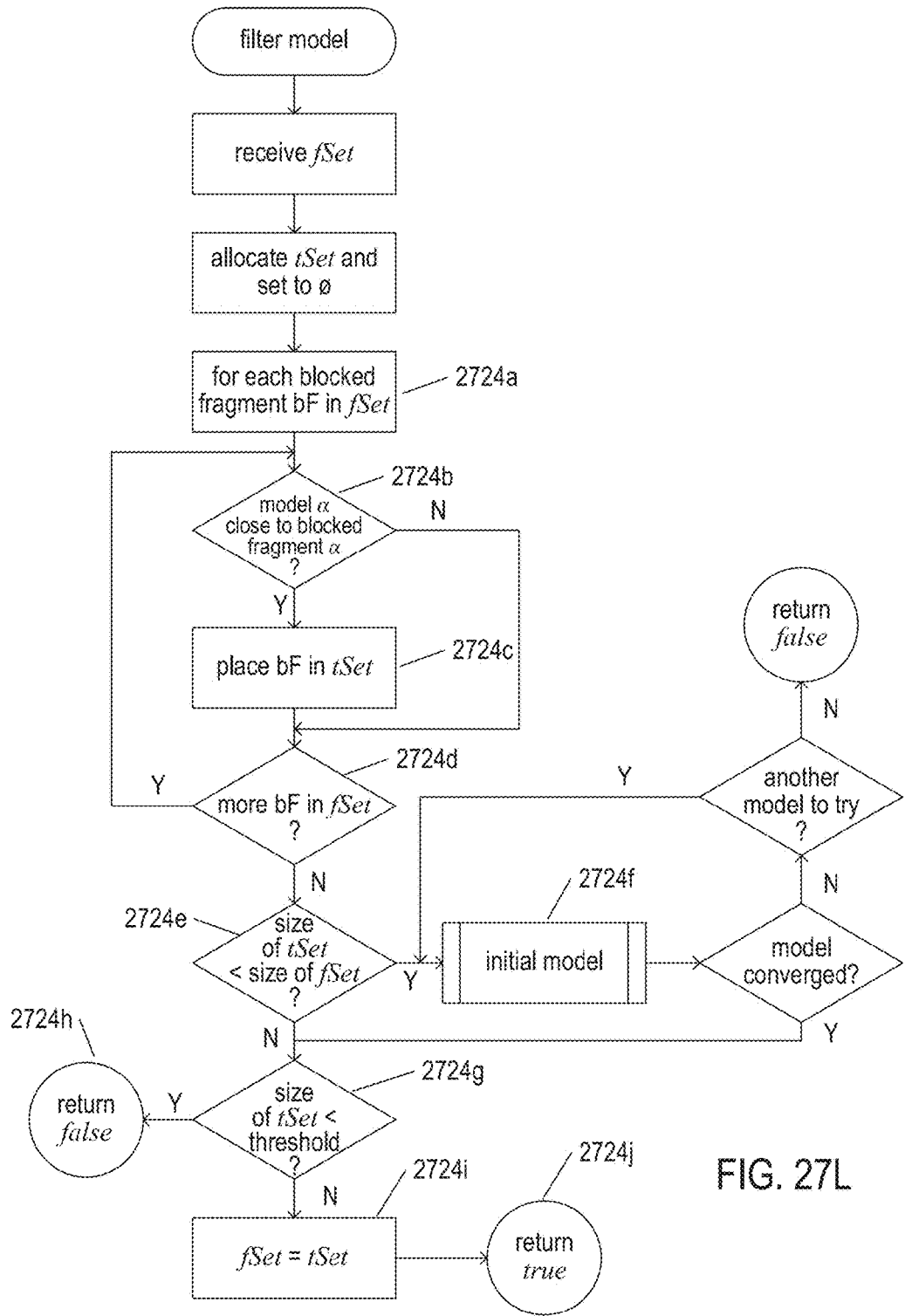
FIG. 27L provides control-flow diagrams that illustrate one implementation of the method for correcting perspective-induced curvature of text lines in images of text captured by mobile devices and other types of text-imaging equipment and appliances.
Figure 27M:
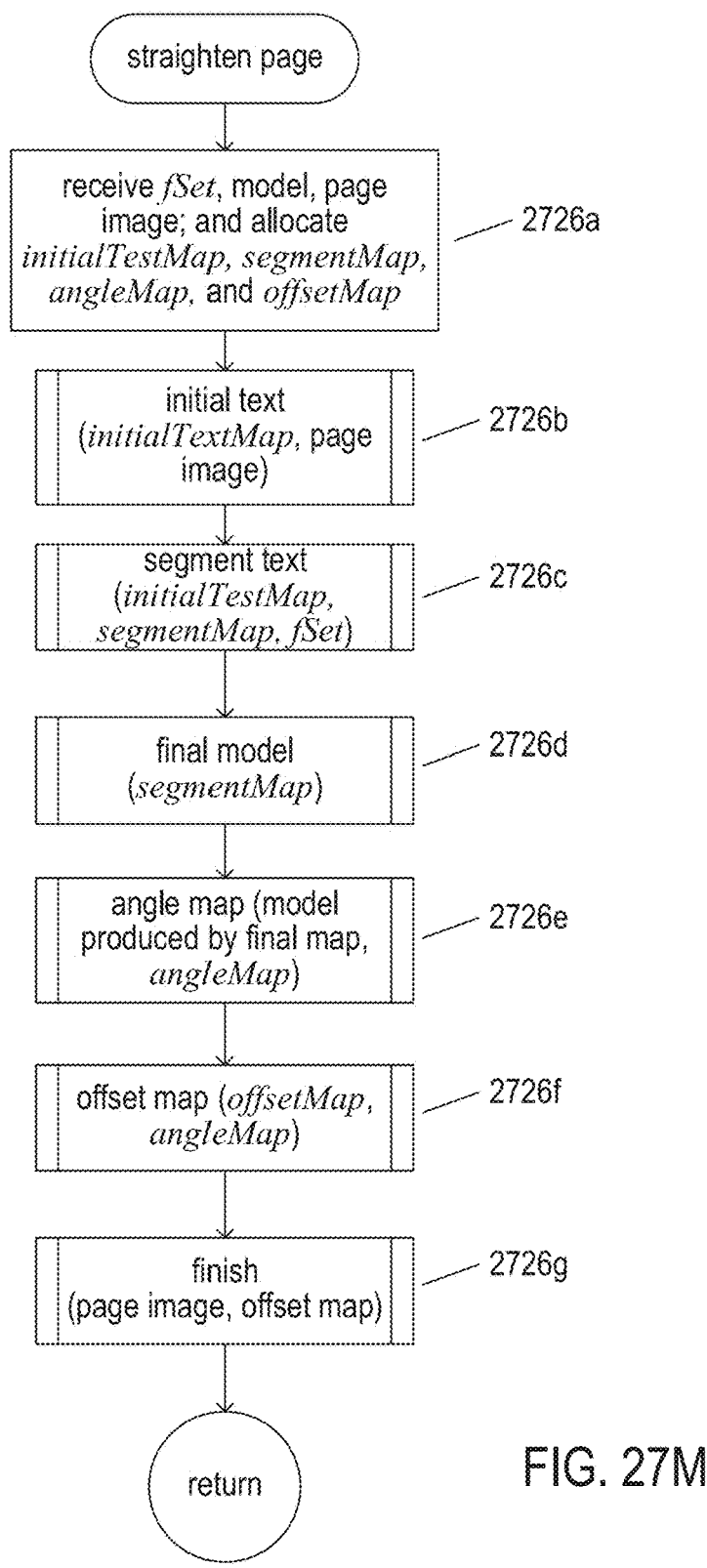
FIG. 27M provides control-flow diagrams that illustrate one implementation of the method for correcting perspective-induced curvature of text lines in images of text captured by mobile devices and other types of text-imaging equipment and appliances.
Figure 27N:
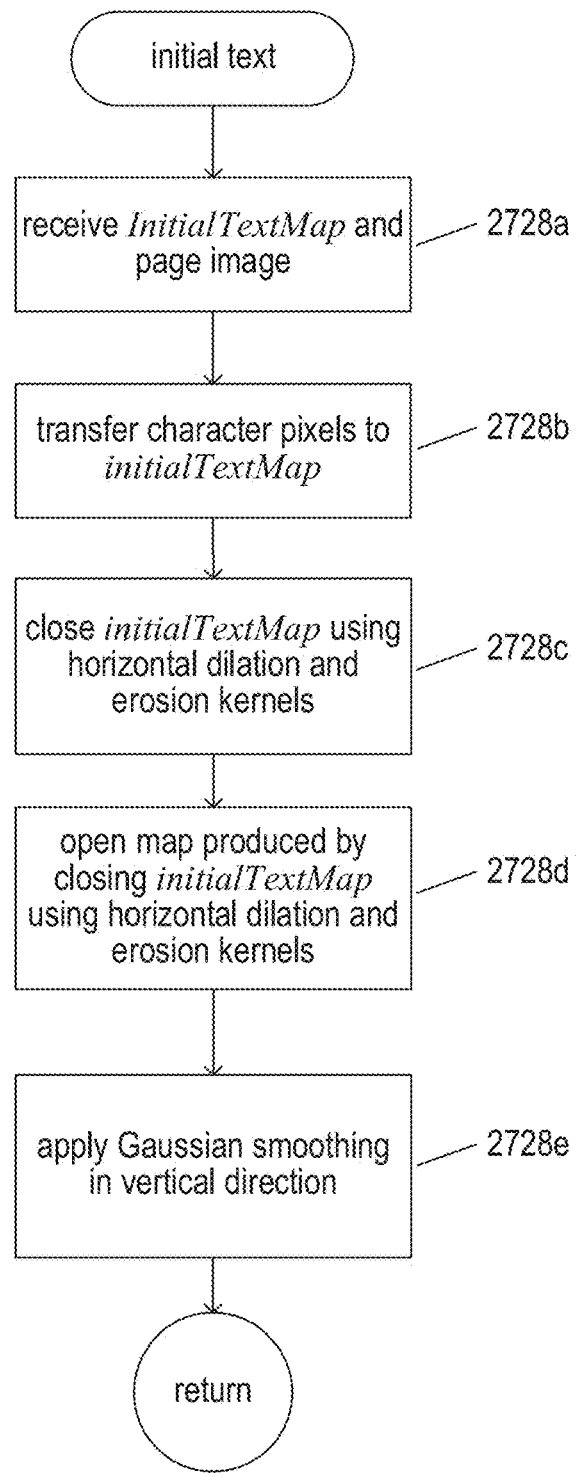
FIG. 27N provides control-flow diagrams that illustrate one implementation of the method for correcting perspective-induced curvature of text lines in images of text captured by mobile devices and other types of text-imaging equipment and appliances.
Figure 27O:
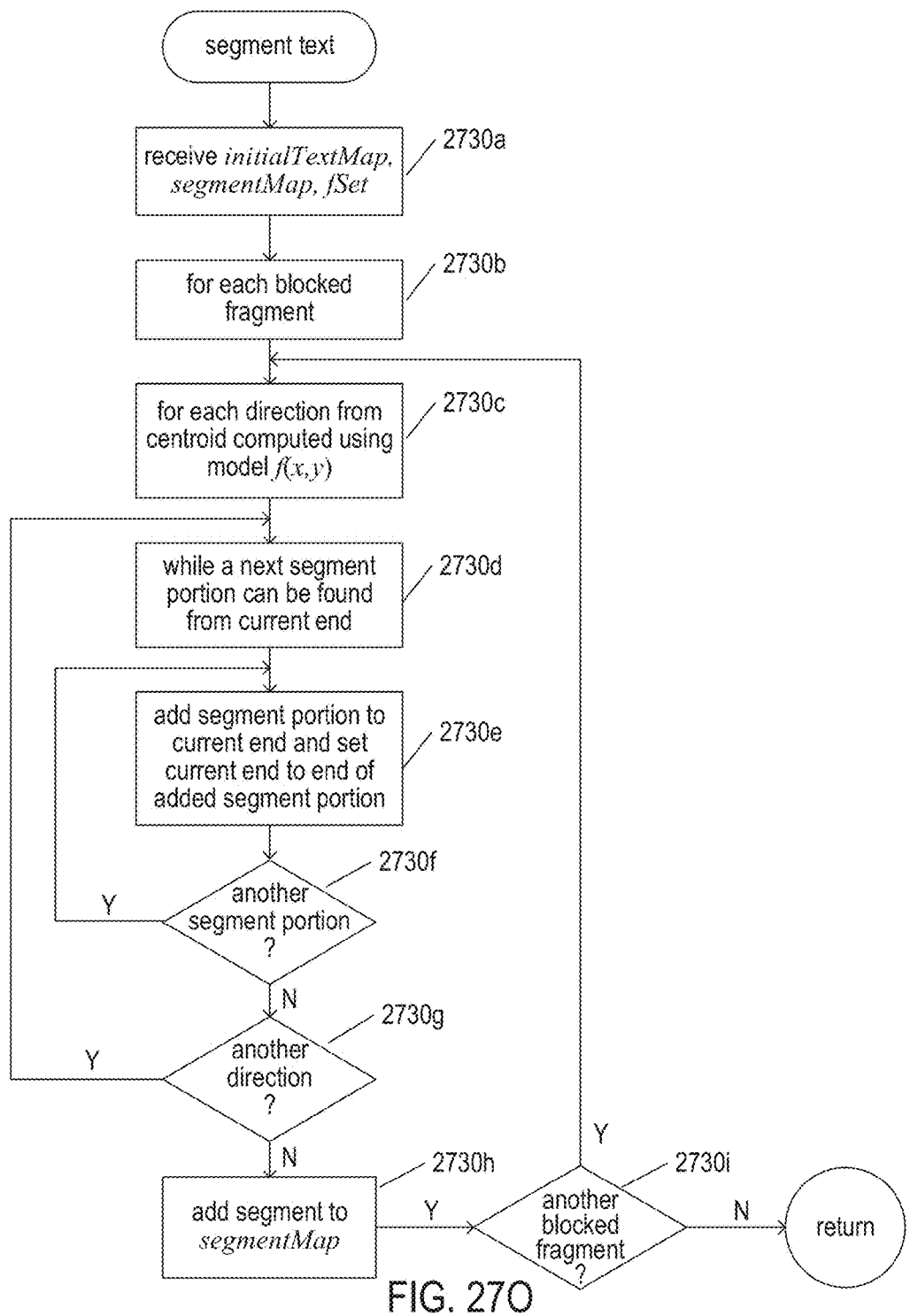
FIG. 27O provides control-flow diagrams that illustrate one implementation of the method for correcting perspective-induced curvature of text lines in images of text captured by mobile devices and other types of text-imaging equipment and appliances.
Figure 27P:
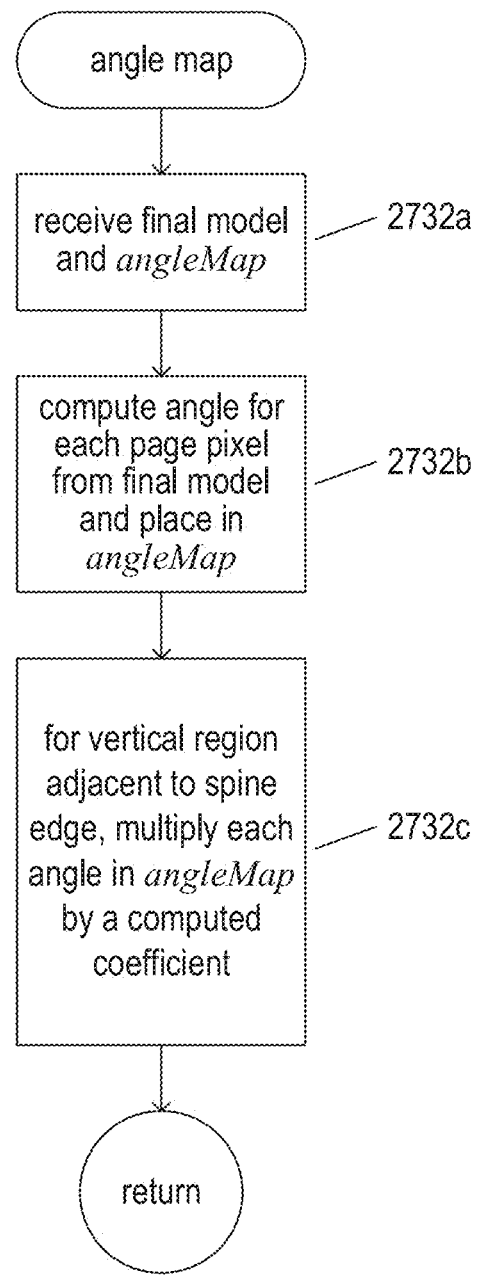
FIG. 27P provides control-flow diagrams that illustrate one implementation of the method for correcting perspective-induced curvature of text lines in images of text captured by mobile devices and other types of text-imaging equipment and appliances.
Figure 27Q:
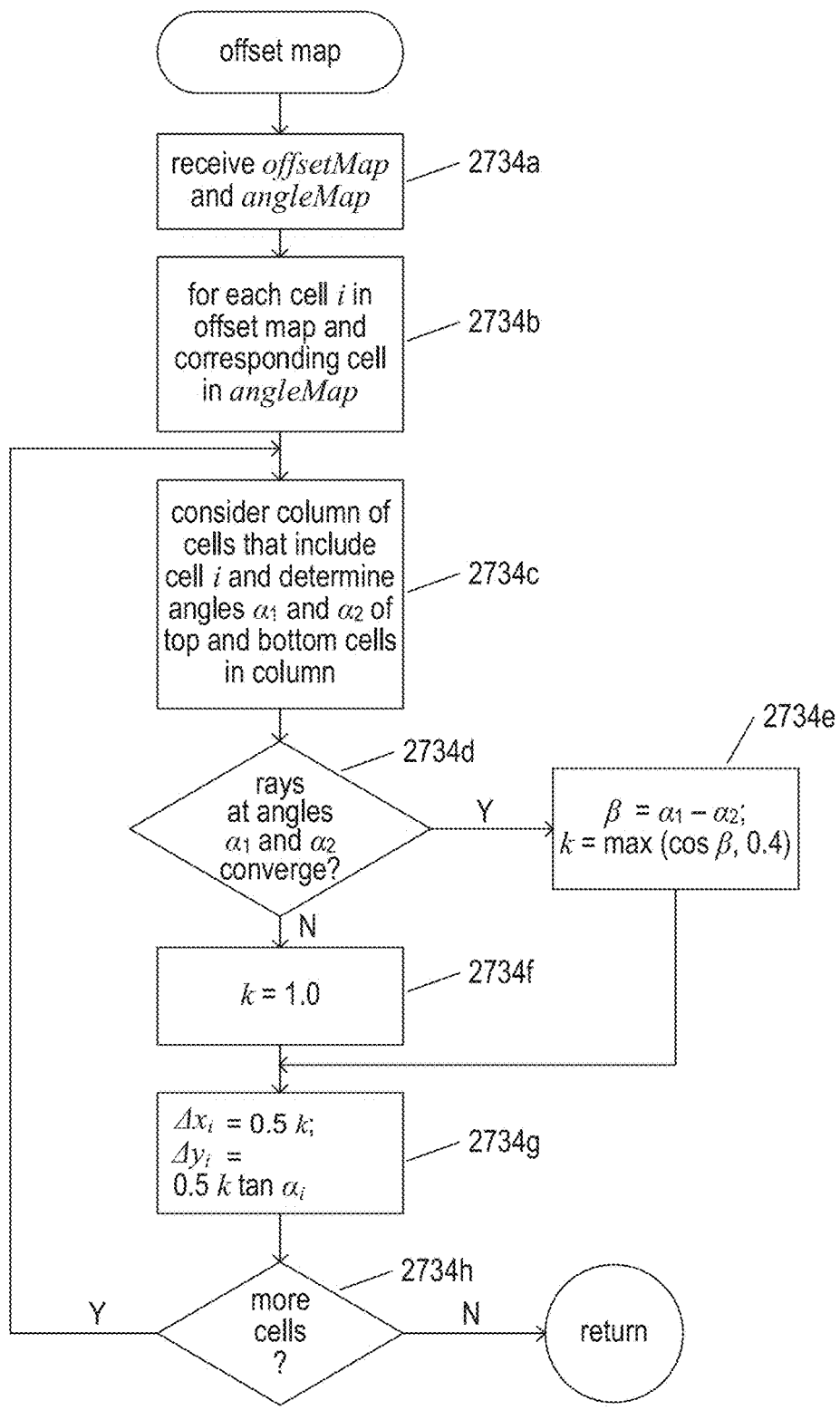
FIG. 27Q provides control-flow diagrams that illustrate one implementation of the method for correcting perspective-induced curvature of text lines in images of text captured by mobile devices and other types of text-imaging equipment and appliances.
Figure 27R:
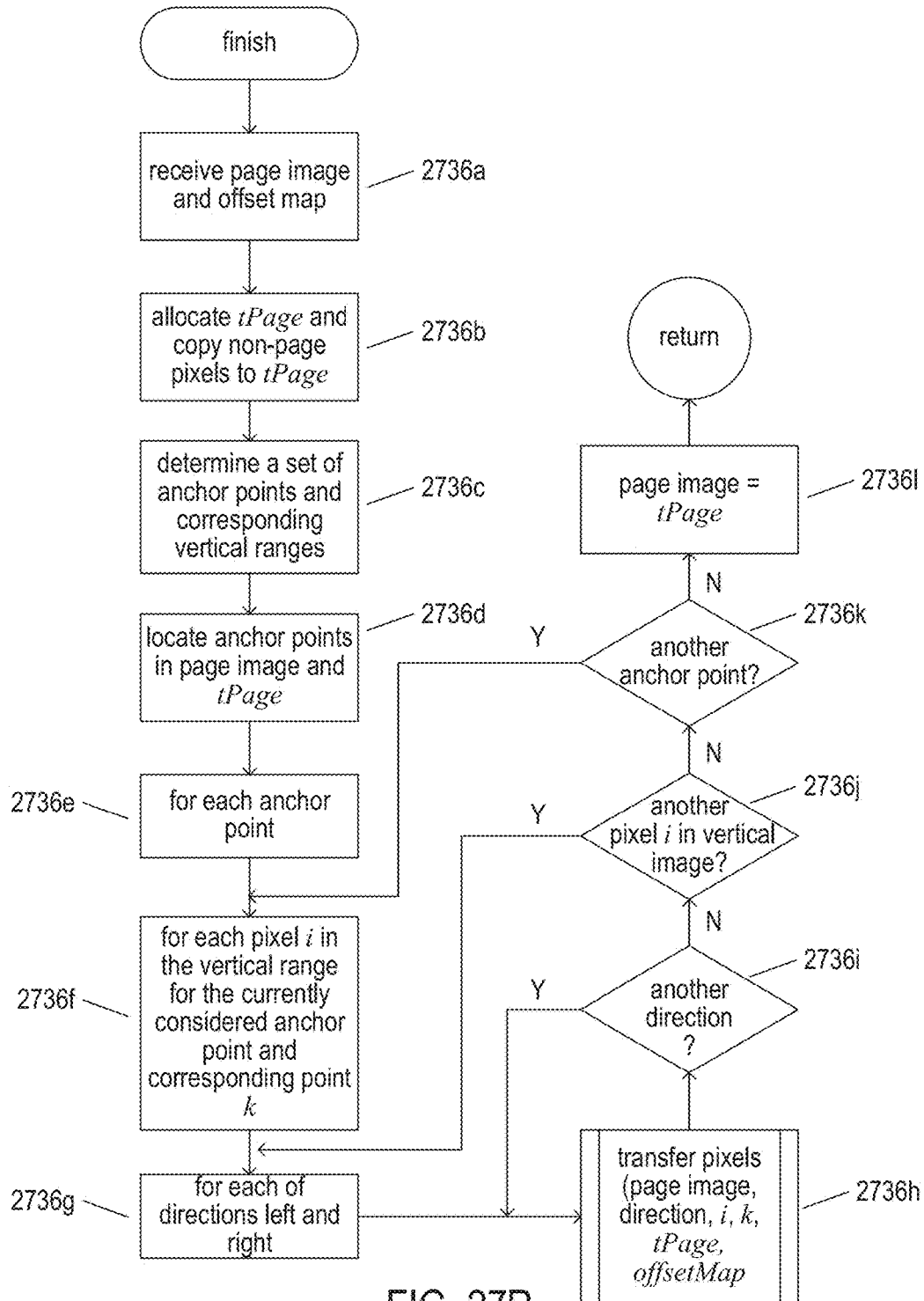
FIG. 27R provides control-flow diagrams that illustrate one implementation of the method for correcting perspective-induced curvature of text lines in images of text captured by mobile devices and other types of text-imaging equipment and appliances.
Figure 27S:
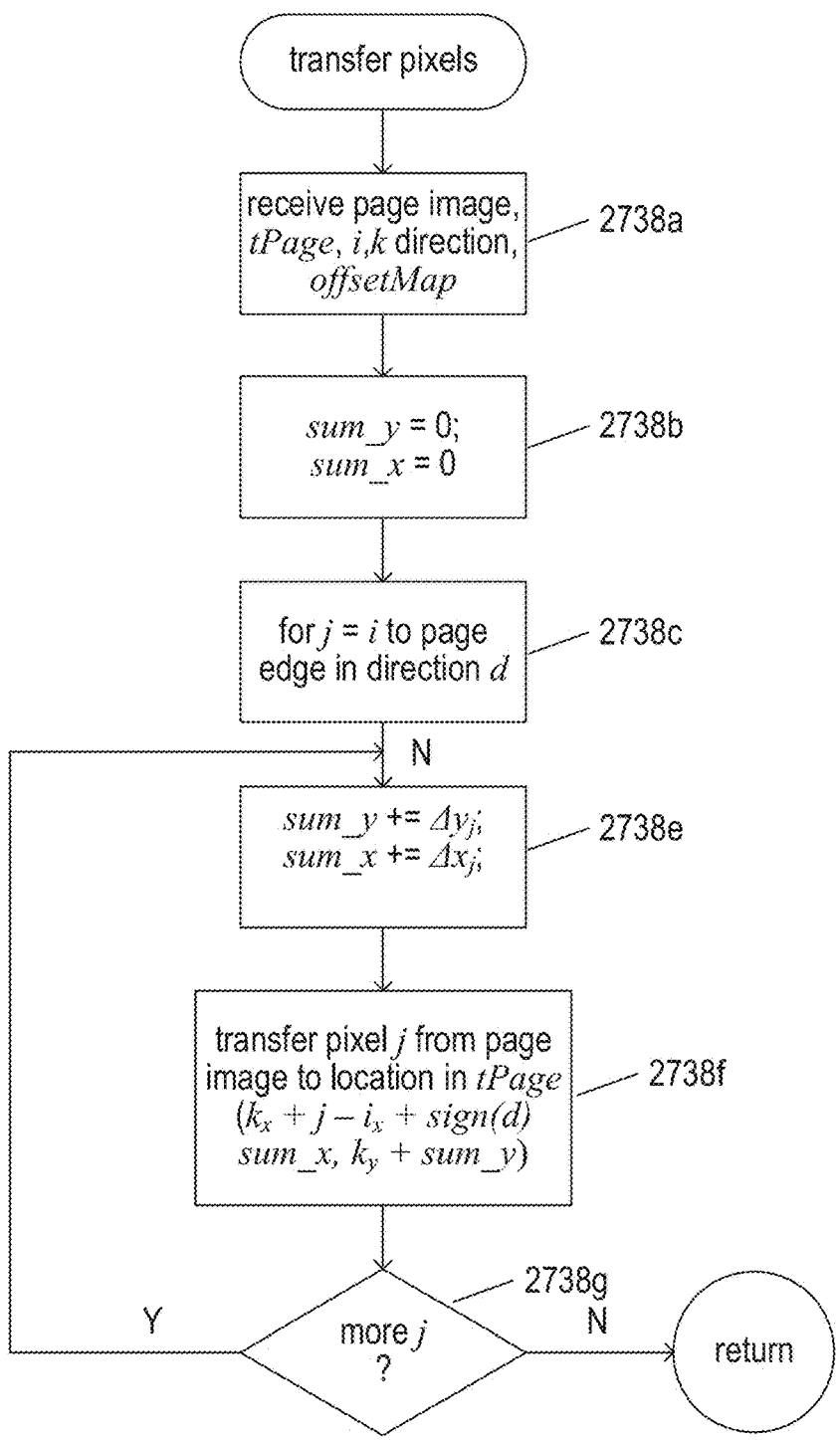
FIG. 27S provides control-flow diagrams that illustrate one implementation of the method for correcting perspective-induced curvature of text lines in images of text captured by mobile devices and other types of text-imaging equipment and appliances.

Control-flow-diagram Illustration of One Implementation of the Currently Disclosed Methods and Systems FIGS. 27A-S provide control-flow diagrams that illustrate one implementation of the method for correcting perspective-induced curvature of text lines in images of text captured by mobile devices and other types of text-imaging equipment and appliances. This method can be incorporated into mobile computing appliances, including smart phones, as well as other computing platforms in order to process text images in preparation for carrying out optical character recognition. It should be re-emphasized that the computer instructions that together comprise an implementation of the method in certain devices, appliances, and computational platforms are fully instantiated, physical components of the devices, appliances, and computational platforms in which they are included. Physically stored computer instructions represent the majority of machine controllers in the modern world, having supplanted older circuit-based and electromechanical control systems. Few modern electronic devices would be able to operate at any functional level without stored computer instructions executed on one or more microprocessors or processors. The currently disclosed methods, incorporated into various types of devices, appliances, and computational platforms, are intimately integrated with digital-imaging hardware and control components, physical memories, and many other internal components of the devices, appliances, and computational systems and could not be carried out manually or in any context other than the devices, appliances, and computational systems in which they are included.

FIG. 27A provides a control-flow diagram for one implementation of the overall method for processing images of book pages and other text images. In step 2702a, an image of an open book is received along with references to storage space for two page images P1 and P2. In step 2702b, a routine "initial processing" is called to carry out denoising, edge detection, page-border detection, and vertical alignment of the edges of the two page images generated from the received image of an open book, as discussed above with reference to FIGS. 14A-15B. Should initial processing fail, as determined in step 2702c, a false value is returned in step 2702d. Otherwise, in the for-loop of steps 2702e-2702i, each of the two page images P1 and P2 generated by the initial processing routine are processed by a call to the routine "process page," in step 2702f The method returns the return value returned by the routine "process page" in either of steps 2702h or step 2702j. In the currently described implementation, both pages of a two-page image need to be successfully processed in order for the value true to be returned. In alternative implementations, a more complex return value may be used to identify whether either one of the two pages was successfully processed in the case that both of the page images were not successfully processed.

FIG. 27B provides a control-flow diagram for the routine "initial processing," called in step 2702b of FIG. 27A. In step 2704a, the routine receives the book image and references to allocated memory for page images P1 and P2. When the received image is a color image, as determined in step 2704b, the color image is transformed into a monochrome image, in step 2704c, by the method discussed above with reference to FIG. 6. In step 2704d, the image is smoothed using a Gaussian kernel or median filter, discussed above with reference to FIGS. 10-12. In step 2704e, a gradient map is generated from the smoothed image, as discussed above with reference to FIGS. 14A-C. The gradient map is filtered using a non-maximum suppression technique, discussed above with reference to FIG. 14B, as well as filtering identified edges based on length and other geometrical considerations, to produce an edge map, in step 2704f. In step 2704g, additional characteristics of book pages, the color distribution of the image, and other geometrical information are used to construct page outlines from the edges in the edge map generated in step 2704. When two pages are not identified in the image, as determined in step 2704h, then a value false is returned in step 2704i. Otherwise, in step 2704j, each of the page sub-images identified in step 2704g are transferred to page images P1 and P2 and the images are rotated so that the spine-adjacent edge of each page is coincident with the vertical axis of the page image, in step 2704k. Then, in the for-loop of steps 2704l-2704n, the routine "justify page image" is called, in step 2704m, to process each of the two page images P1 and P2

FIG. 27C provides a control-flow diagram for the routine "justify page image," called in step 2704m of FIG. 27B. This routine carries out the procedure discussed above with reference to FIG. 15B. In step 2706a, the routine determines the angle of inclination a of the non-spine edge of the page. When a is less than a threshold angle, as determined in step 2706b, no further processing is needed and the routine terminates, in step 2706c. Otherwise, in step 2706d, the routine determines the point of intersection between the edge of the page parallel to, but not adjacent to, the spine and the top edge of the page (point 1522 in FIG. 15B). In step 2706e, the routine determines the width and height of the page image in pixels. In the for-loop of steps 2706f-2706n, each horizontal row of pixels within the portion of the page image representing the page is processed. In step 2706g, the point where the page edge parallel, but not adjacent, to the spine intersects the pixel row is determined (1524 in FIG. 15B). Then, in step 2706i or 2706j, the lengths of the three segments of the horizontal row discussed with reference to FIG. 15B are determined. In step 2706k, the number of pixels to remove from the page region is determined. Then, in step 2706l and 2706m, certain of the pixels in the non-page portion in the horizontal row of pixels are doubled and certain of the pixels in the page portion of the horizontal row of pixels are removed, as illustrated in FIG. 15B.

FIG. 27D provides a control-flow diagram for the routine "process page," called in step 2702f of FIG. 27A. In step 2708a, a reference to a page image is received. In step 2708b, the routine "block word fragments" is called to carry out the fragment blocking method discussed above with reference to FIGS. 16A-17D. When fragment blocking is not successful, as determined in step 2708c, the routine returns the value false in step 2708d. Otherwise, in step 2708e, the routine "initial model" is called in order to generate the initial model f(x,y) by data fitting, as discussed above with reference to FIGS. 19A-B. When the model determination fails to converge, as determined in step 2708f, then when there is another data-fitting model available to try, as determined in step 2708g, the initial-model step 2708e is repeated using a different model. Otherwise, the routine returns false in step 2708h. In step 2708i, when an initial model has been created, the routine "filter model" is called to filter the blocked word fragments as discussed above with reference to FIG. 20. When filtering fails, as determined in step 2708j, then the routine returns false in step 2708k. Otherwise, in step 2708l, the routine "straighten page" is called to carry out the remaining steps of the currently disclosed method.

FIG. 27E provides a control-flow diagram for the routine "block word fragments," called in step 2708b of FIG. 27D. In step 2710a, a routine is called to initialize two sets of blobs or character-pixel aggregations bSet and xSet. In step 2710b, the variable progress is set to false. In the for-loop of steps 2710c-2710g, the current set of blobs or recognized character-pixel aggregations are processed in order to find any new blobs or character-pixel aggregations within the page image, via a call to the routine "new blobs," in step 2710d. When new blobs are found, as determined in step 2710e, the variable progress is set to true in step 2710f. This process continues in an outer loop of steps 2710b-2710h until no additional new blobs are identified. The process of identifying and expanding the set of blobs is one implementation of the method generally described with reference to FIGS. 16C-G. In step 2710i, spaces allocated for a blocked-fragment set fSet and the routine "process blobs" is called in step 2710j to create blocked fragments from the blobs as discussed above with reference to FIGS. 17A-D. The value returned by the routine "process blobs" is returned in one of steps 2710k and 2710l. A reference to the set of blocked fragments/Set is also returned in step 2710l.

FIG. 27F provides a control-flow diagram for the initialization routine called in step 2710a of FIG. 27E. In step 2712a, a set of pixels relatively evenly scattered throughout the page image, pSet, is created and memory for the blob sets bSet and xSet is allocated. In the for-loop of steps 2712b-2712h, the routine attempts to expand each pixel in the set pSet into a blob or character aggregation. When the pixel p is not already a member of a blob, as determined in step 2712c, the routine "expand pixel" is called in step 2712d to attempt to expand the pixel into a character-pixel aggregation, or blob. When the blob returned by the routine "expand pixel" is greater than the threshold size, as determined in step 2712e, the blob is added to the set bSet in step 2712f. Otherwise the blob is added to the set xSet in set 2712g. Thus, only blobs of sufficient size to constitute word fragments are added to the set bSet.

FIG. 27G illustrates how a pixel is determined to be a character pixel, in one implementation. When the intensity value of the pixel falls below a threshold value, as determined in step in step 2714a, the pixel is considered to be a character pixel and the value true is returned in step 2714b. Otherwise the value false is returned, in step 2714c, to indicate that the pixel is not a character pixel. In other implementations, additional considerations may be applied to determine whether or not a pixel is a character pixel, including examination of the pixel's neighborhood to make sure that the pixel is a part of a pixel aggregation. Because the color image is still available, when the original image is a color image, various types of color-based considerations may also be applied to distinguish character pixels from non-character-pixel background pixels. Of course, text pages may also contain figures, diagrams, and other non-text regions, and additional considerations may be used to disregard pixels from these types of regions. However, as discussed below, filtering is carried out on the blobs initially obtained by the currently described method in order to ensure that the retained blobs have a high probability of representing word fragments.

FIG. 27H is a control-flow diagram for the routine "expand pixel," called in step 2712d in FIG. 27F. In step 2716a, the coordinates for a pixel are received. In step 2716b, a blob b is allocated and its initial member is set to the received pixel p. In the while-loop of steps 2716c-2716e, characters are added to the blob that are adjacent to the original pixel p or any characters previously added in previous iterations of the while-loop.

FIG. 27I provides a control-flow diagram for the routine "new blobs," called in step 2710d of FIG. 27E. In step 2718a, a blob b and references to the blob sets bSet and xSet are received. In step 2718b, a local variable pSet is set to include an evenly spaced group of pixels on the periphery of blob b, spaced apart by at least 1.5 times the length $r_1$ discussed above, and the local variable found is set to false. Then, in the for-loop of steps 2718c-2718j, a search is made from each of the pixels in the set pSet for additional character pixels not already in any blob within a distance $r_1$ of the pixel. When such a new pixel q is found in the search, as determined in step 2718e, then the pixel is expanded by a call to the routine "expand pixel," in step 2718f, and the blob returned by the routine is either added to the set bSet or to the set xSet, in one of steps 2718h or 2718i, depending on whether the blob is greater than the threshold size, as determined in step 2718g.

FIG. 27J provides a control-flow diagram for the routine "process blobs," called in step 2710j of FIG. 27E. In step 2720a, the routine receives the empty blocked-fragment set/Set and the blob set bSet. Then, in the for-loop of steps 2720b-2720g, each blob in the set bSet is considered. When the size of the currently considered blob is greater than the threshold size, as determined in step 2720c, then, in step 2720d, the centroid and inclination angle α of the blob is determined as discussed above with reference to FIGS. 17A-C. Then, in step 2720e, a closest-fitting parallelogram or rectangle is constructed around the blob as discussed above with reference to FIG. 17D. The blocked fragment produced in step 2720e is added to the set/Set in step 2720f. In step 2720h, the blocked fragments are filtered and the value returned by the filter routine called in step 2720h is returned by the routine "process blobs" in one of steps 2720i and 2720j.

FIG. 27K provides a control-flow diagram for the routine "filter blocked fragments" called in step 2720h in FIG. 27J. In step 2722a, the blocked-fragment set fSet is received. In step 2722b, an empty blocked-fragment set tSet is allocated and set to the empty set. In the for-loop of steps 2722c-2722j, various tests are applied to each fragment contained in the set fSet, and only when the currently considered fragment passes all of the tests is it placed in the set tSet in step 2722i. When the set tSet has less than a threshold number of blocked fragments, as determined in step 2722k, the routine returns the value false in step 2722l. Otherwise, fSet is set to be equal to tSet, in step 2722m and the value true is returned in step 2722n. The various filtering considerations include determining whether the inclination angle α for the blocked fragment is greater than a threshold value, in step 2722d, and determining whether the width and length of the blocked fragment falls within acceptable ranges, in step 2722e-2722h. Ellipses 2722o indicate that there may be other tests applied in the filtering operation.

FIG. 27L provides a control-flow diagram for the routine "filter model," called in step 2708i of FIG. 27D. This routine is equivalent to the filtering method discussed above with reference to FIG. 20. This routine is also similar to the routine discussed above with reference to FIG. 27K. In the for-loop of steps 2724a-d, blocked fragments are disregarded when the inclination angle α is not sufficiently close to the inclination angle α computed by model f(x,y). The block fragment is copied to the set tSet when the observed inclination angle α is different from the inclination angle α computed from the initial model f(x,y) by less than a threshold amount. When any of the blocked fragments have been removed, as determined in step 2724e, the initial model is recomputed in step 2724f. In alternative implementations, the initial model is recomputed when more than a threshold number of blocked fragments have been removed by filtering. When the size of the set tSet is less than a threshold value, as determined in step 2724g, the routine "filter model" returns a value false in step 2724h. Otherwise, in step 2724i, fSet is set to tSet and the value true is returned in step 2724j.

FIG. 27M provides a control-flow diagram for the routine "straighten page," called in step 2708l of FIG. 27D. In step 2726a, the routine "straighten page" receives the set of blocked word fragments fSet, the current curvature model f(x,y), and a page image. In addition, the routine "straighten page" allocates four page maps: (1) initialTextMap, a data structure to hold filled contours generated by the method discussed with reference to FIG. 22; (2) segmentMap, a data structure to hold the curved text-line segments generated by the method discussed above with reference to FIGS. 23A-24B; (3) angleMap, a data structure to hold the inclination-angle map discussed above with reference to FIG. 25; and (4) offsetMap, a data structure to hold the offset map discussed above with reference to FIG. 26C. As discussed previously, these maps may be actual data structures, in certain implementations, or may be conceptual structures that are not actually physically stored, but generated on the fly from the data model and other information, in other implementations. In step 2726b, the routine "initial text" is called in order to prepare a text map by the method discussed above with reference to FIG. 22. In step 2726c, the routine "segment text" is called to carry out the method discussed above with reference to FIGS. 23A-24B. In step 2726d, the routine "final model" is called to carry out a final data-fitting step to generate a final model f(x,y) based on the contents of the vector map generated in step 2726c. In step 2726e, the routine "angle map" is called to generate the angle map discussed above with reference to FIG. 25. In step 2726f, the routine "offset map" is called to generate the offset map discussed above with reference to FIG. 26C. Finally, the routine "finish" is called, in step 2726g, to generate a corrected image from a page image and an offset map according to the method discussed above with reference to FIGS. 26E-F.

FIG. 27N provides a control-flow diagram for the initial-text routine called in step 2726b of FIG. 27M. In step 2728a, the routine receives the initial text map and page image. In step 2728b, character pixels are transferred from the page image to the initial text map, preserving their locations. The initial text map is a binary image. In step 2728c, the closing operation, discussed above with reference to FIGS. 21A-F, is carried out to generate an intermediate map. In step 2728d, the opening operation, discussed above with reference to FIGS. 21A-F, is carried out to generate the final text map (2206 in FIG. 22). Finally, in step 2728e, Gaussian smoothing is carried out in the vertical direction. In alternative implementations, closing and opening operators are applied to a copy of the grayscale page image.

FIG. 27O provides a control-flow diagram for the routine "segment text." In step 2730a, the routine "segment text" receives an initial text map, an empty segment map, and a set of blocked fragments fSet. In the outer for-loop of steps 2730b-2730i, each blocked fragment is considered. In the inner for-loop of steps 2730c-2730g, each of the two directions for curved-text-line-segment construction, discussed above with reference to FIG. 23B, are considered. In the inner-most while-loop of steps 2730d-2730f, one side of a curved text-line segment is generated by successive additions of segment portions, as discussed above with reference to FIGS. 23A-24B. In step 2730h, following completion of a next curved text-line segment, the segment is added to the segment map.

FIG. 27P provides a control-flow diagram for the routine "angle map," called in step 2726e of FIG. 27M. This routine computes an inclination angle for each page-image pixel from the final model and places the inclination angle into the angle map at a location corresponding to the page-image pixel, in step 2732b. In step 2732c, the angles in the angle map in narrow vertical regions along the spine edge of the page in the page image are multiplied by computed coefficients, as discussed above with reference to FIG. 25.

FIG. 27Q provides a control-flow diagram for the routine "offset map," called in step 2726f of FIG. 27M. In step 2734a, the routine receives a reference to an empty offset map and the angle map produced by the routine "angle map." As discussed above with reference to FIG. 26C, the offset map may have a finer-grain rectilinear grid than the pixel grid of the page image. In the for-loop of steps 2734b-2734h, offsets are computed for each cell i in the offset map. This computation follows the method discussed above with reference to FIGS. 26C and 26D. In steps 2734c-2734f, the coefficient k is computed for the currently considered cell i as discussed above with reference to FIG. 26D. In step 2734g, the local displacements $\Delta x_i$ and $\Delta y_i$ for cell i are computed by the method discussed above with reference to FIG. 26C.

FIG. 27R provides a control-flow diagram for the routine "finish," called in step 2726g of FIG. 27M. This routine carries out the pixel-transfer method discussed in FIGS. 26E-F to create a corrected image from the page image and the offset map prepared by the routine "offsetMap." In step 2736a, the image map and offset map are received. In step 2736b, an empty page tPage is allocated and the non-page pixels in the page image are copied to tPage. In step 2736c, a set of anchor points is determined and their locations in the page image and the page tPage, which will contain the corrected page image, are determined in step 2736d, as discussed above with reference to FIG. 26E. In the triply nested for-loops of steps 2736e-2736k, pixels are transferred from the page image to the corrected image as described with reference to FIG. 26F. Each point in a vertical range, or vertical neighborhood, about each anchor point is expanded to the right and to the left to transfer pixels from the page image to the corrected page image. Each pixel is transferred by a call to the routine "transfer pixels," in step 2736h.

FIG. 27S provides a control-flow diagram for the routine "transfer pixels," called in step 2736h of FIG. 27R. In step 2738a, the routine receives references to the page image and the corrected image tPage, the coordinates for a pixel i in the page image, coordinates for a corresponding pixel k in the corrected image, a direction in which expansion around an anchor point or point in a vertical neighborhood of the anchor point is expanded for pixel transfer, and the offset map. Local variables sum_y and sum_x are set to 0 in step 2738b. Then, in the for-loop of steps 2738c-2738g, each pixel j in the horizontal line of pixels starting from pixel i and continuing to the page edge in direction d is transferred from the page image to the corrected image tPage. In step 2738e, the local displacement for pixel j is computed by adding the local displacements to the local variables $sum_j$ y and sum_x and then, in step 2738f, the position of the pixel in the corrected image is computed and the intensity value for the pixel is transferred from the page image to the corrected image.

Although the present invention has been described in terms of particular embodiments, it is not intended that the invention be limited to these embodiments. Modifications within the spirit of the invention will be apparent to those skilled in the art. For example, any of many different design and implementation parameters, including modular organization, programming language, hardware platform, control structures, data structures, and other such design and implementation parameters, may be varied to provide a variety of different implementations of the disclosed methods and systems. As discussed above, there are alternative methods that can be used for many, if not all, of the various processing steps involved in text-line-curvature correction. In addition, the many different threshold values, kernel widths, image-map granularities, and other parameters may have different values in different implantations.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An image-processing subsystem included within a device, appliance, or system that acquires an image containing text with curved text lines and inputs the acquired, text-containing image to the image-processing subsystem to generate a corresponding corrected image in which the text lines are straightened and have a rectilinear organization, the image-processing subsystem comprising:
   a separate hardware layer or a hardware layer shared with the device, appliance, or system that includes one or more processors, one or more memories; and
   computer instructions stored in one or more physical data-storage devices that, when executed by one or more of the one or more processors, control the image-processing subsystem to receive the input text-containing image,
   identify a page sub-image within the text-containing image,
   correct a vertical perspective of the page sub-image,
   generate a text-line-curvature model for the page sub-image that associates inclination angles with pixels in the page sub-image,
   generate local displacements, using the text-line-curvature model, for pixels in the page sub-image from the text-line-curvature model, and
   transfer pixels from the page sub-image to a corrected page-sub-image using pixel displacements generated from the local displacements to construct a corrected page sub-image in which the text lines are straightened and in which the text characters and symbols have a rectilinear arrangement.

2. The image-processing subsystem of claim 1 wherein the image-processing subsystem identifies a page sub-image within the text-containing image by:
   identifying intensity edges within the text-containing image; and
   using the identified intensity edges along with known geometrical constraints associated with text-containing pages to identify the sub-images corresponding to one or more text-containing pages in the text-containing image.

3. The image-processing subsystem of claim 1 wherein the image-processing subsystem corrects the vertical perspective of the page sub-image by:
   rotating the page sub-image so that the spine edge of the page adjacent to the spine of the book has a vertical orientation;
   when a non-spine-adjacent edge is contained in the page sub-image,
   adjusting the image so that the non-spine-adjacent edge also has a vertical orientation; and
   when the non-spine-adjacent edge is not contained in the page sub-image, correcting the vertical perspective of the page sub-image by another method.

4. The image-processing subsystem of claim 1 wherein the image-processing subsystem generates a text-line-curvature model for the page sub-image that associates inclination angles with pixels in the page sub-image by:
   blocking fragments within the page sub-image, each fragment associated with an inclination angle;
   using the inclination angles associated with the fragments to determine coefficients for a polynomial representation of an initial text-line-curvature model; and
   refining the initial text-line-curvature model to produce a final text-line-curvature model.

5. The image-processing subsystem of claim 4 wherein the image-processing subsystem blocks fragments within the page sub-image by:
   identifying fragments in the page sub-image that comprise aggregations of characters and/or symbols that correspond to words, word fragments, and/or fragments of multiple words; and
   for each fragment,
   identifying the centroid of the fragment, and
   employing a minimization method that minimizes the distance between pixels of each fragment and a line through the centroid to determine and associate an inclination angle with the fragment that is an angle between a principle axis of the fragment and a horizontal direction.

6. The image-processing subsystem of claim 5 wherein the image-processing subsystem identifies fragments in the page sub-image by:
   selecting seed character pixels within the page image; alternately
   expanding each seed character pixel into a blob of contiguous character pixels, and
   searching for new seed character pixels within a maximum distance of the blob of contiguous character pixels.

7. The image-processing subsystem of claim 5 wherein, when the text image includes darker characters on a brighter background, a character pixel has an intensity lower than a threshold value; and
   wherein, when the text image includes lighter characters on a darker background, a character pixel has an intensity greater than a threshold value.

8. The image-processing subsystem of claim 4 wherein, after blocking fragments within the page sub-image, the image-processing subsystem filters the blocked fragments by inclination angle and dimension to select a best set of blocked fragments for determining coefficients for the polynomial representation of the initial text-line-curvature model.

9. The image-processing subsystem of claim 4 wherein the image-processing subsystem uses the inclination angles associated with the fragments to determine coefficients for the polynomial representation of the initial text-line-curvature model by:

initializing the values of a set of coefficients for the initial polynomial representation of the text-line-curvature model; and using a data-fitting method to determine the coefficients for the initial polynomial representation of the text-line-curvature model from the inclination angles associated with the fragments.

10. The image-processing subsystem of claim 9 wherein data-fitting method is selected from among:

Gaussian elimination applied to a system of linear equations generated from derivatives, with respect to model coefficients, of expressions for squared inclination angles; the Levenberg-Marquart method;

the Gauss-Newton method;

the Nonlinear Conjugate Gradient Method; and additional linear and non-linear regression-based curve-fitting methods.

11. The image-processing subsystem of claim 9 wherein the image-processing subsystem:

filters the blocked fragments for correspondence of the inclination angles associated with each blocked fragment with the inclination angles determined for the pixels of the blocked fragment using the initial polynomial representation of the text-line-curvature model; and when filtering the blocked fragments removes more than a threshold number of blocked fragments, regenerates coefficients for the initial polynomial representation of the text-line-curvature model by application of a data-fitting method.

12. The image-processing subsystem of claim 4 wherein the image-processing subsystem refines the initial text-line-curvature model to produce a final text-line-curvature model by:

applying closing, opening, and vertical smoothing operations to the page sub-image to generate filled contours corresponding to the text lines in the page sub-image;

constructing curved text-line segments within the filled contours about the text lines using inclination angles generated by the polynomial representation of the text-line-curvature model; and using points and associated angles of inclination along the constructed curved text-line segments as data for application of a data-fitting method to generate refined coefficients for the polynomial representation of the text-line-curvature model.

13. The image-processing subsystem of claim 12 wherein the image-processing subsystem constructs curved text-line segments within the filled contours about the text lines using inclination angles generated by the polynomial representation of the text-line-curvature model by:

for each blocked fragment in the page sub-image, selecting, as a starting point, a pixel corresponding to the centroid of the blocked fragment within the filled contour corresponding to the text line; and constructing a curved text-line segment in two directions from the starting point by iteratively adding segment portions to the current ends of the curved text-line segment until no further segment portions can be added.

14. The image-processing subsystem of claim 13 wherein the image-processing subsystem attempts to construct, from each starting point, a first segment portion in the direction of an inclination angle obtained from the polynomial representation of the text-line-curvature model for the starting point and a second segment portion in a direction equal to the direction of the inclination angle plus 180°, the starting point representing two current curved text-line-segment endpoints.

15. The image-processing subsystem of claim 13 wherein the image-processing subsystem adds a segment portion to a current curved text-line-segment endpoint by:

determining an inclination angle using the polynomial representation of the text-line-curvature model for a pixel corresponding to the current curved text-line-segment endpoint;

constructing an initial vector from current curved text-line-segment endpoint a direction equal to the determined inclination angle;

considering a vertical neighborhood of pixels coincident with a head of the initial vector;

when a pixel in the vertical neighborhood has an intensity value more representative of an intensity expected for text pixels than a subset of the remaining pixels in the vertical neighborhood, reconfiguring the initial vector, when necessary, to produce a final vector having a head coincident with the pixel having an intensity value more representative of the expected intensity, and extending the curved text-line-segment to the pixel coincident with the head of the final vector; and when no pixel in the vertical neighborhood has an intensity value more representative of an intensity expected for text pixels than a subset of the remaining pixels in the vertical neighborhood, terminating the curved text-line-segment at the current curved text-line-segment endpoint.

16. The image-processing subsystem of claim 1 wherein the text-line-curvature model returns a tangent of an inclination angle when called with arguments representing the location of a pixel within the page sub-image.

17. The image-processing subsystem of claim 1 wherein the image-processing subsystem generates local displacements, using the text-line-curvature model, for pixels in the page sub-image from the text-line-curvature model by:

generating an inclination-angle map that includes an inclination angle for each pixel of the page sub-image produced by input of a position of the pixel within the page sub-image to the final text-line-curvature model;

modifying the inclination angles in a vertical region of the angle map by multiplication by a coefficient that adjusts the inclination angles for increased curvature and compression in corresponding vertical region of the page sub-image; and generating an offset map that includes a local displacement for each offset-map cell in the page sub-image.

18. The image-processing subsystem of claim 17 wherein the image-processing subsystem generates a local displacement for a cell in the offset map by:

determining a value for a vertical displacement as a compression coefficient multiplied by a cell width times the tangent of the inclination angle obtained from the final text-line-curvature model;

setting a value for a horizontal displacement to the compression coefficient; and associating the vertical displacement and the horizontal displacement with the cell.

19. The image-processing subsystem of claim 18 wherein the compression coefficient for a cell is computed as a fraction equal to a cell width divided by a pixel width times one of the cosine of the difference between inclination angles for cells at the top and bottom of a vertical cell column spanning the page image and coincident with the cell and 0.4.

20. The image-processing subsystem of claim 1 wherein the image-processing subsystem transfers pixels from the page sub-image to a corrected page sub-image using pixel displacements generated from the local displacements by:
  identifying pairs of corresponding anchor points in the page sub-image and the corrected page sub image;
  transferring the intensity value of pixels corresponding to the anchor points in the page sub-image to pixels corresponding to pixels corresponding to the anchor points in the corrected page sub-image; and
  for each non-anchor-point pixel in the page sub-image,
  summing the local displacements coincident with a vector from the non-anchor-point pixel to a nearby anchor point to produce a pixel displacement, and
  transferring the intensity value of the non-anchor-point pixel to a pixel displaced from a corresponding anchor point in the corrected page sub-image by the pixel displacement.

21. A method carried out by an image-processing subsystem included within a device, appliance, or system that acquires an image containing text with curved text lines and inputs the acquired, text-containing image to the image-processing subsystem to generate a corresponding corrected image in which the text lines are straightened and have a rectilinear organization, the method comprising:
  receiving the input text-containing image and storing the input text-containing image in a memory;
  identifying a page sub-image within the text-containing image;
  correcting a vertical perspective of the page sub-image;
  generating a text-line-curvature model for the page sub-image that associates inclination angles with pixels in the page sub-image;
  generating local displacements, using the text-line-curvature model, for pixels in the page sub-image from the text-line-curvature model; and
  transferring pixels from the page sub-image to a corrected page-sub-image using pixel displacements generated from the local displacements to construct, in a memory, the corrected page sub-image in which the text lines are straightened and in which the text characters and symbols have a rectilinear arrangement.

22. A non-transitory computer-readable storage medium comprising instructions that, when executed by one or more processors of a hardware layer of an image-processing subsystem that includes one or more processors and one or more memories and that is included within a device, appliance, or system that acquires an image containing text with curved text lines to receive the acquired, text-containing image from the device, appliance, or system and generates a corresponding corrected image in which the text lines are straightened and have a rectilinear organization, causes the one or more processors to perform operations comprising:
  receiving the input text-containing image and storing the input text-containing image in a memory;
  identifying a page sub-image within the text-containing image;
  correcting a vertical perspective of the page sub-image;
  generating a text-line-curvature model for the page sub-image that associates inclination angles with pixels in the page sub-image;
  generating local displacements, using the text-line-curvature model, for pixels in the page sub-image from the text-line-curvature model; and
  transferring pixels from the page sub-image to a corrected page-sub-image using pixel displacements generated from the local displacements to construct, in a memory, the corrected page sub-image in which the text lines are straightened and in which the text characters and symbols have a rectilinear arrangement.

* * * * *